(12) United States Patent
Arhancet et al.

(10) Patent No.: US 8,901,299 B2
(45) Date of Patent: *Dec. 2, 2014

(54) PROCESSES FOR PREPARATION OF OIL COMPOSITIONS

(71) Applicant: Monsanto Technology LLC, St. Louis, MO (US)

(72) Inventors: Juan P. Arhancet, Creve Coeur, MO (US); Jerald D. Heise, St. Louis, MO (US); Vallabh Makadia, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,139

(22) Filed: Nov. 15, 2013

(65) Prior Publication Data

US 2014/0073807 A1  Mar. 13, 2014

Related U.S. Application Data

(60) Continuation of application No. 13/588,442, filed on Aug. 17, 2012, now Pat. No. 8,586,773, which is a (Continued)

(51) Int. Cl.
*C11B 3/00* (2006.01)
*C11B 1/10* (2006.01)

(Continued)

(52) U.S. Cl.
CPC . *C11B 3/04* (2013.01); *C11B 1/104* (2013.01); *C11B 3/14* (2013.01); *C11B 1/02* (2013.01); *A21D 13/0074* (2013.01); *C11B 3/12* (2013.01); *A23D 9/00* (2013.01); *C11B 3/06* (2013.01); *C11B 3/001* (2013.01); *C11B 1/10* (2013.01); *C11B 1/06* (2013.01); *C11B 3/10* (2013.01)
USPC ........... 544/191; 554/175; 554/192; 554/195; 554/198

(58) Field of Classification Search
USPC .......................... 554/175, 191, 192, 195, 198
See application file for complete search history.

(56) References Cited

U.S. PATENT DOCUMENTS

| 4,089,880 A | 5/1978 | Sullivan |
| 4,915,972 A | 4/1990 | Gupta et al. |

(Continued)

FOREIGN PATENT DOCUMENTS

| DE | 2922146 A1 | 7/1980 |
| EP | 0077528 A1 | 4/1983 |

(Continued)

OTHER PUBLICATIONS

Asoyia, News Release, dated Oct. 14, 2004, Innovative Soybean Oil Offers Health, Cooking, and Taste Benefits, Iowa's Trans Fat Free Asoyia(TM) Oil enters the Marketplace, 3 pages, www.asoyia.com.

(Continued)

*Primary Examiner* — Deborah D Carr
(74) *Attorney, Agent, or Firm* — Senniger Powers LLP; Chunping Li

(57) ABSTRACT

The present invention is directed to processes for preparing oil compositions having a high concentration of poly-unsaturated fatty acids and oil compositions having a low concentration of α-linolenic acid. In addition, the present invention is directed to processes for preparing oil compositions having advantageous stability characteristics.

19 Claims, 7 Drawing Sheets

Related U.S. Application Data continuation of application No. 12/816,046, filed on Jun. 15, 2010, now Pat. No. 8,247,584, which is a division of application No. 11/267,810, filed on Nov. 4, 2005, now Pat. No. 7,741,500.

(60) Provisional application No. 60/633,914, filed on Dec. 6, 2004, provisional application No. 60/625,506, filed on Nov. 4, 2004.

(51) Int. Cl.
| | |
|---|---|
| *C11B 3/14* | (2006.01) |
| *C11B 1/02* | (2006.01) |
| *A21D 13/00* | (2006.01) |
| *C11B 3/12* | (2006.01) |
| *A23D 9/00* | (2006.01) |
| *C11B 3/06* | (2006.01) |
| *C11B 3/04* | (2006.01) |
| *C11B 1/06* | (2006.01) |
| *C11B 3/10* | (2006.01) |

(56) References Cited

U.S. PATENT DOCUMENTS

| | | | |
|---|---|---|---|
| 4,948,811 A | | 8/1990 | Spinner et al. |
| 5,130,449 A | | 7/1992 | Lagarde et al. |
| 5,208,058 A | * | 5/1993 | Kotani et al. ............... 426/486 |
| 5,260,077 A | | 11/1993 | Carrick et al. |
| 5,278,325 A | * | 1/1994 | Strop et al. ............... 554/12 |
| 5,286,886 A | | 2/1994 | Van de Sande et al. |
| 5,315,020 A | | 5/1994 | Cheng et al. |
| 5,387,758 A | | 2/1995 | Wong et al. |
| 5,401,866 A | | 3/1995 | Cheng et al. |
| 5,434,283 A | | 7/1995 | Wong et al. |
| 5,516,924 A | | 5/1996 | van de Sande et al. |
| 5,534,425 A | | 7/1996 | Fehr et al. |
| 5,545,821 A | | 8/1996 | Wong et al. |
| 5,625,130 A | | 4/1997 | Grant et al. |
| 5,658,767 A | * | 8/1997 | Kyle ............... 435/134 |
| 5,696,278 A | | 12/1997 | Segers |
| 5,710,369 A | | 1/1998 | Fehr et al. |
| 5,714,668 A | | 2/1998 | Fehr et al. |
| 5,714,670 A | | 2/1998 | Fehr et al. |
| 5,750,844 A | | 5/1998 | Fehr et al. |
| 5,763,745 A | | 6/1998 | Fehr et al. |
| 5,767,338 A | | 6/1998 | Fan |
| 5,795,969 A | | 8/1998 | Fehr et al. |
| 5,840,946 A | | 11/1998 | Wong et al. |
| 5,859,350 A | | 1/1999 | DeBonte et al. |
| 5,863,589 A | | 1/1999 | Covington, Jr. et al. |
| 5,866,762 A | | 2/1999 | DeBonte et al. |
| 5,965,755 A | | 10/1999 | Sernyk et al. |
| 5,969,169 A | | 10/1999 | Fan |
| 5,981,781 A | | 11/1999 | Knowlton |
| 6,022,577 A | | 2/2000 | Chrysam et al. |
| 6,063,424 A | * | 5/2000 | Wells et al. ............... 426/331 |
| 6,133,509 A | | 10/2000 | Fehr et al. |
| 6,147,237 A | | 11/2000 | Zwanenburg et al. |
| 6,169,190 B1 | | 1/2001 | Lanuza et al. |
| 6,172,248 B1 | | 1/2001 | Copeland et al. |
| 6,201,145 B1 | | 3/2001 | Fan |
| 6,229,033 B1 | | 5/2001 | Knowlton |
| 6,303,849 B1 | | 10/2001 | Potts et al. |
| 6,313,328 B1 | | 11/2001 | Ulrich et al. |
| 6,340,485 B1 | | 1/2002 | Coupland et al. |
| 6,388,110 B1 | | 5/2002 | Ulrich et al. |
| 6,388,113 B1 | | 5/2002 | Martinez Force et al. |
| 6,559,325 B2 | | 5/2003 | Fan |
| 6,562,397 B2 | | 5/2003 | DeBonte et al. |
| 6,583,303 B1 | | 6/2003 | DeBonte et al. |
| 6,610,867 B2 | | 8/2003 | Jakel et al. |
| 6,667,064 B2 | | 12/2003 | Surette |
| 6,797,172 B2 | | 9/2004 | Koseoglu et al. |
| 6,844,021 B2 | | 1/2005 | Koike et al. |
| 6,906,211 B2 | | 6/2005 | Tysinger et al. |
| 6,924,381 B2 | | 8/2005 | Dawson |
| 8,247,584 B2 | * | 8/2012 | Arhancet et al. ............... 554/12 |
| 2001/0025114 A1 | | 9/2001 | Bijl et al. |
| 2001/0031884 A1 | | 10/2001 | Fan |
| 2003/0180434 A1 | | 9/2003 | Fan |
| 2004/0047971 A1 | | 3/2004 | Alander |
| 2004/0049813 A1 | | 3/2004 | Russell, Jr. et al. |

FOREIGN PATENT DOCUMENTS

| | | | | |
|---|---|---|---|---|
| EP | 0226245 A1 | | 6/1987 | |
| EP | 0323753 B1 | | 7/1989 | |
| EP | 0326198 A2 | | 8/1989 | |
| EP | 0347056 A1 | | 12/1989 | |
| EP | 0348004 A2 | | 12/1989 | |
| EP | 0476093 B1 | | 3/1992 | |
| EP | 0526954 B1 | | 2/1993 | |
| EP | 0606359 B1 | | 7/1994 | |
| EP | 0639333 A1 | | 2/1995 | |
| EP | 0672096 B1 | | 9/1995 | |
| EP | 0813357 B1 | | 12/1997 | |
| EP | 0833882 B1 | | 4/1998 | |
| EP | 0936266 A1 | | 8/1999 | |
| GB | 715352 A | | 9/1954 | |
| GB | 2241503 A | * | 9/1991 | ............... C11B 3/00 |
| JP | 63-44843 A | | 2/1988 | |
| WO | 93/19626 A1 | | 10/1993 | |
| WO | WO 9319626 A1 | * | 10/1993 | ............... A23L 2/18 |
| WO | 96/36684 A1 | | 11/1996 | |
| WO | 99/64614 A2 | | 12/1999 | |
| WO | 00/44862 A1 | | 8/2000 | |
| WO | WO 0044862 A1 | * | 8/2000 | |
| WO | 02/092073 A1 | | 11/2002 | |
| WO | 03/049832 A1 | | 6/2003 | |
| WO | 2004/009827 A2 | | 1/2004 | |
| WO | 2004/071467 A2 | | 8/2004 | |

OTHER PUBLICATIONS

Asoyia, Product Brochure, printed Oct. 21, 2004, "Ultra Low Lin Soybean Oil, The Solution to the Food Industry's Needs," 2 pages, www.asoyia.com.

Cargill, Product Brochure, "Clear Valley(R) 85, High Oleic Canola Oil," 2 pages, www.clearvalleyoils.com, 1985.

Chu, Y.-H., et al., "Factors Affecting the Content of Tocopherol in Soybean Oil," Journal of the American Oil Chemists' Society, Dec. 1993, pp. 1263-1268, vol. 70, No. 12.

Health Canada, "Novel Food Information, Low Linolenic Soybean (OT96-15)," Apr. 2001, 3 pages, Office of Food Biotechnology, Food Directorate, Health Protection Branch, Health Canada, Tunney's Pasture, Ottawa, Ontario K1A OL2.

International Search Report and Written Opinion issued in PCT/US2005/039809, dated Jun. 13, 2006, 19 pages.

International Search Report and Written Opinion issued in PCT/US2005/039807, dated Jun. 16, 2006, 18 pages.

Iowa State University, Product Brochure, "1% Linolenic Soybean Oil", printed Apr. 11, 2006, 2 pages, www.notrans.iastate.edu/about.html.

List, G. R., et al., "Oxidation and Quality of Soybean Oil: A Preliminary Study of the Anisidine Test," Journal of the American Oil Chemists' Society, Feb. 1974, pp. 17-21, vol. 51.

List, G. R., et al., "Potential Margarine Oils from Genetically Modified Soybeans," Journal of the American Oil Chemists' Society, 1996, pp. 729-732, vol. 73, No. 6.

Maritex, Product List, "Omega-3 Oils", 2005, 4 pages, www.maritex.com.

Mickel, H. S., et al., "Effect of Inert Gases and Nitrogen on the Autoxidation of Cis and Trans Polyunsaturated Fatty Acid Methyl Esters," La Rivista Italiana Delle Sostanze Grasse, Nov. 1976, pp. 312-314, vol. 53.

(56) References Cited

OTHER PUBLICATIONS

Mounts, T. L., et al., "Performance Evaluation of Hexane-Extracted Oils from Genetically Modified Soybeans," Journal of the American Oil Chemists' Society, Feb. 1994, pp. 157-161, vol. 71, No. 2.

Neff, W. E., et al., "Oxidative Stability of Natural and Randomized High-Palmitic- and High-Stearic-Acid Oils from Genetically Modified Soybean Varieties," Journal of the American Oil Chemists' Society, 1999, pp. 825-831, vol. 76, No. 7.

Sayanova, O. V., et al., "Identification of Primula Fatty Acid Delta-super-6-desaturases with n-3 Substrate Preferences," FEBS Letters, 2003, pp. 100-104, vol. 542.

Su, C., et al., "Oxidative and Flavor Stabilities of Soybean Oils with Low- and Ultra-Low-Linolenic Acid Composition," Journal of the American Oil Chemists' Society, 2003, pp. 171-176, vol. 80, No. 2.

Warner, K., et al., "Frying Quality and Stability of Low- and Ultra-Low-Linolenic Acid Soybean Oils," Journal of the American Oil Chemists' Society, 2003, pp. 275-280, vol. 80, No. 3.

Wilson, D. M., et al., "Effect of Controlled Atmosphere Storage on Aflatoxin Production in High Moisture Peanuts (Groundnuts)," J. Stored Prod Res, 1976, pp. 97-100, vol. 12.

Yan, K.-M., et al., "Extraction and Refining of Black Currant Seed Oil," China Oils and Fats, 2004, 5 pages, vol. 29, No. 2.

* cited by examiner

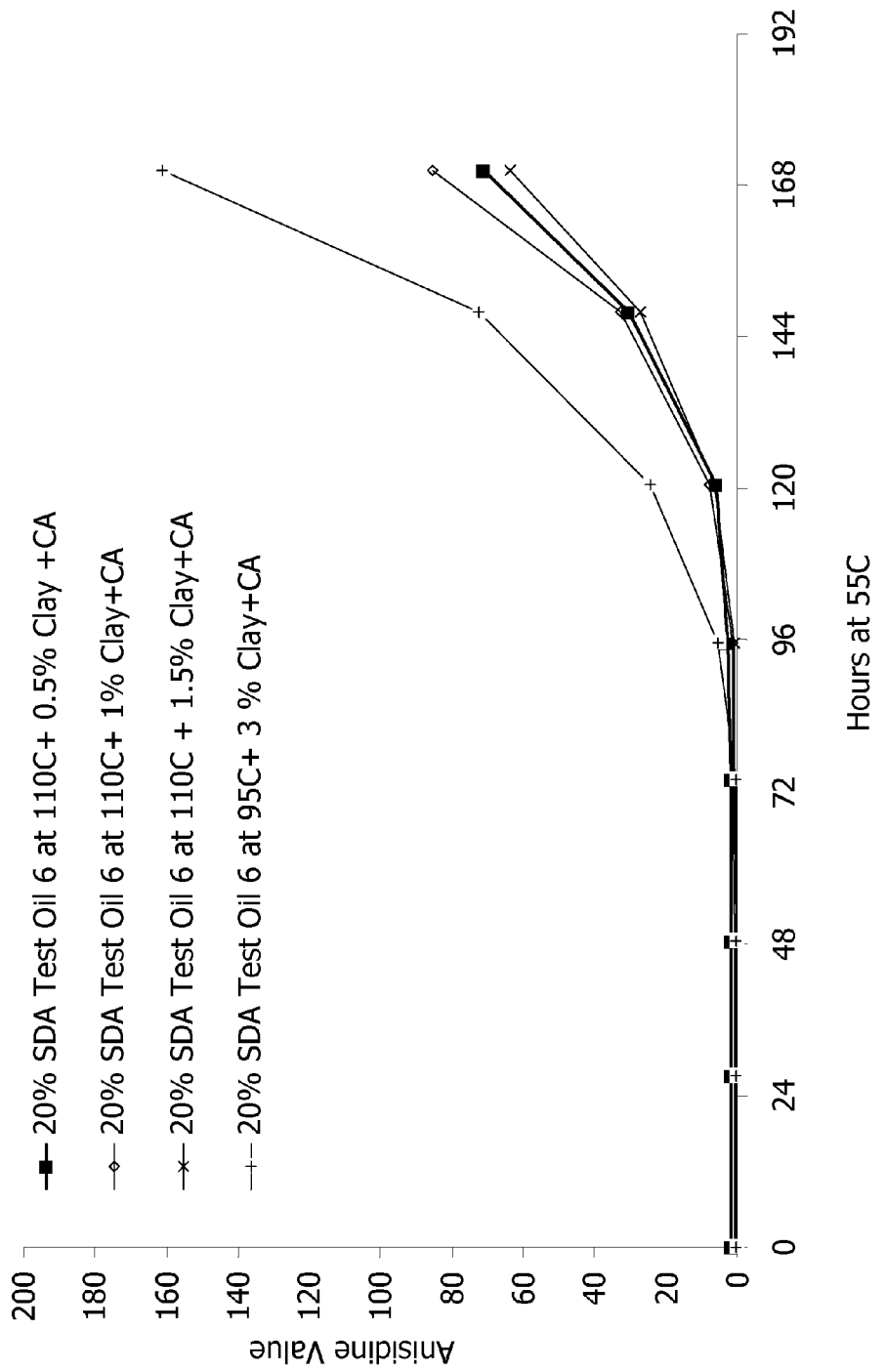

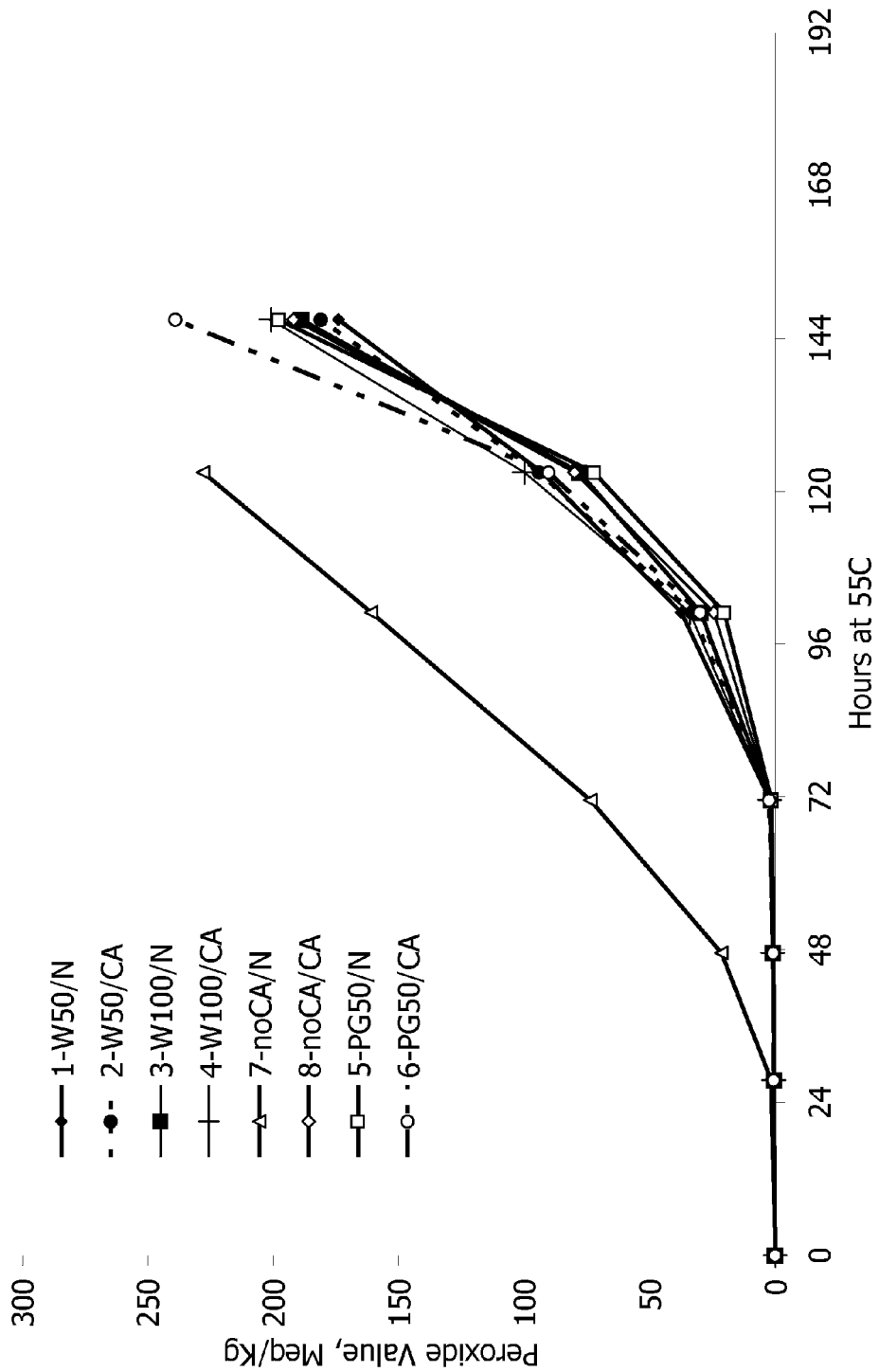

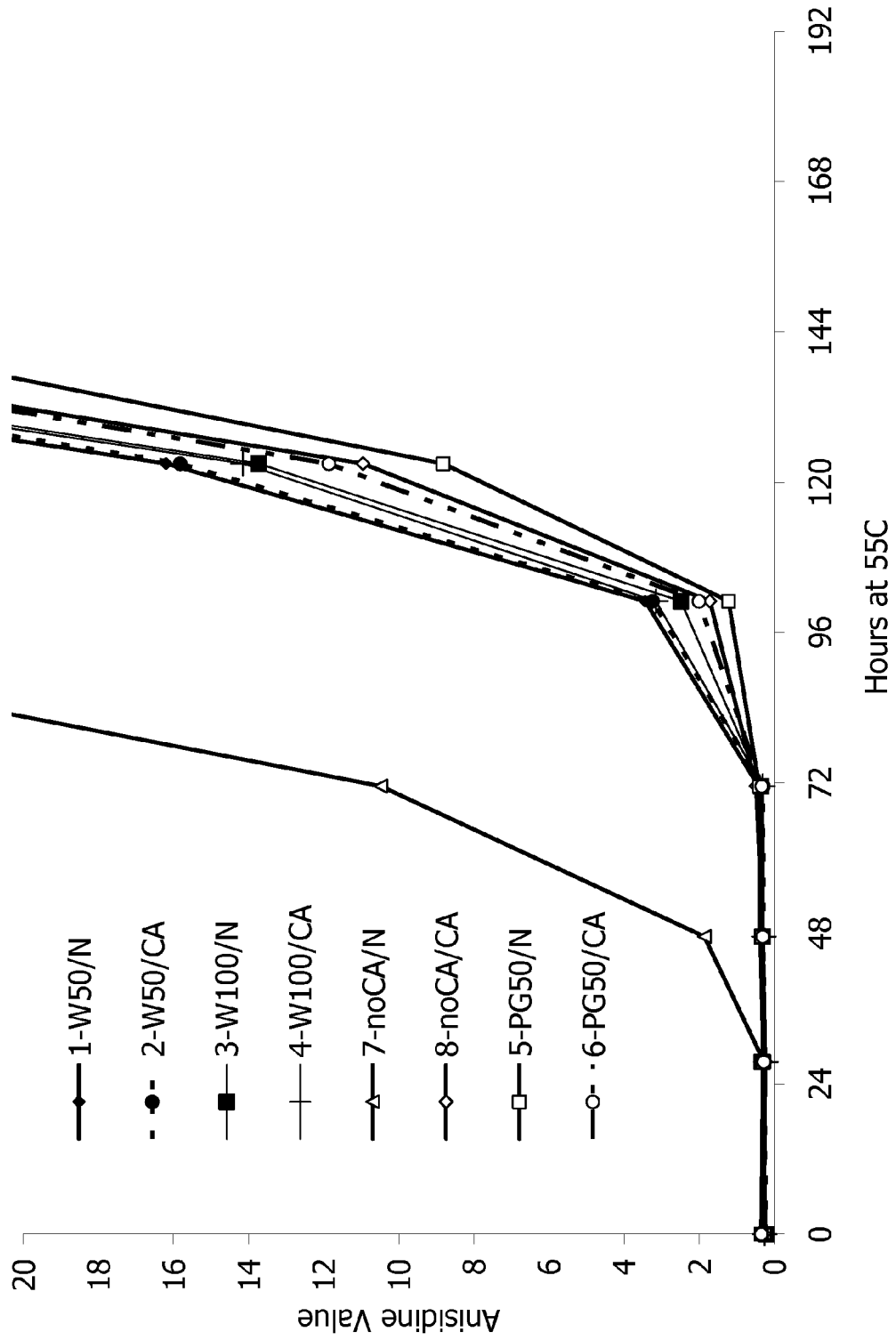

PROCESSES FOR PREPARATION OF OIL COMPOSITIONS

REFERENCE TO RELATED APPLICATIONS

This application is a continuation of U.S. patent application Ser. No. 13/588,442, filed Aug. 17, 2012, which is a continuation of U.S. patent application Ser. No. 12/816,046, filed Jun. 15, 2010, which is a divisional of U.S. patent application Ser. No. 11/267,810, filed Nov. 4, 2005, which claims the benefit under 35 USC 119(e) from U.S. Provisional Patent Application Ser. No. 60/633,914, filed Dec. 6, 2004, and U.S. Provisional Patent Application Ser. No. 60/625,506, filed Nov. 4, 2004.

BACKGROUND

The present invention relates to non-hydrogenated or partially hydrogenated non-animal oils having a low level of trans-fatty acids and improved flavor and performance attributes especially suitable for food applications and processes for the preparation thereof.

As consumers have become more aware of the health impact of lipid nutrition, consumption of oils with high levels of unsaturated and polyunsaturated fats and low levels of trans-fats is desirable.

Many oils are chemically hydrogenated; hydrogenation is used to improve performance attributes such as stability. When an oil is hydrogenated, the number of olefinic unsaturations in the fatty acids is reduced. However, hydrogenation can affect the stereochemistry of double bonds by either moving the double bond to another position in the fatty acid or causing the primarily cis-double bonds to isomerize to trans-double bonds. Isomerization of cis-fatty acids to trans-fatty acids is undesirable due to the negative health issues relating to the consumption of trans-fatty acids.

One application of oils is for use during deep-frying. The temperatures of deep-frying can cause the oil to oxidize and thus, degrade faster than it would at a lower temperature. Thus, many unhydrogenated oils with high levels of unsaturated or polyunsaturated fats have limited use in deep-frying operations due to their instability; deep-frying is an important segment of the food processing industry. Many non-hydrogenated soybean oils are unstable and easily oxidized during cooking, which in turn creates off-flavors of the oil and compromises the sensory characteristics of foods cooked in such oils.

Polyunsaturated fatty acids (PUFAs) may be extracted from natural sources or synthesized by various organisms. However, there are several disadvantages associated with commercial production of PUFAs from natural sources. Natural sources of PUFAs, such as animals and plants, tend to have highly heterogeneous oil compositions. The oils obtained from these sources can require extensive purification to separate out one or more desired PUFAs or to produce an oil which is enriched in one or more PUFA. Fish oils containing significant quantities of EPA and DHA can have unpleasant tastes and odors, which would make them undesirable food ingredients or supplements. Furthermore, in some cases, fish oil capsules can contain low levels of the desired component and retain undesirable levels of other components, including contaminants.

PUFAs are considered to be useful for nutritional, pharmaceutical, industrial, and other purposes. Therefore, it is of interest to extract oils having high levels of PUFAs from genetically-modified seeds; these seeds have been modified to contain higher concentrations of SDA as compared to the corresponding naturally-occurring seed.

SUMMARY OF THE INVENTION

The invention is directed to a process for preparing a non-animal oil comprising degumming a crude non-animal oil to form a degummed oil; reacting the degummed oil with an acidic aqueous solution to form a mixture; neutralizing the mixture with an alkaline aqueous solution to form a refined oil; contacting the refined oil with a bleaching material under process conditions that minimize oxidation or minimize isomerization of cis-fatty acids to trans-fatty acids to form a refined, bleached oil; and deodorizing the refined, bleached oil under process conditions that minimize oxidation or minimize isomerization of cis-fatty acids to trans-fatty acids to form the non-animal oil, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil comprising degumming a crude oil to form a degummed oil; neutralizing the degummed oil with an alkaline aqueous solution, in the presence of an inert gas to minimize oxygen concentration, to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil comprising degumming a crude oil to form a degummed oil; reacting the degummed oil with an acidic aqueous solution, in the presence of an inert gas to minimize oxygen concentration, to form a mixture; neutralizing the mixture with an alkaline aqueous solution, in the presence of an inert gas to minimize oxygen concentration, to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil composition comprising reacting a crude oil with an acidic aqueous solution, at a temperature of at least 35° C. and in the presence of an inert gas to minimize oxygen concentration, to form a degummed oil; refining the degummed oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, and deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil composition comprising contacting an oil-containing material with an extraction fluid, in the presence of an inert gas to minimize oxygen concentration, to extract a crude oil from the oil-containing material; refining the crude oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil composition comprising cracking and dehulling whole seeds, in the presence of an inert gas to minimize oxygen concentration, to form seed meats; contacting the seed meats with an extraction fluid to extract a crude oil from the seed meats; refining the crude oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil composition comprising cracking and dehulling whole seeds, in the presence of an inert gas to minimize oxygen concentration, to form seed hulls; contacting the seed hulls with an extraction fluid to extract a crude oil from the seed hulls; refining the crude oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil comprising cracking and dehulling whole seeds to form seed meats; milling, grinding, or flaking the seed meats, in the presence of an inert gas to minimize oxygen concentration, to form seed meats having increased surface area; contacting the seed meats having increased surface area with an extraction fluid to extract a crude oil from the seed meats; refining the crude oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil comprising cracking and dehulling whole seeds to form seed hulls; milling, grinding, or flaking the seed hulls, in the presence of an inert gas to minimize oxygen concentration, to form seed hulls having increased surface area; contacting the seed hulls having increased surface area with an extraction fluid to extract a crude oil from the seed hulls; refining the crude oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a process for preparing a non-animal oil comprising milling, grinding, or flaking an oil-containing material, in the presence of an inert gas to minimize oxygen concentration, to form oil-containing material having increased surface area; contacting the oil-containing material having increased surface area with an extraction fluid to extract a crude oil from the oil-containing material; refining the crude oil to form a refined oil; bleaching the refined oil to form a refined, bleached oil; and deodorizing the refined, bleached oil under process conditions that minimize oxidation or minimize isomerization of cis-fatty acids to trans-fatty acids to form the non-animal oil composition, or deodorizing the refined, bleached oil to form the non-animal oil having an anisidine value of less than about 3 and comprising less than 1 wt. % trans-fatty acid based on the total weight of fatty acids or derivatives thereof in the non-animal oil.

Yet another aspect of the invention is directed to a method of decreasing oxidative degradation of oil seeds or oil seed meats by storing the seeds or the meats in the presence of an inert gas.

BRIEF DESCRIPTION OF THE DRAWINGS

FIG. 3B is a graph of anisidine value (AV) vs. time for a 20% stearidonic (SDA) oil composition bleached at (i) 110° C. with 0.5 wt. % clay and citric acid added; (ii) 110° C. with 1 wt. % clay and citric acid added; (iii) 110° C. with 1.5 wt. % clay and citric acid added; and (iv) 95° C. with 3 wt. % clay and citric acid added.

FIG. 5A is a graph of AV vs. time for the deodorization experiment described in Example 47.

FIG. 5B is a graph of PV vs. time for the deodorization experiment described in Example 47.

DETAILED DESCRIPTION

Figure 1:
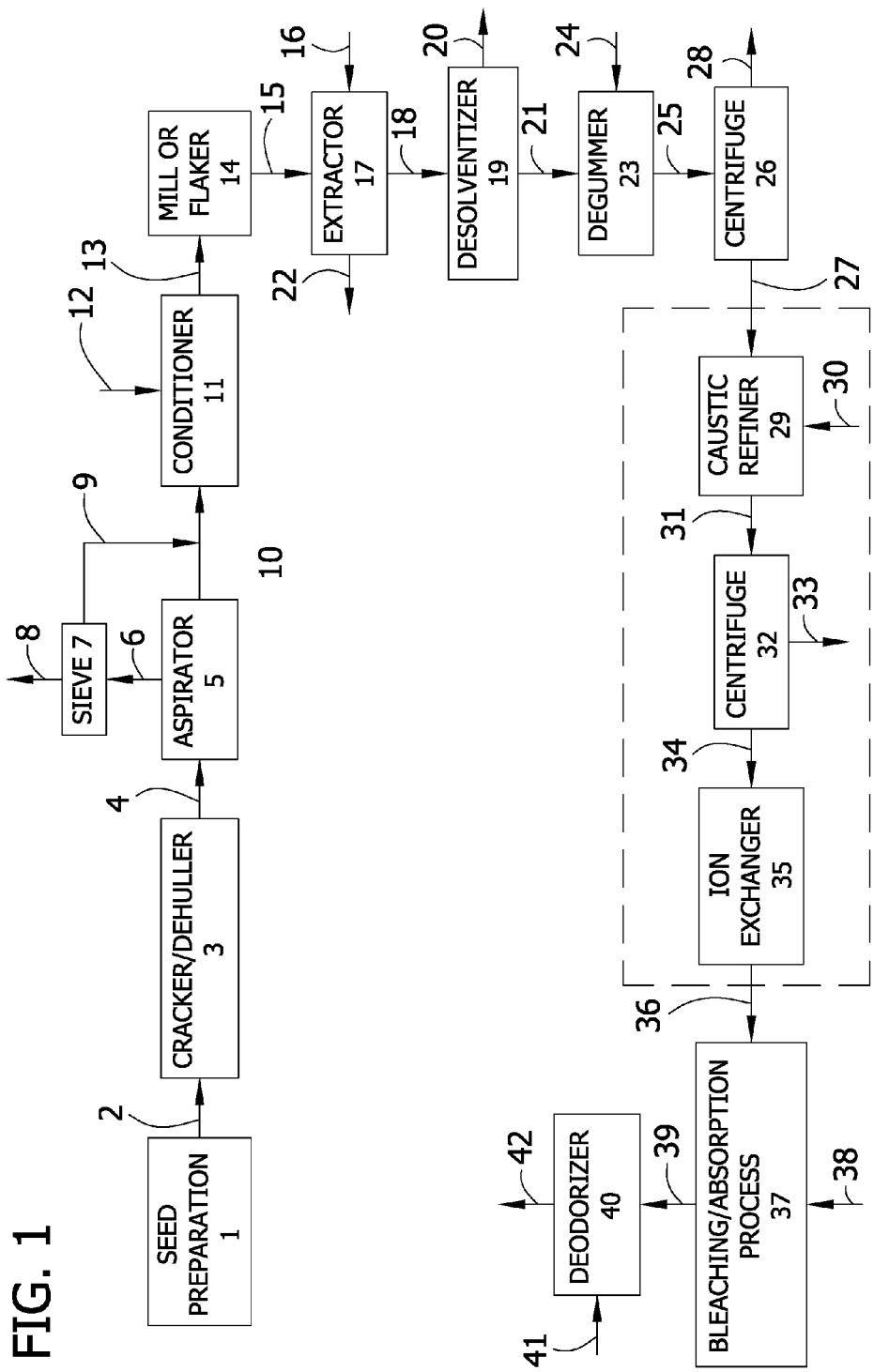
FIG. 1 is a schematic of the process of the invention representing the process steps starting with seeds and producing refined, bleached and deodorized oil.

The process of the present invention produces oils having improved stability in terms of taste and smell and low levels of trans-fatty acids. Certain oils prepared using the process of the invention can be used as food ingredients, due to the health benefits of the consumption of highly unsaturated fats. It is known that consumption of fatty acids having four or more double bonds is desirable. Due to the high level of unsaturation (four or more double bonds), certain oils prepared by the present invention are less stable than oils with a lower level of unsaturation (less than four double bonds). Lower stability of certain oils leads to decomposition reactions of fatty acids that form undesirable peroxides and hydroperoxides. The subsequent decomposition of these oxidation products can form volatile and non-volatile aldehydes and/or ketones. The non-volatile components can catalyze further oxidation of the oils and the volatile components give rise to undesirable taste and smell.

The process for preparing the oils of the present invention has been developed by optimizing the many factors that affect the rate of the oxidation processes including seed storage and treatment, the concentrations of pro-oxidants (e.g., oxygen, chlorophyll and metals), the temperature of the system, the exposure of the seed meats or oil to light and the concentration of stabilizers or antioxidants present naturally or otherwise. The relationships between these factors are complex. The process improvements of the present invention provide oil compositions with improved seed oil stability as characterized by various analytical methods, (e.g., AV, PV) and improved sensory and flavor characteristics when compared to seed oils prepared by conventional methods. Thus, another of the various aspects of the present invention is a process for preparing the seed oil compositions described herein. The seed oil process of the present invention advantageously provides seed oil compositions with added stability in sensory and flavor characteristics.

I. Increasing Oxidative Stability of Oil Compositions Through Processing

The various oil compositions prepared using the process of the invention are oils extracted from various sources. In various embodiments, the oil source is non-animal. Advantageously, the compositions prepared by the process of the invention possess greater stability than known oil compositions.

Generally, the stability of oils is important for determining their use. For example, oils with low concentrations of unsaturated fatty acids usually resulting from partial hydrogenation are used for deep-frying applications. Typically, these oils are partially hydrogenated due to the lower stability of unsaturated fats to oxidative instability, which can result from high deep-frying temperatures. However, hydrogenation of oils results in the formation of trans-fatty acids, which are known to negatively impact cardiovascular health. Thus, there is interest in preparing stable oils wherein the trans-fatty acid content is low for use in deep-frying applications, and several oil compositions prepared by the process of the invention are suitable for such use.

The present invention is also directed to preparation of oils having a high concentration of omega-3 fatty acids, which are known to provide positive health benefits. In particular, omega-3 fatty acids are known to benefit cardiovascular health, cognitive development, infant nutrition and aid in the prevention of cancer, rheumatoid and osteoarthritis, and mental illness. Currently, a main source of omega-3 fatty acids is fish oils. The omega-3 fatty acids are more reactive due to the larger number (3 or more) of double bonds in the fatty acids. Thus, finding a good source of omega-3 oils for use as a food ingredient (e.g., to add to bread, crackers, salad dressings, mayonnaise, margarines and spreads, pet foods, beverages, etc.) has been a challenge due to the taste and smell of omega-3 oils processed from fish oils. Accordingly, an aspect of the present invention is to provide a source of omega-3 fatty acids that has the taste and smell characteristics advantageous for use as a food ingredient and/or a product with potential health benefits.

Generally, oils having a greater number of olefinic functionalities have higher oxidation rates than oils having a lower number of olefinic functionalities. The reaction schemes describing the oxidation of unsaturated fatty acids (UFAs) include radical chain reactions characterized as initiation, propagation and termination reactions. An example of an initiation reaction involves abstracting a hydrogen atom from a fatty acid to produce a fatty acid with a free radical. UFAs having more than one double bond and having an allylic carbon are more reactive than polyunsaturated fatty acids having other configurations because the allylic hydrogen is more easily abstracted and the allylic radical is more stable than other radicals. During propagation, the UFA with an allylic radical can react with molecular oxygen to produce a peroxide compound. The peroxide compound can react with another UFA to abstract a hydrogen atom and produce another fatty acid radical in a propagation step. Alternately, an allylic radical can react with another radical to produce an inactive product in a termination step.

Factors affecting the oxidation of oils with one or more unsaturated fatty acids are a function of the concentration of agents which initiate the abstraction of a hydrogen atom from an UFA, the concentration of molecular oxygen, the concentration of compounds which react with the radicals to form stable products (e.g., stabilizers or other radicals that result in termination) and various other reaction conditions that increase or decrease the reaction rates of the oxidation reactions. Molecular oxygen is one of the most important species needed to sustain the production of peroxide compounds from UFAs and the factors discussed herein above have complex relationships.

Generally, the relationship of the concentration of pro-oxidants, which initiate the formation of radical species, to the stability of the highly unsaturated oils depends on the specific pro-oxidant and the initiation reaction that occurs. When molecular oxygen is taken up in a propagation step of the overall oxidation reaction scheme, the relationship between molecular oxygen concentration and the rate of UFA oxidation is approximately linear. However, molecular oxygen can participate in other types of reactions in the overall oxidation reaction scheme. For example, a proposed initiation mechanism is the abstraction of hydrogen from an UFA by trace metal ions. Furthermore, it has been found that UV light and temperature increase the rates of direct attack by oxygen on UFAs. It is also believed that UFAs are oxidized by hydrogen peroxide produced from metal-catalyzed water decomposition or by reaction with trace amounts of singlet oxygen. All of these reactions are plausible and lead to complex relationships between the processing factors, stability, and oil quality discussed herein below.

While the relationship of the concentration of stabilizers to the rate of UFA oxidation depends on the specific stabilizer, this relationship can be complicated by the presence of more than one stabilizer. The addition of multiple stabilizers can act to stabilize each other and when this occurs, a combination of two or more stabilizers can be more effective at terminating free radicals than a single stabilizer.

Despite the complexity of UFA oxidation, the stability of compositions containing UFAs can be determined by measuring certain types of compounds produced by the various oxidation reactions. For example, the peroxide value (PV) is the concentration of peroxide compounds in the oil measured in meq/kg. Peroxide compounds are produced during UFA oxidation, thus, the higher the value of PV, the more UFA oxidation that has occurred. Furthermore, the PV of the oil can be minimized by reducing the formation of peroxides or by removing/decomposing the peroxides or hydroperoxides present in the oil. The PV can be minimized by a variety of techniques, including, but not limited to processing protocols.

Another type of measurement that is utilized to assess the post-oxidative stress that the oil has been exposed to is referred to as the anisidine value (AV) of the oil. The AV indicates the amount of oxidation that the oil has experienced prior to measurement and is a measure of the concentration of the secondary oxidation products. The AV of an oil is a measure of the amount of non-volatile aldehydes and/or ketones (primarily 2-alkenals) in the oil. As the AV of the oil measures the non-volatile aldehyde and/or ketone concentration in the oil (typically, unitless), it is a measure of its oxidative history. Aldehydes and ketones are produced from the decomposition of the peroxide or hydroperoxide species, which are primary oxidation products of the olefinic functionality on a fatty acid. Methods for measuring PV or AV of an oil are well known in the art and include AOCS Cd 8-53 and AOCS Cd 18-90, respectively.

Minimizing the amount of oxidation measured by PV and AV can have significant implications when assessing the oxidative stability of an oil. For example, peroxides and hydroperoxides can readily decompose to form off flavors and aldehydes and ketones, which can act as catalysts for the further oxidative decomposition of the oil.

A method for determining the oxidative stability is the oxidative stability index (OSI); one method for measuring OSI is AOCS Cd 12b-92. The value for the OSI is the time (usually in hours) before the maximum rate change of oxidation (generally referred to as the propagation phase of the oxidation reaction); this time is usually called the induction period. Although there are many factors that affect an oil's OSI value, the value is useful along with the other measures for making semi-quantitative predictions about oil stability.

Another method for determining the oxidative stability of an oil, is to utilize a standardized sensory evaluation. Generally, the standardized sensory evaluation assesses the smell, taste, tactile attributes and flavor of the oil and also, the characteristics of a food product containing the oil by deep-frying the food in the oil or otherwise incorporating the oil in the food. For example, many characteristics of the oil and foods prepared using the oils or having the oil as an ingredient can be evaluated. In addition, the trained panelists can select from a variety of numeric scales to rate the acceptability of the oils tested in the sensory evaluation. A person skilled in the art would be able to design an appropriate sensory evaluation. The sensory evaluation results determine the acceptability of the oil for the specific use and as such, are an important measure of oil stability.

Specific odor and taste indicators associated with oils include bacony, beany, bitter, bland, burnt, buttery, cardboardy, corny, deep fried, fishy, fruity, grassy, green, hay, heated oil, hully, hydrogenated oil, lard, light struck oil, melon, metallic, musty, nutty, overheated oil, oxidized, pointy, paraffin oil, peanut oil, pecan oil, petroleum, phenolic, pine oil, plastic, pondy, pumpkin, rancid, raw, reverted oil, rubbery, soapy, sour, sulfur, sunflower seed shell, watermelon, waxy, weedy and woody. Typically, oils containing more than four double bonds are characterized by a fishy or pondy odor. One embodiment of the present invention is to produce oils containing more than four double bonds, which are bland or buttery in taste and odor at the time of manufacture. Another embodiment of the invention is to have these oils retain their bland or buttery sensory properties when stored for several months.

II. Oilseed Process

The oilseed process of the present invention is advantageously used to prepare oils having improved stability characteristics. The process of the present invention is applicable to oils that benefit from added stability. For example, many oil compositions having moderate to high levels of UFAs can be prepared using the process of the present invention. In one embodiment, the process of the present invention is used to process seeds containing at least one polyunsaturated fatty acid having four or more carbon-carbon double bonds or a derivative thereof in an amount of at least about 0.4 wt. % based on a total weight of fatty acids. In another embodiment, the process of the present invention is used to process seeds having an α-linolenic acid (ALA) content up to about 3 wt. % based on a total weight of fatty acids. As described herein above, the stability of the oils of the present invention are determined by analytical measurements of PV, AV, OSI as well as sensory data comprising taste and smell. The description of the oilseed process of the present invention is divided into two sections. The first section describes the standard process steps as used in conventional seed oil processing. The second section describes the process modifications of the present invention. It would be understood by a person skilled in the art that the process improvements of the invention could be combined with the following standard process steps.

A. Process Steps

Generally, the following steps are used to process seed oils: preparation, cracking and dehulling, conditioning, milling, flaking or pressing, extracting, degumming, refining, bleaching and deodorizing. Each of these steps will be discussed in more detail below. The discussion details the process for each of the steps used currently in commercial application. A person of ordinary skill would know that the steps could be combined, used in a different order or otherwise modified.

Referring now to FIG. 1, the preparation step 1 includes the initial cleaning process, which removes stones, dirt, sticks, worms, and other debris collected during the harvest and storage of the seeds. Extraneous matter as described above can affect the quality of the final seed oil by containing compounds that negatively impact its chemical stability.

After the preparation step, the cleaned seeds 2 are cracked and dehulled. Cracking and dehulling can be accomplished in a variety of ways, which are well known in the art. For example, the seeds can be cracked and dehulled using a seed cracker/dehuller 3, which mechanically breaks the outer hulls and thus, exposes the inner seed meat. After cracking, the hulls can be separated from the seed meats by the dehuller. In one aspect, the dehuller can separate the hulls from the seed meats due to the density difference between the hulls and the seeds; the hulls are less dense than the seed meats. For example, the hulls and seed meats 4 can be fed to an aspirator 5 in which aspiration separates the hulls from the cracked seed meats. Dehulling reduces the crude fiber content, while increasing the protein concentration of the extracted seed meats. Optionally, after dehulling, the hulls 6 can be fed to a sieve 7 to separate hulls 8 from fines 9 generated in the cracking of the seeds. After recovery, the fines 9 can be added back to the seed meats 10 prior to conditioning.

Once the seeds are cracked and dehulled, the seed meats 10 are conditioned in conditioner 11 to make the seed meats pliable prior to further processing. Furthermore, the conditioning ruptures oil bodies. Further processing, in terms of flaking, grinding or other milling technology is made easier by having pliable seed meats at this stage. Generally, the seed meats have moisture removed or added in conditioner 11 in order to reach a 6-7 wt. % moisture level. If moisture is removed, this process is called toasting and if moisture is added, this process is called cooking. Typically, the seed meats are heated to 80-90° C. with steam 12 which is dry or wet depending on the direction of adjustment of the moisture content of the seed meats.

The conditioned seed meats 13 are then milled to a desired particle size or flaked to a desired surface area in mill or flaker 14. Flaking or milling is done to increase the surface area of the seed meats and also rupture the oil bodies thereby facilitating a more efficient extraction. Many milling technologies are appropriate and are well known in the art. The considerations when choosing a method of milling and a particle size for the ground seed are contingent upon, but not limited to the oil content in the seed and the desired efficiency of the extraction of the seed meats or the seed. When flaking the seed meats, the flakes are typically from about 0.1 to about 0.5 mm thick; from about 0.1 to about 0.35 mm thick; from about 0.3 to about 0.5 mm thick; or from about 0.2 to about 0.4 mm thick.

Optionally, after the seed meats are milled, they can be pressed. Typically, the seed meats are pressed when the oil content of the seed meats is greater than about 30 wt. % of the seeds. However, seeds with higher or lower oil contents can be pressed. The milled seed meats 15 can be pressed, for example, in a hydraulic press or mechanical screw (not shown). When pressed, the oil in the seed meats is pressed through a screen, collected and filtered. The oil collected is the first press oil. The seed meats from after pressing are called seed cake; the seed cake contains oil and can be subjected to solvent extraction.

After milling, flaking or optional pressing, the oil can be extracted from the milled or flaked seed meats 15 or seed cake by contacting them with a solvent 16 in an extractor 17. Preferably, n-hexane or iso-hexane is used as the solvent in the extraction process. This extraction can be carried out in a variety of ways, which are well known in the art. For example, the extraction can be a batch or continuous process and desirably is a continuous counter-current process. In a continuous counter-current process, the solvent contact with the seed meat leaches the oil into the solvent, providing increasingly more concentrated miscellas (i.e., solvent-oil), while the marc (i.e., solvent-solids) is contacted with miscellas of decreasing concentration. After extraction, the solvent is removed from the miscella 18 in a manner well known in the art. For example, distillation, rotary evaporation or a rising film evaporator and steam stripper or any suitable desolventizer 19 can be used for removing the solvent 20. After solvent removal, the crude oil 21 is usually heated at about 95° C. and about 60 mmHg. The deoiled seed meal 22 exiting the extractor 17 can be further processed and used as a protein source.

The crude oil 21 contains hydratable and nonhydratable phosphatides. Accordingly, the crude oil 21 is treated in a degummer 23 to remove the hydratable phosphatides by adding water 24 and heating to approximately 65° C. for approximately 30-60 minutes depending on the phosphatide concentration. Optionally, after heating with water, the crude oil and water mixture 25 can be centrifuged in centrifuge 26 to separate the degummed crude oil 27 from the water stream 28 containing the hydratable phosphatides. Optionally, phosphoric acid can be added to the degummed crude oil 27 to convert the nonhydratable phosphatides to hydratable phosphatides. Phosphoric acid forms metal complexes, which decreases the concentration of metal ions bound to phosphatides (metal complexed phosphatides are nonhydratable) and thus, converts nonhydratable phosphatides to hydratable phosphatides. Generally, if phosphoric acid is added in the degumming step, about 1 wt. % to about 5 wt. %; preferably, about 1 wt. % to about 2 wt. %; more preferably, about 1.5 wt. % to about 2 wt. % is used.

Furthermore, the degummed crude oil 27 contains free fatty acids (FFAs), which can be removed by a chemical (e.g., caustic) refining step. When FFAs react with basic substances (e.g., caustic) they form soaps that can be extracted into aqueous solution. Thus, the degummed crude oil 27 is heated to about 75° C. in caustic refiner 29 and sodium hydroxide or other caustic 30 is added with stirring and allowed to react for approximately 30 minutes. This is followed by stopping the stirring while continuing heat, and feeding the caustic mixture 31 to a centrifuge 32 to remove the aqueous layer 33 from the neutralized oil 34. The oil 34 is treated to remove soaps by water washing the oil until the aqueous layer is of neutral pH (not shown), or by treating the neutralized oil 34 with a silica or ion exchanger 35 to form a chemically refined oil 36. The oil 36 is dried at about 95° C. and about 10 mmHg.

Alternatively, rather than removing FFAs from the oil by chemical refining, the FFAs can be removed by physical refining. For example, the oil can be physically refined during deodorization. When physical refining is performed, the FFAs are removed from the oil by vacuum distillation performed at low pressure and relatively higher temperature. Generally, FFAs have lower molecular weights than triglycerides and thus, FFAs generally have lower boiling points and can be separated from triglycerides based on this boiling point difference.

Typically, when physical refining rather than chemical refining is performed, oil processing conditions are modified to achieve similar final product specifications. For example, when an aqueous acidic solution is used in the degumming step, a higher concentration of acid (e.g, up to about 100% greater concentration, preferably about 50% to about 100% greater concentration) may be needed due to the greater concentration of non-hydratable phosphatides that would otherwise be removed in a chemical refining step. In addition, a greater amount of bleaching material (e.g., up to about 100% greater amount, preferably about 50 to about 100% greater amount) is used.

The degummed crude oil 27 or chemically refined oil 36 is subjected to an absorption process 37 (e.g., bleached) to remove color bodies and pro-oxidant species such as peroxides, oxidation products, phosphatides, keratinoids, chlorphyloids, metals and remaining soaps formed in the caustic refining step or other processing steps. The bleaching process 37 comprises cooling the degummed oil 27 or chemically refined oil 36 under vacuum and adding a bleaching material 38 appropriate to remove the above referenced species (e.g, neutral earth (commonly termed natural clay or fuller's earth), acid-activated earth, activated carbon, activated clays and silicates) and a filter aid. The mixture is heated to about 90-110° C. and the bleaching material is contacted with the degummed oil 27 or chemically refined oil 36 for about 5-15 minutes. The amount of bleaching material used is from about 0.1 wt. % to about 2 wt. %; preferably, from about 0.3 wt. % to about 1.5 wt. %; even more preferably, from about 0.5 wt. % to about 1 wt. %. This level of bleaching clay balances the competing interests of absorbing the color bodies in the oil in order to achieve an acceptable oil color while not absorbing compounds that may provide added oxidative stability to the oil. After heating, the bleached oil or refined, bleached oil 39 is filtered and deodorized.

The bleached oil or refined, bleached oil 39 is fed to a deodorizer 40 to remove compounds with strong odors and flavors as well as remaining free fatty acids. The color of the oil can be further reduced by heat bleaching at elevated temperatures. Deodorization can be performed by a variety of techniques including batch and continuous deodorization units such as batch stir tank reactors, falling film evaporators, and wiped film evaporators. Generally, deodorization conditions are performed at about 160 to about 270° C. and about 0.1 to about 1.4 kPa. Deodorization conditions can use carrier gases 41 for the removal of volatile compounds (e.g., steam, nitrogen, argon, or any other gas that does not decrease the stability or quality of the oil). Deodorization time can range from milliseconds to hours. In one embodiment, the deodorization time is less than about 10, 50, 100, 200, 300, 400, 500, 600, 700, 800, 900 or 1000 milliseconds. In another embodiment, the deodorization time is less than about 160 minutes, preferably less than about 130 minutes, more preferably less than about 60 minutes, and even more preferably less than about 30 minutes. The oil is then cooled and filtered, resulting in refined, bleached, deodorized (RBD) oil 42.

Furthermore, when physical rather than chemical refining is used, a greater amount of FFAs are removed during the deodorization step, and the deodorizer conditions are modified to increase temperature and retention time and decrease the pressure of the deodorizer. For example, the temperature is increased by about 25° C.; oils can be deodorized at temperatures ranging from about 165° C. to about 300° C. In particular, oils can be deodorized at temperatures ranging from about 250° C. to about 280° C. or about 175° C. to about 205° C. In addition, the retention time of the oil in the deodorizer is increased by up to about 100%. For example, the retention time ranges from less than about 1, 5, 10, 30, 60, 90, 100, 110, 120, 130, 150, 180, 210 or 240 minutes. Additionally, the deodorizer pressure can be reduced to less than about $3 \times 10^{-4}$, $1 \times 10^{-3}$, $5 \times 10^{-3}$, 0.01, 0.02, 0.03, 0.04, 0.05, 0.06, 0.07, 0.08, 0.09, or 0.1 kPa. The deodorization step results in the refined, bleached and deodorized (RBD) oil 42.

Optionally, RBD oils can be stabilized by partial hydrogenation and/or by the addition of stabilizers. Partial hydrogenation stabilizes an oil by reducing the number of double bonds in the fatty acids contained in the oil and thus, reducing the chemical reactivity of the oil. However, partial hydrogenation does increase the concentration of undesirable trans-fatty acids. Stabilizers generally act to intercept free radicals formed during oxidation. Interception of the free radicals by stabilizers, which become either more stable free radicals or rearrange to become stable molecules, slows the oxidation of the oil due to the decreased concentration of highly reactive free radicals that can oxidize more fatty acid units.

B. Process Modification Parameters

The oilseed process of the present invention has improved upon the above standard oilseed process in a number of areas. Particularly, the focus of the improvements is to reduce the concentration of undesirable reaction products by adjusting the process conditions to minimize their production rather than removing them from the RBD oil after processing. Improvement of the processing conditions for the oilseed process is a multi-factorial problem; the following factors have been considered in developing the process of the present invention.

1. High Quality Seeds

The quality of the starting seeds is important for the processing of the seed oils. Quality seeds are those that have the extraneous debris (e.g. rocks, sticks, worms, insects, spiders, moths, etc.) removed and are unbroken and ripe. Green seeds can be a problem for processing due to the high chlorophyll level. Chlorophyll can be a pro-oxidant and aid in the degradation of the fatty acids in the oil that would not otherwise occur in ripe seeds with lower chlorophyll concentrations. One way to reduce the chlorophyll concentration is to store the seeds for about 30 to about 60 days after harvest before processing. Preferably, the stored seeds would experience a hard frost. However, longer storage time can affect the concentration of oxidation reaction products, which can start a chain reaction and increase the oxidation products over time. One of ordinary skill in the art can optimize seed storage for desired attributes.

Another characteristic of high quality seeds is that they are unbroken. Intact seeds help to minimize the oxidation of fatty acids inside the seed. Cracked seeds, are especially a problem, in that molecular oxygen is directly exposed to the internal seed containing the desired oil. Generally, intact seeds are more important for seeds that contain unsaturated fatty acids with multiple double bonds that are more unstable in regards to oxidation. Accordingly, the most desirable condition is to harvest the seeds at the peak of ripeness and process them when aforementioned variables are optimized appropriately. If stored, the optimal storage conditions are relatively low temperatures (e.g. less than about 20 to about 25° C.) and low oxygen exposure. As the seeds generate carbon dioxide, a closed silo without ventilation can provide acceptable storage conditions.

Optionally, the unbroken seeds can be separated from the broken seeds by use of a sieving step prior to cracking that separates the seeds according to shape. The regularity of the seeds shape wherein the unbroken seeds have a more regular shape and the broken seeds have a more irregular shape allow for easy separation.

Other characteristics of high quality seeds are the moisture content and the free fatty acid concentration. Typically, the harvested soybeans after drying have a moisture content of about 6 to about 15 wt. %. However, preferably, the seeds have a moisture content of about 6 to about 8 wt. %; more preferably, the moisture content is about 6 to about 7 wt. %; even more preferably, the moisture content is about 6 to about 6.5 wt. %. Furthermore, for example, soybeans have a free fatty acid concentration of about 0.05 to about 0.45 wt. %. Other seeds and sources of oil have varying optimum moisture content and free fatty acid content. Generally, the free fatty acid concentration increases with age of the seeds. Moreover, free fatty acids have a higher oxidation rate than fatty acids contained in triglycerides and seeds with less free fatty acids are subject to less hydrolysis after drying. The lower oxidation rate and lower hydrolysis resulting from lower contents of free fatty acids produce smaller amounts of non-volatile aldehydes and/or ketones. Furthermore, free fatty acids in oil can lower the smoke point temperature. However, preferably, the soybeans have a free fatty acid concentration of up to about 0.25 wt. %; more preferably, a free fatty acid concentration of up to about 0.16 wt. %; even more preferably, a free fatty acid concentration of up to about 0.05 wt. %.

Another characteristic of high quality seeds is the phosphorus content of the seeds. Typically, the phosphorus content of soybeans is about 500 ppm to about 800 ppm. The majority of this phosphorus content is hydratable and non-hydratable phosphatides. The lower concentration of phosphorus generally leads to better oilseed processing at all the steps due to the lower concentrations of the phosphatides (i.e., gums). In particular, the oilseeds with low phosphorus content degum better than oilseeds with higher phosphorus content. Furthermore, a higher phosphorus content in the oil adds to the color degradation during heating, such as during deodorization to produce the RBD oil or during deep-frying with the RBD oil.

2. Minimize Oxygen Exposure

As discussed herein above, the exposure of the seed and oil during processing and storage to oxygen can affect the stability of the oil. For example, once the seed is cracked, oxygen can react with the PUFAs contained in the seed meat. In particular, after the surface area of the seed meat is increased (e.g., by flaking or grinding) it is preferred to minimize the exposure to oxygen during the oil processing. However, it will be understood by persons skilled in the art that minimization of oxygen exposure may occur independently at each of the oilseed processing steps. Oxygen exposure can be minimized by replacing a small to a large portion of the headspace of the vessels or other processing equipment with an inert gas. Furthermore, oxygen exposure can be minimized by purge of the vessels or other processing equipment, solvents and reagents that contact the oil with an inert gas. The inert gas can be nitrogen, helium, neon, argon, krypton, xenon, carbon dioxide, carbon monoxide, hydrogen cyanide, or mixtures thereof. Oxygen exposure minimization can also be accomplished by applying a vacuum or partial vacuum independently at each of the oilseed processing steps.

The oil seeds may be stored in an environment where temperature, humidity and exposure to oxygen are controlled. This can be achieved through contacting the seeds with an inert gas, applied vacuum, or through the use of packaging, which prevents or minimizes exposure to air or ambient humidity.

For example, during the extraction step, the extraction vessel can be purged with an inert gas and/or the extraction fluid can be purged with an inert gas. In addition, in one embodiment, the extraction fluid and the inert gas can be the same (e.g, supercritical carbon dioxide). Further, the extraction fluid is selected so the density of the extraction fluid is sufficient to extract at least 50 wt. % of the crude oil from the oil-containing material.

In one process embodiment, the seed is treated with carbon monoxide or nitrogen prior to cracking and dehulling. This treatment minimizes the oxygen that is adsorbed on the seed. Moreover, without being bound by theory, it is believed that particularly carbon monoxide treatment displaces the oxygen associated with metals, which are cofactors for enzymes contained in the seed that could support or promote oxidation. By displacing the oxygen with carbon monoxide, which depending on the metal can have a greater binding affinity than oxygen, the enzymes cannot actively catalyze degradation of the fatty acids contained in the seed. The treatment of the seed with carbon monoxide or nitrogen is carried out for a sufficient period of time to exchange a substantial amount of oxygen for carbon monoxide or nitrogen. For example, in one case, the seed was treated with carbon monoxide for several hours up to a few days. Due to the small surface area of the seed, the rate of exchange of carbon monoxide or nitrogen for oxygen is limited.

Therefore, the present invention is also directed to a method of increasing the oxidative stability of oil seeds before the seeds are processed into an oil, the method comprising reducing the temperature of the seeds to slow oxidation or storing the seeds in the presence of an inert gas capable of complexing at least one transition metal in the seeds; in one embodiment, the inert gas comprises carbon monoxide. This method can be used for oil seeds which comprise at least 2 wt. % unsaturated fatty acid having two or more carbon-carbon double bonds; particularly, wherein the oil seed is from canola, soybean, corn, rapeseed, cottonseed, peanut, sunflower, olive, coconut, palm kernel or palm; more particularly from canola, soybean, or corn; even more particularly, from soybean.

In another embodiment, the seeds or seed meats are treated with an inert gas, such as carbon monoxide or nitrogen, after cracking and dehulling to further minimize oxygen adsorption.

In one embodiment, the seeds or seed meats are treated with an inert gas (e.g., carbon monoxide or nitrogen) after milling, grinding, and/or flaking.

Additionally, the bleaching material can be deoxygenated by methods that retain a sufficient amount of water in the bleaching earth so it has acceptable wetting characteristics. In addition, the deoxygenation method retains the three-dimensional structure of the bleaching material so it has acceptable adsorption properties. This deoxygenation of the bleaching material can be important due to the relatively higher temperatures of the bleaching step wherein a small amount of adsorbed oxygen could affect the oxidation rates.

Moreover, oil can be treated with carbon monoxide (CO) to replace a portion or a substantial amount of the air in the headspace of the vessel. The treatment with CO displaces molecular oxygen complexed to metal ions. In addition, upon an excess of CO in the vessel (e.g., CO purge) the CO complexed to the metal ion acts as an oxygen scavenger.

The amount of inert gas or applied vacuum required to minimize the oxygen concentration varies widely with both concentration and identity of the UFAs contained in the seed meat. Since the odor and flavor threshold may vary from below about 0.1 ppb to above about 100 ppm depending on the volatile causing the off-flavor or odor, what is a minimized oxygen concentration for one volatile and volatile substrate (i.e., UFA) combination may not be a minimized oxygen concentration for another such combination. However, the total oxygen present in the process environment in which the substrate resides should not exceed the threshold needed in order to meet product stability, flavor and/or odor requirements.

The minimum oxygen concentration level may also be affected by alternate reactions competing for free oxygen, particularly at low oxygen concentrations. Under such situations, enzymes present in the reaction mixture can catalyze reactions different than those, which produce the volatiles that give off-flavor and odor, and as a result those enzymes can be inhibited, denatured, and inactivated. The spent enzymes are incapable of catalyzing the undesirable reactions to any significant extent even if sufficient oxygen is available.

As a result, the oxygen concentration should be minimized to a level sufficient to achieve desired product characteristics such as stability, flavor and odor as measured by, for example, peroxide value, oil stability index, or sensory panel assessments. It is well within the purview of one skilled in the art to determine appropriate minimum oxygen levels required to meet those desired product characteristics.

Any one or more steps of the process described in section II. can be carried out in the presence of an inert gas to minimize oxygen concentration. For example, any two, any three, any four, any five or more steps of the process of the present invention can be carried out in the presence of an inert gas. In one embodiment, preferably, the process is carried out under conditions wherein the crude oil has a peroxide value of 0 meq/kg.

3. Metal Concentration

The concentration of metals can affect the stability of the oil during processing and storage. As discussed herein above, metals are proposed as catalysts for oxidation of UFAs in the oil; the UFA oxidation products decrease the stability of the oil. The concentration of metals can affect the rate of UFA oxidation by orders of magnitude, however, the specific metal, oxidation state and metal complexation are important factors in assessing the efficiency of the metal catalysts. Due to its effect on oxidation rate, it is preferred to minimize the concentration of metals in the oil, in particular, the concentration of transition metals. Exemplary transition metals, which can affect the oxidation rate are iron, chromium, molybdenum, zinc, nickel, copper, manganese, tungsten and the like.

There are a variety of factors which can increase the concentration of transition metals. For example, the construction material of the process vessels can leach metals into the oil during processing. Accordingly, it is presently preferred that the process vessels be constructed of materials that minimize the amount of metals leached into the oil. Thus, appropriate construction materials are 316 stainless steel, which may or may not have been treated to provide acid resistance, Hastaloy B, Hastaloy C, glass-lined vessels, and the like. Preferably, all the process vessels are constructed of materials, which would reduce the contact of the seed meats, flakes or oil to metal sources. In particular, minimizing the oil's contact with metals during process steps taking place at temperatures greater than about 25° C. is desirable.

Another source of transition metals can be the reagents, such as the aqueous sodium hydroxide and phosphoric acid. In order to minimize the increase in oxidation rate, use of reagents wherein the metal concentration is minimized is preferred.

To reduce the catalytic effect of the transition metals in the oil, carbon monoxide or other complexing agents are added to the oil. Carbon monoxide and complexing agents tie up the active binding sites on the metal atoms. Thus, it is preferred that these agents are added at a level wherein substantially all the active sites on the metals are complexed and decrease the rate of an oxidation reaction. Exemplary complexing agents are phosphoric acid, ethylene diamine tetraacetic acid (EDTA), nitrilotriacetic acid (NTA), citric acid, malic acid, lecithins, and derivatives thereof (e.g., salts or esters thereof). The amount of complexing agent needed to complex substantially all the metal ions depends on the binding coefficient of the complexing agent with the specific metal. However, a general rule is that the complexing agent is added at a concentration of about 10 to about 100 times the concentration of the transition metals which are complexed.

The complexing agents can be added at any point in the process wherein the catalytic activity of the metals needs to be reduced. For example, in a presently preferred embodiment, a complexing agent is added during the degumming process to complex metals and convert non-hydratable phosphatides to hydratable phosphatides, which will then react with water in the degumming step. Furthermore, during the caustic refining step metals are removed from the oil by complexing with hydroxide ions and thus, partitioning into the aqueous phase which is separated from the oil. Also, metals are removed from the oil during the bleaching step by becoming adsorbed on the absorbent material. Preferably, the metal concentrations for each metal analyzed in the RBD oil is less than about 0.01, 0.02, 0.03, 0.04, 0.05, 0.06, 0.07, 0.08, 0.09 or 0.1 ppm.

In addition to metals as promoters of oxidation, there are various other radical and non-radical initiators of oxidation reactions. Exemplary radical initiators of oxidative processes are superoxide, hydroxyl radical, hydroperoxyl radical, lip radical, lipid peroxyl radical, lipid alkoxyl radical, nitrogen dioxide, nitric oxide, thiyl radical, protein radical, and combinations thereof. Various non-radical initiators of oxidative processes are hydrogen peroxide, singlet oxygen, ozone, lipid hydroperoxide, iron-oxygen complexes, hypochlorite, and combinations thereof.

4. Minimize Heat Exposure

An increase in the temperature of the oil during processing or storage increases the oxidation rate, isomerization rate, oligomerization rate, and general degradation rate, and thus, decreases the stability of the oil. As described herein above, for every 10° C. increase in temperature, the rate of oxidation doubles. Therefore, it is presently preferred to lower the temperature of the oil during processing or storage where possible. Another approach is to decrease the time the oil is subjected to a higher temperature, if a higher temperature is necessary. A higher temperature could be necessary where a transformation requires a higher temperature for chemical or physical reasons (e.g., a necessary reaction proceeds at a reasonable rate or an impurity can be removed in a reasonable amount of time at a higher temperature).

Minimizing the isomerization of unsaturated fatty acids (UFAs), especially the isomerization from naturally occurring cis-fatty acids to trans-fatty acids, or conjugated fatty acids, is important because trans-fatty acids have a three-dimensional structure that gives them undesirable physical characteristics. These undesirable physical characteristics lead trans-fatty acids to have negative health impacts, and thus, minimizing the isomerization of cis-fatty acids to trans-fatty acids is preferred.

During certain steps a minimum temperature is required to allow the oil to move through the process. For example, in the pressing or flaking step, the pressing or flaking requires work input and thus, the seed meats are heated to less than about 55° C. upon the input of work. The seed meats are not subsequently cooled as the additional heat is advantageous to the flow of the seeds through the process and to facilitate oil body rupture of the seeds. However, the seed meats are not heated to a high enough temperature to decompose the protein.

In an exemplary embodiment, the crude oil is reacted with an acidic aqueous solution at a temperature of at least about 35° C. and in the presence of an inert gas to minimize oxygen concentration, to form a degummed oil 27. Further, the temperature of the degumming step can range from about 35 to about 75° C., from about 45 to about 75° C., or from about 50 to about 60° C.

Advantageously, the oil 27 or 36 is bleached under conditions and a time that minimizes the oxidation rate of the fatty acids and minimizes the isomerization of the UFAs. The oil is bleached at about 80° C. to about 120° C. at a pressure of about 0.6 to 7 kPa; preferably, at about 95° C. to about 110° C. at a pressure of about 2.5 to 4.0 kPa. When processing oils having SDA concentrations greater than about 10 wt. %, preferably, the bleaching is carried out at about 95° C. to about 115° C.; more preferably, at about 100° C. to about 115° C.; even more preferably, at about 110° C. When processing oils having ALA concentrations less than about 3 wt. %, preferably, the bleaching is carried out at about 95° C. to about 115° C.; more preferably, at about 105° C. to about 110° C.; even more preferably, at about 110° C. The bleaching is carried out for about 10 to about 60 minutes; preferably, for about 20 to about 30 minutes; more preferably, for about 25 to about 30 minutes.

Another step wherein optimizing the exposure to heat is important is the deodorization step. As the deodorization step removes many lower boiling components in the triglyceride mixture, the temperature of the step is relatively high. However, the relationship of the temperature and time of deodorization is important. For example, oils containing UFAs that are more sensitive to high thermal degradation can be deodorized at a lower temperature for a longer time. One desirable effect of reducing the exposure to heat (either by reducing the temperature and/or reducing the time at temperature) is that a higher proportion of tocopherols in the oil is retained. Another desirable effect of minimizing the exposure to heat is that the isomerization of cis-fatty acids to trans-fatty acids is minimized; desirably, the trans-fatty acid content is less than about 1 wt. %.

In a presently preferred embodiment, oil 39 can be deodorized at a temperature from about 160° C. to about 260° C.; preferably, from about 180° C. to about 240° C.; more preferably, at about 210° C. to about 230° C. Additionally, the deodorization step is carried out under vacuum, at absolute pressures of less than about 0.1, 0.2, 0.3, 0.4, 0.5, 0.6, 0.7, 0.8, 0.9, 1.0, 1.1, 1.2, 1.3 or 1.4 kPa; preferably, less than about 0.1, 0.2, 0.3, 0.4 or 0.5 kPa; more preferably, less than about 0.1 or 0.2 kPa. The oil 39 is deodorized for less than about 1, 5, 10, 30, 60, 90, 100, 110, 120 or 130 minutes. Alternatively, the deodorization can be carried out at a temperature from about 220 to about 270° C. at a pressure of less than about 0.1, 0.2, 0.3, 0.4, 0.5, 0.6, 0.7, 0.8, 0.9, 1.0, 1.1, 1.2, 1.3 or 1.4 kPa for less than about 1, 5, 10, 20, 30, 40, 50 or 60 minutes.

In another embodiment, oils having an ALA content of less than about 3 wt. % based on the total weight of fatty acids in the composition are deodorized at a temperature from about 245° C. to about 265° C.; preferably, at a temperature from about 250° C. to about 260° C.; particularly, at a temperature of about 255° C. In this step, due to the relatively high heat, the oil 39 is deodorized at the above conditions for about 30 to about 60 minutes; preferably, for about 30 to about 45 minutes; more preferably, for about 30 to about 35 minutes.

In various preferred embodiments, the deodorization is carried out as a continuous process. In this process, the oil 39 is deodorized in a continuous deodorizer 40 at a temperature from about 200° C. to about 260° C.; preferably, from about 220° C. to about 255° C.; more preferably, from about 240° C. to about 250° C. Typically, the residence time of the oil 39 in the deodorizer 40 is up to about 5, 10, 15, 20, 25, 30 or more minutes. Preferably, the residence time of the oil in the deodorizer is about 25 to about 30 minutes.

In one exemplary embodiment, any one of the process steps described above can be combined with the deodorization step wherein the refined, bleached oil is deodorized to form a non-animal oil having an anisidine value of less than about 3 and comprising less than 1 wt. % trans-fatty acid based on the total weight of fatty acids or derivatives thereof in the non-animal oil.

5. Minimize UV Light Exposure

As discussed herein above, ultra-violet (UV) light can cause initiation of UFA oxidation. Accordingly, it is presently preferred to minimize the UV light exposure of the seed meats and oil during processing and storage. Since the seed hulls are opaque and protect the seed meats from UV exposure, preferably, upon seed cracking, the UV light exposure of the seed meats and oil is minimized. In one particular embodiment, the conveyor system, and machinery for cracking, conditioning, pressing, flaking or grinding are opaque and protect the seed meats from UV light exposure. Generally, once the seed meats enter the processing system with the extraction step 17, the processing vessels are opaque and limit the exposure of the oil to light. Once processed, the RBD oil 42 is stored in amber bottles or opaque containers to minimize the UV light exposure.

6. Stabilization

Once processed, the RBD oils 42 can be stabilized in a variety of ways known in the art. One method of stabilization is partial hydrogenation. Partial hydrogenation stabilizes the RBD oil by hydrogenating a portion of the double bonds in the UFAs to transform them to single bonds. In one preferred embodiment, the RBD oil of the present invention is partially hydrogenated to produce an oil that has a trans-fatty acid content less than about 0.1, 0.2, 0.3, 0.4, 0.5, 0.6, 0.7, 0.8, 0.9 or 1 wt. % based on a total weight fatty acids in the composition.

Furthermore, stabilizers can be added to the RBD oils or to the seed meats or oil at other stages of processing. For example, stabilizers can be added to the whole seeds 2, seed meats 10, flakes 15, miscella 18, crude oil 21, degummed oil 27, refined oil 36, bleached oil 39, deodorized oil, refined and bleached oil 39, or refined, bleached and deodorized oil 42. Stabilizers can be added to RBD oils that have been partially hydrogenated or oils that have not been partially hydrogenated.

Generally, stabilizers are antioxidants. Antioxidants are substances that, when present at low concentration compared to the concentration of the fatty acids, significantly delay or prevent oxidation of the fatty acids. The effectiveness of a specific stabilizer depends on the fatty acids, the environment and the like. Usually, empirical data is used to select a stabilizer for an oil. In some cases, more than one stabilizer is used wherein the stabilizers work together to produce an effect which is greater than that achieved using the same amount of either stabilizer.

Exemplary stabilizers are anoxomer, ascorbic acid, ascorbyl palmitate, ascorbyl stearate, butylated hydroxyanisole (BHA), butylated hydroxytoluene (BHT), t-butyl hydroquinone (TBHQ), 3-t-butyl-4-hydroxyanisole, calcium ascorbate, calcium disodium EDTA, catalase, cetyl gallate, citric acid, clove extract, coffee bean extract, 2,6-di-t-butylphenol, dilauryl thiodipropionate, disodium citrate, disodium EDTA, dodecyl gallate, edetic acid, erythorbic acid, 6-ethoxy-1,2-dihydro-2,2,4-trimethylquinoline, ethyl gallate, ethyl maltol, eucalyptus extract, fumaric acid, gentian extract, glucose oxidase, heptyl paraben, hesperetin, 4-hydroxymethyl-2,6-di-t-butylphenol, N-hydroxysuccinic acid, isopropyl citrate, lecithin, lemon juice, lemon juice solids, maltol, methyl gallate, methylparaben, octyl gallate, phosphatidylcholine, phosphoric acid, pimento extract, potassium bisulfite, potassium lactate, potassium metabisulfite, potassium sodium tartrate anhydrous, propyl gallate, rice bran extract, rosemary extract, sage extract, sodium ascorbate, sodium erythorbate, sodium hypophosphate, sodium ascorbate, sodium erythorbate, sodium hypophosphate, sodium metabisulfite, sodium sulfite, sodium thiosulfate pentahydrate, soy flour, sucrose, L-tartaric acid, α-terpineol, tocopherol, D-α-tocopherol, DL-α-tocopherol, tocopheryl acetate, D-α-tocopheryl acetate, DL-α-tocopheryl acetate, 2,4,5-trihydroxybutyrophenone, wheat germ oil and the like.

In one embodiment, the stabilizer for the oil is ascorbic acid, ascorbyl palmitate, tocopherols, TBHQ, BHT, BHA or mixtures thereof. Typically, the concentration of the stabilizer or mixture of stabilizers is less than the acceptable level of the compound in foods. Particularly, the concentration of the stabilizer or mixture of stabilizers is up to about 1000 ppm, wherein a person of ordinary skill could easily determine the correct concentration.

In one embodiment, an oil composition having a content of fatty acids having four or more double bonds of at least about 0.4 wt. % based on the total weight of fatty acids in the composition, has added citric acid stabilizer of at least about 25, 30, 35, 40, 45, 50, 55, 60, 65, 70, 75, 100, 125, 150, 175, 200, 300, 400 or 500 ppm (measured on a weight of citric acid to volume of oil basis).

Various embodiments of the process of the invention are depicted below:

| Step | E1 | E2 | E3 | E4 | E5 | E6 | E7 | E8 | E9 |
|---|---|---|---|---|---|---|---|---|---|
| seed treatment | X | X | X | X | X | X | X | X | X |
| cracking and dehulling | X | | | | | | | | |
| conditioning | | X | | | | | | | |
| Milling | | | X | | | | | | |
| Flaking/pressing | | | | X | | | | | |
| extracting | | | | | X | | | | |
| degumming | | | | | | X | | | |
| refining | | | | | | | X | | |
| bleaching | | | | | | | | X | |
| deodorizing | | | | | | | | | X |

| Step | E10 | E11 | E12 | E13 | E14 | E15 | E16 | E17 | E18 |
|---|---|---|---|---|---|---|---|---|---|
| seed treatment | | | | | | | | | |
| cracking and dehulling | X | X | X | X | X | X | X | X | |
| conditioning | X | | | | | | | | X |
| milling | | X | | | | | | | X |
| flaking/pressing | | | X | | | | | | |
| extracting | | | | X | | | | | |
| degumming | | | | | X | | | | |
| refining | | | | | | X | | | |
| bleaching | | | | | | | X | | |
| deodorizing | | | | | | | | X | |

| Step | E19 | E20 | E21 | E22 | E23 | E24 | E25 | E26 | E27 |
|---|---|---|---|---|---|---|---|---|---|
| seed treatment | | | | | | | | | |
| cracking and dehulling | | | | | | | | | |
| conditioning | X | X | X | X | X | X | | | |
| milling | | | | | | | X | X | X |
| flaking/pressing | X | | | | | | X | | |
| extracting | | X | | | | | | X | |
| degumming | | | X | | | | | | X |
| refining | | | | X | | | | | |
| bleaching | | | | | X | | | | |
| deodorizing | | | | | | X | | | |

| Step | E28 | E29 | E30 | E31 | E32 | E33 | E34 | E35 | E36 |
|---|---|---|---|---|---|---|---|---|---|
| seed treatment | | | | | | | | | |
| cracking and dehulling | | | | | | | | | |
| conditioning | | | | | | | | | |
| milling | X | X | X | | | | | | |
| flaking/pressing | | | | X | X | X | X | X | |
| extracting | | | | X | | | | | |
| degumming | | | | | X | | | | |
| refining | X | | | | | X | | | |
| bleaching | | X | | | | | X | | X |
| deodorizing | | | X | | | | | X | X |

| Step | E37 | E38 | E39 | E40 | E41 | E42 | E43 | E44 | E45 |
|---|---|---|---|---|---|---|---|---|---|
| seed treatment | | | | | | | | | |
| cracking and dehulling | | | | | | | | | |
| conditioning | | | | | | | | | |
| milling | | | | | | | | | |
| flaking/pressing | | | | | | | | | |
| extracting | X | X | X | X | | | | | |
| degumming | X | | | | X | X | X | | |
| refining | | X | | | X | | | X | X |
| bleaching | | | X | | | X | | X | |
| deodorizing | | | | X | | | X | | X |

| Step | E46 | E47 | E48 | E49 | E50 | E51 | E52 | E53 | E54 |
|---|---|---|---|---|---|---|---|---|---|
| seed treatment | | X | X | X | X | X | X | X | X |
| cracking and dehulling | | X | X | X | X | X | X | X | X |
| conditioning | | X | | | | | | | |
| milling | | | X | | | | | | |
| flaking/pressing | | | | X | | | | | |

-continued

|  | E46 | E47 | E48 | E49 | E50 | E51 | E52 | E53 | E54 |
|---|---|---|---|---|---|---|---|---|---|
| extracting |  |  |  | X |  |  |  |  |  |
| degumming | X |  |  |  | X |  |  |  |  |
| refining |  |  |  |  |  | X |  |  |  |
| bleaching | X |  |  |  |  |  |  | X |  |
| deodorizing | X |  |  |  |  |  |  |  | X |

| Step | E55 | E56 | E57 | E58 | E59 | E60 | E61 | E62 | E63 |
|---|---|---|---|---|---|---|---|---|---|
| seed treatment |  |  |  |  |  |  |  |  |  |
| cracking and dehulling | X | X | X | X | X | X | X |  |  |
| conditioning | X | X | X | X | X | X | X | X | X |
| milling | X |  |  |  |  |  |  | X | X |
| flaking/pressing |  | X |  |  |  |  |  | X |  |
| extracting |  |  | X |  |  |  |  |  | X |
| degumming |  |  |  | X |  |  |  |  |  |
| refining |  |  |  |  | X |  |  |  |  |
| bleaching |  |  |  |  |  | X |  |  |  |
| deodorizing |  |  |  |  |  |  | X |  |  |

| Step | E64 | E65 | E66 | E67 | E68 | E69 | E70 | E71 | E72 |
|---|---|---|---|---|---|---|---|---|---|
| seed treatment |  |  |  |  |  |  |  |  |  |
| cracking and dehulling |  |  |  |  |  |  |  |  |  |
| conditioning | X | X | X | X |  |  |  |  |  |
| milling | X | X | X | X | X | X | X | X | X |
| flaking/pressing |  |  |  |  | X | X | X | X | X |
| extracting |  |  |  |  | X |  |  |  |  |
| degumming | X |  |  |  |  | X |  |  |  |
| refining |  | X |  |  |  |  | X |  |  |
| bleaching |  |  | X |  |  |  |  | X |  |
| deodorizing |  |  |  | X |  |  |  |  | X |

| Step | E73 | E74 | E75 | E76 | E77 | E78 | E79 | E80 | E81 |
|---|---|---|---|---|---|---|---|---|---|
| seed treatment |  |  |  |  |  |  |  |  |  |
| cracking and dehulling |  |  |  |  |  |  |  |  |  |
| conditioning |  |  |  |  |  |  |  |  |  |
| milling |  |  |  |  |  |  |  |  |  |
| flaking/pressing | X | X | X | X |  |  |  |  |  |
| extracting | X | X | X | X | X | X | X |  |  |
| degumming | X |  |  | X | X | X |  | X | X |
| refining |  | X |  |  | X |  |  | X | X |
| bleaching |  |  | X |  |  | X |  | X |  |
| deodorizing |  |  |  | X |  |  | X |  | X |

| Step | E82 | E83 | E849 | E85 | E86 | E87 | E88 | E89 | E90 |
|---|---|---|---|---|---|---|---|---|---|
| seed treatment |  | X | X | X | X | X | X | X | X |
| cracking and dehulling |  |  |  |  |  |  |  |  |  |
| conditioning |  | X | X | X | X | X | X |  |  |
| milling |  | X |  |  |  |  |  |  | X |
| flaking/pressing |  |  | X |  |  |  |  |  | X |
| extracting |  |  |  | X |  |  |  |  |  |
| degumming |  |  |  |  | X |  |  |  |  |
| refining | X |  |  |  |  | X |  |  |  |
| bleaching | X |  |  |  |  |  | X |  |  |
| deodorizing | X |  |  |  |  |  |  | X |  |

| Step | E91 | E92 | E93 | E94 | E95 | E96 | E97 | E98 | E99 |
|---|---|---|---|---|---|---|---|---|---|
| seed treatment | X | X | X | X | X | X | X | X | X |
| cracking and dehulling |  |  |  |  |  |  |  |  |  |
| conditioning |  |  |  |  |  |  |  |  |  |
| milling | X | X | X | X | X |  |  |  |  |
| flaking/pressing |  |  |  |  |  | X | X | X | X |
| extracting | X |  |  |  |  | X |  |  |  |
| degumming |  | X |  |  |  |  | X |  |  |
| refining |  |  | X |  |  |  |  | X |  |
| bleaching |  |  |  | X |  |  |  |  | X |
| deodorizing |  |  |  |  | X |  |  |  |  |

-continued

| Step | E100 | E101 | E102 | E103 | E104 | E105 | E106 | E107 | E108 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | | | | | | | | | |
| flaking/pressing | X | | | | | | | | |
| extracting | | X | X | X | X | | | | |
| degumming | | X | | | | X | X | X | |
| refining | | | X | | | X | | | X |
| bleaching | | | | X | | | X | | X |
| deodorizing | X | | | | X | | | X | |

| Step | E109 | E110 | E111 | E112 | E113 | E114 | E115 | E116 | E117 |
|---|---|---|---|---|---|---|---|---|---|
| seed treatment | X | X | | | | | | | |
| cracking and dehulling | | | X | X | X | X | X | X | |
| conditioning | | | | | | | | | |
| milling | | | X | X | X | X | X | | |
| flaking/pressing | | | X | | | | | | X |
| extracting | | | | X | | | | | X |
| degumming | | | | | X | | | | |
| refining | X | | | | | X | | | |
| bleaching | | X | | | | | | X | |
| deodorizing | X | X | | | | | | | X |

| Step | E118 | E119 | E120 | E121 | E122 | E123 | E124 | E125 | E126 |
|---|---|---|---|---|---|---|---|---|---|
| seed treatment | | | | | | | | | |
| cracking and dehulling | X | X | X | X | X | X | X | X | X |
| conditioning | | | | | | | | | |
| milling | | | | | | | | | |
| flaking/pressing | X | X | X | X | | | | | |
| extracting | | | | | X | X | X | X | |
| degumming | X | | | | X | | | | X |
| refining | | X | | | | X | | | X |
| bleaching | | | X | | | | X | | |
| deodorizing | | | | X | | | | X | |

| Step | E127 | E128 | E129 | E130 | E131 | E132 | E133 | E134 | E135 |
|---|---|---|---|---|---|---|---|---|---|
| seed treatment | | | | | | | | | |
| cracking and dehulling | X | X | X | X | X | | | | |
| conditioning | | | | | | X | X | X | X |
| milling | | | | | | | | | |
| flaking/pressing | | | | | | X | X | X | X |
| extracting | | | | | | X | | | |
| degumming | X | X | | | | | | X | |
| refining | | | X | X | | | | X | |
| bleaching | X | | X | | X | | | | X |
| deodorizing | | X | | X | X | | | | |

| Step | E136 | E137 | E138 | E139 | E140 | E141 | E142 | E143 | E144 |
|---|---|---|---|---|---|---|---|---|---|
| seed treatment | | | | | | | | | |
| cracking and dehulling | | | | | | | | | |
| conditioning | X | X | X | X | X | X | X | X | X |
| milling | | | | | | | | | |
| flaking/pressing | X | | | | | | | | |
| extracting | | X | X | X | X | | | | |
| degumming | | X | | | | X | X | X | |
| refining | | | X | | | X | | | X |
| bleaching | | | | X | | | X | | X |
| deodorizing | X | | | | X | | | X | |

| Step | E145 | E146 | E147 | E148 | E149 | E150 | E151 | E152 | E153 |
|---|---|---|---|---|---|---|---|---|---|
| seed treatment | | | | | | | | | |
| cracking and dehulling | | | | | | | | | |
| conditioning | X | X | | | | | | | |
| milling | | | X | X | X | X | X | X | X |
| flaking/pressing | | | | | | | | | |
| extracting | | | X | X | X | X | | | |

-continued

| | | | | | | | | |
|---|---|---|---|---|---|---|---|---|
| degumming | | | X | | | | X | X | X |
| refining | X | | | X | | | X | | |
| bleaching | | X | | | X | | | X | |
| deodorizing | X | X | | | | X | | | X |

| Step | E154 | E155 | E156 | E157 | E158 | E159 | E160 | E161 | E162 |
|---|---|---|---|---|---|---|---|---|---|
| seed treatment | | | | | | | | | |
| cracking and dehulling | | | | | | | | | |
| conditioning | | | | | | | | | |
| milling | X | X | X | | | | | | |
| flaking/pressing | | | | X | X | X | X | X | X |
| extracting | | | | | | | | | |
| degumming | | | | X | X | X | | | |
| refining | X | X | | X | | | X | X | |
| bleaching | X | | X | | X | | X | | X |
| deodorizing | | X | X | | | X | | X | X |

| Step | E163 | E164 | E165 | E166 | E167 | E168 | E169 | E170 | E171 |
|---|---|---|---|---|---|---|---|---|---|
| seed treatment | | | | | X | X | X | X | X |
| cracking and dehulling | | | | | X | X | X | X | X |
| conditioning | | | | | X | X | X | X | X |
| milling | | | | | X | | | | |
| flaking/pressing | | | | | | X | | | |
| extracting | X | X | X | | | | X | | |
| degumming | | | | X | | | | X | |
| refining | X | X | | X | | | | | X |
| bleaching | X | | X | X | | | | | |
| deodorizing | | X | X | X | | | | | |

| Step | E172 | E173 | E174 | E175 | E176 | E177 | E178 | E179 | E180 |
|---|---|---|---|---|---|---|---|---|---|
| seed treatment | X | X | X | X | X | X | X | X | X |
| cracking and dehulling | X | X | X | X | X | X | X | X | X |
| conditioning | X | X | | | | | | | |
| milling | | | X | X | X | X | X | X | |
| flaking/pressing | | X | | | | | | | X |
| extracting | | | X | | | | | | X |
| degumming | | | | X | | | | | |
| refining | | | | | X | | X | | |
| bleaching | X | | | | | | X | | |
| deodorizing | | X | | | | | | X | |

| Step | E181 | E182 | E183 | E184 | E185 | E186 | E187 | E188 | E189 |
|---|---|---|---|---|---|---|---|---|---|
| seed treatment | X | X | X | X | X | X | X | X | X |
| cracking and dehulling | X | X | X | X | X | X | X | X | X |
| conditioning | | | | | | | | | |
| milling | | | | | | | | | |
| flaking/pressing | X | X | X | X | | | | | |
| extracting | | | | | X | X | X | X | |
| degumming | X | | | | | X | | | X |
| refining | | X | | | | | X | | X |
| bleaching | | | X | | | | | X | |
| deodorizing | | | | X | | | | | |

| Step | E190 | E191 | E192 | E193 | E194 | E195 | E196 | E197 | E198 |
|---|---|---|---|---|---|---|---|---|---|
| seed treatment | X | X | X | X | X | X | X | X | X |
| cracking and dehulling | X | X | X | X | X | | | | |
| conditioning | | | | | | X | X | X | X |
| milling | | | | | | X | X | X | X |
| flaking/pressing | | | | | | X | | | |
| extracting | | | | | | | X | | |
| degumming | X | X | | | | | | X | |
| refining | | | X | X | | | | | X |
| bleaching | X | | X | | X | | | | |
| deodorizing | | X | | X | X | | | | |

| Step | E199 | E200 | E201 | E202 | E203 | E204 | E205 | E206 | E207 |
|---|---|---|---|---|---|---|---|---|---|
| seed treatment | X | X | X | X | X | X | X | X | X |
| cracking and dehulling | | | | | | | | | |
| conditioning | X | X | X | X | X | X | X | X | X |
| milling | X | X | | | | | | | |
| flaking/pressing | | | X | X | X | X | X | | |
| extracting | | | | X | | | | X | X |
| degumming | | | | | X | | | X | |
| refining | | | | | | X | | | X |
| bleaching | X | | | | | | X | | |
| deodorizing | | X | | | | | X | | |

| Step | E208 | E209 | E210 | E211 | E212 | E213 | E214 | E215 | E216 |
|---|---|---|---|---|---|---|---|---|---|
| seed treatment | X | X | X | X | X | X | X | X | X |
| cracking and dehulling | | | | | | | | | |
| conditioning | X | X | X | X | X | X | X | X | |
| milling | | | | | | | | | X |
| flaking/pressing | | | | | | | | | X |
| extracting | X | X | | | | | | | X |
| degumming | | | X | X | X | | | | |
| refining | | | X | | | X | X | | |
| bleaching | X | | | X | | X | | X | |
| deodorizing | | X | | | X | | X | X | |

| Step | E217 | E218 | E219 | E220 | E221 | E222 | E223 | E224 | E225 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | X | X | X | X | X | X | X | X | X |
| flaking/pressing | X | X | X | X | | | | | |
| extracting | | | | | X | X | X | X | |
| degumming | X | | | | X | | | | X |
| refining | | X | | | | | X | | X |
| bleaching | | | X | | | | | X | |
| deodorizing | | | | X | | | | X | |

| Step | E226 | E227 | E228 | E229 | E230 | E231 | E232 | E233 | E234 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | X | X | X | X | X | | | | |
| flaking/pressing | | | | | | X | X | X | X |
| extracting | | | | | | X | X | X | X |
| degumming | X | X | | | | X | | | |
| refining | | | X | X | | | X | | |
| bleaching | X | | X | | X | | | X | |
| deodorizing | | X | | | X | X | | | X |

| Step | E235 | E236 | E237 | E238 | E239 | E240 | E241 | E242 | E243 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | | | | | | | | | |
| flaking/pressing | | | | | | | | | |
| extracting | X | X | X | X | X | X | | | |
| degumming | X | X | X | | | | X | X | |
| refining | X | | | X | X | | X | X | X |
| bleaching | | X | | X | | X | X | X | X |
| deodorizing | | | X | | X | X | | X | X |

| Step | E244 | E245 | E246 | E247 | E248 | E249 | E250 | E251 | E252 |
|---|---|---|---|---|---|---|---|---|---|
| seed treatment | X | X | X | X | X | X | X | X | X |
| cracking and dehulling | | | | | | | | | |
| conditioning | X | X | X | X | X | X | X | X | |
| milling | X | X | X | X | X | X | | | |
| flaking/pressing | X | | | | | | X | X | X |
| extracting | | X | | | | | X | | |

| | | | | | | | | |
|---|---|---|---|---|---|---|---|---|
| degumming | | X | | | | | X | |
| refining | | | X | | | | | X |
| bleaching | | | | X | | | | |
| deodorizing | | | | | X | | | |

| Step | E253 | E254 | E255 | E256 | E257 | E258 | E259 | E260 | E261 |
|---|---|---|---|---|---|---|---|---|---|
| seed treatment | | | | | | | | | |
| cracking and dehulling | X | X | X | X | X | X | X | X | X |
| conditioning | X | X | X | X | X | X | X | X | X |
| milling | | | | | | | | | |
| flaking/pressing | X | X | | | | | | | |
| extracting | | | X | X | X | X | | | |
| degumming | | | X | | | | X | X | X |
| refining | | | | X | | X | X | | |
| bleaching | X | | | | X | | | X | |
| deodorizing | | X | | | | X | | | X |

| Step | E262 | E263 | E264 | E265 | E266 | E267 | E268 | E269 | E270 |
|---|---|---|---|---|---|---|---|---|---|
| seed treatment | | | | | | | | | |
| cracking and dehulling | X | X | X | X | X | X | X | X | X |
| conditioning | X | X | X | | | | | | |
| Milling | | | | X | X | X | X | X | X |
| Flaking/pressing | | | | X | X | X | X | X | |
| extracting | | | | X | | | | | X |
| degumming | | | | | X | | | | X |
| refining | X | X | | | | | X | | |
| bleaching | X | | X | | | | | X | |
| deodorizing | | X | X | | | | | X | |

| Step | E271 | E272 | E273 | E274 | E275 | E276 | E277 | E278 | E279 |
|---|---|---|---|---|---|---|---|---|---|
| seed treatment | | | | | | | | | |
| cracking and dehulling | X | X | X | X | X | X | X | X | X |
| conditioning | | | | | | | | | |
| milling | X | X | X | X | X | X | X | X | X |
| flaking/pressing | | | | | | | | | |
| extracting | X | X | X | | | | | | |
| degumming | | | | X | X | X | | | |
| refining | X | | | X | | | X | X | |
| bleaching | | X | | | X | | X | | X |
| deodorizing | | | X | | | X | | X | X |

| Step | E280 | E281 | E282 | E283 | E284 | E285 | E286 | E287 | E288 |
|---|---|---|---|---|---|---|---|---|---|
| seed treatment | | | | | | | | | |
| cracking and dehulling | X | X | X | X | X | X | X | X | X |
| conditioning | | | | | | | | | |
| milling | | | | | | | | | |
| flaking/pressing | X | X | X | X | X | X | X | X | X |
| extracting | X | X | X | X | | | | | |
| degumming | X | | | | X | X | X | | |
| refining | | X | | | X | | | X | X |
| bleaching | | | X | | | X | | X | |
| deodorizing | | | | X | | | X | | X |

| Step | E289 | E290 | E291 | E292 | E293 | E294 | E295 | E296 | E297 |
|---|---|---|---|---|---|---|---|---|---|
| seed treatment | | | | | | | | | |
| cracking and dehulling | X | X | X | X | X | X | X | X | X |
| conditioning | | | | | | | | | |
| milling | | | | | | | | | |
| flaking/pressing | X | | | | | | | | |
| extracting | | X | X | X | X | X | X | | |
| degumming | | X | X | X | | | | X | X |
| refining | | X | | | X | X | | X | X |
| bleaching | X | | X | | X | | X | X | |
| deodorizing | X | | | X | | X | X | | X |

-continued

| Step | E298 | E299 | E300 | E301 | E302 | E303 | E304 | E305 | E306 |
|---|---|---|---|---|---|---|---|---|---|
| seed treatment | | | | | | | | | |
| cracking and dehulling | X | | | | | | | | |
| conditioning | | X | X | X | X | X | X | X | X |
| milling | | X | X | X | X | X | X | X | X |
| flaking/pressing | | X | X | X | X | X | | | |
| extracting | | X | | | | | | X | X |
| degumming | | | X | | | | X | | |
| refining | X | | | X | | | | X | |
| bleaching | X | | | | X | | | | X |
| deodorizing | X | | | | | X | | | |

| Step | E307 | E308 | E309 | E310 | E311 | E312 | E313 | E314 | E315 |
|---|---|---|---|---|---|---|---|---|---|
| seed treatment | | | | | | | | | |
| cracking and dehulling | | | | | | | | | |
| conditioning | X | X | X | X | X | X | X | X | X |
| milling | X | X | X | X | X | X | X | | |
| flaking/pressing | | | | | | | | X | X |
| extracting | X | | | | | | | X | X |
| degumming | | X | X | X | | | | X | |
| refining | | X | | | X | X | | | X |
| bleaching | | | X | | X | | X | | |
| deodorizing | X | | | X | | X | X | | |

| Step | E316 | E317 | E318 | E319 | E320 | E321 | E322 | E323 | E324 |
|---|---|---|---|---|---|---|---|---|---|
| seed treatment | | | | | | | | | |
| cracking and dehulling | | | | | | | | | |
| conditioning | X | X | X | X | X | X | X | X | |
| milling | | | | | | | | | |
| flaking/pressing | X | X | X | X | X | X | X | X | |
| extracting | X | X | | | | | | | X |
| degumming | | | X | X | X | | | | X |
| refining | | | X | | | X | X | | X |
| bleaching | X | | | X | | X | | X | |
| deodorizing | | X | | | X | | X | X | |

| Step | E325 | E326 | E327 | E328 | E329 | E330 | E331 | E332 | E333 |
|---|---|---|---|---|---|---|---|---|---|
| seed treatment | | | | | | | | | |
| cracking and dehulling | | | | | | | | | |
| conditioning | X | X | X | X | X | X | X | X | X |
| milling | | | | | | | | | |
| flaking/pressing | | | | | | | | | |
| extracting | X | X | X | X | X | | | | |
| degumming | X | X | | | | X | X | X | |
| refining | | | X | X | | X | X | | X |
| bleaching | X | | X | | X | X | | X | X |
| deodorizing | | X | | X | X | | X | X | X |

| Step | E334 | E335 | E336 | E337 | E338 | E339 | E340 | E341 | E342 |
|---|---|---|---|---|---|---|---|---|---|
| seed treatment | | | | | | | | | |
| cracking and dehulling | | | | | | | | | |
| conditioning | X | X | X | X | X | X | X | X | X |
| milling | X | X | X | X | X | X | X | X | X |
| flaking/pressing | X | X | X | X | X | X | X | X | X |
| extracting | X | X | X | X | | | | | |
| degumming | X | | | | X | X | X | | |
| refining | | X | | | X | | | X | X |
| bleaching | | | X | | X | | X | | |
| deodorizing | | | | X | | X | | | X |

| Step | E343 | E344 | E345 | E346 | E347 | E348 | E349 | E350 | E351 |
|---|---|---|---|---|---|---|---|---|---|
| seed treatment | | | | | | | | | |
| cracking and dehulling | | | | | | | | | |
| conditioning | | | | | | | | | |
| milling | X | X | X | X | X | X | X | X | X |
| flaking/pressing | X | | | | | | | | |
| extracting | | X | X | X | X | X | X | | |

-continued

| Step | E352 | E353 | E354 | E355 | E356 | E357 | E358 | E359 | E360 |
|---|---|---|---|---|---|---|---|---|---|
| degumming | | X | X | X | | | | X | X |
| refining | | X | | | X | X | | X | X |
| bleaching | X | | X | | X | | X | X | |
| deodorizing | X | | | X | | X | X | | X |

| Step | E352 | E353 | E354 | E355 | E356 | E357 | E358 | E359 | E360 |
|---|---|---|---|---|---|---|---|---|---|
| seed treatment | | | | | | | | | |
| cracking and dehulling | | | | | | | | | |
| conditioning | | | | | | | | | |
| milling | X | | | | | | | | |
| flaking/pressing | | X | X | X | X | X | X | X | X |
| extracting | | X | X | X | X | X | X | | |
| degumming | | X | X | X | | | | X | X |
| refining | X | X | | | X | X | | X | X |
| bleaching | X | | X | | X | | X | X | |
| deodorizing | X | | | X | | X | X | | X |

| Step | E361 | E362 | E363 | E364 | E365 | E366 | E367 | E368 | E369 |
|---|---|---|---|---|---|---|---|---|---|
| seed treatment | | | | | | | | X | X |
| cracking and dehulling | | | | | | | | X | X |
| conditioning | | | | | | | | X | X |
| milling | | | | | | | | X | X |
| flaking/pressing | X | X | | | | | | X | |
| extracting | | | X | X | X | X | | | X |
| degumming | X | | X | X | | X | X | | |
| refining | | X | X | X | X | | X | | |
| bleaching | X | X | X | | | X | X | X | |
| deodorizing | X | X | | X | X | X | X | | |

| Step | E370 | E371 | E372 | E373 | E374 | E375 | E376 | E377 | E378 |
|---|---|---|---|---|---|---|---|---|---|
| seed treatment | X | X | X | X | X | X | X | X | X |
| cracking and dehulling | X | X | X | X | X | X | X | X | X |
| conditioning | X | X | X | X | X | X | X | X | X |
| milling | X | X | X | X | | | | | |
| flaking/pressing | | | | | X | X | X | X | X |
| extracting | | | | | X | | | | |
| degumming | X | | | | | X | | | |
| refining | | X | | | | | X | | |
| bleaching | | | X | | | | | X | |
| deodorizing | | | | X | | | | | X |

| Step | E379 | E380 | E381 | E382 | E383 | E384 | E385 | E386 | E387 |
|---|---|---|---|---|---|---|---|---|---|
| seed treatment | X | X | X | X | X | X | X | X | X |
| cracking and dehulling | X | X | X | X | X | X | X | X | X |
| conditioning | X | X | X | X | X | X | X | X | X |
| milling | | | | | | | | | |
| flaking/pressing | | | | | | | | | |
| extracting | X | X | X | X | | | | | |
| degumming | X | | | | X | X | X | | |
| refining | | X | | | X | | | X | X |
| bleaching | | | X | | | X | | X | |
| deodorizing | | | | X | | | X | | X |

| Step | E388 | E389 | E390 | E391 | E392 | E393 | E394 | E395 | E396 |
|---|---|---|---|---|---|---|---|---|---|
| seed treatment | X | X | X | X | X | X | X | X | X |
| cracking and dehulling | X | X | X | X | X | X | X | X | X |
| conditioning | X | | | | | | | | |
| milling | | X | X | X | X | X | X | X | X |
| flaking/pressing | | X | X | X | X | X | | | |
| extracting | | X | X | | | | X | X | X |
| degumming | | | X | | | | X | | |
| refining | | | | X | | X | | X | |
| bleaching | X | | | | X | | | | X |
| deodorizing | X | | | | | X | | | |

-continued

| Step | E397 | E398 | E399 | E400 | E401 | E402 | E403 | E404 | E405 |
|---|---|---|---|---|---|---|---|---|---|
| seed treatment | X | X | X | X | X | X | X | X | X |
| cracking and dehulling | X | X | X | X | X | X | X | X | X |
| conditioning | | | | | | | | | |
| milling | X | X | X | X | X | X | X | | |
| flaking/pressing | | | | | | | | X | X |
| extracting | X | | | | | | | X | X |
| degumming | | X | X | X | | | | X | |
| refining | | X | | | X | X | | | X |
| bleaching | | | X | | X | | X | | |
| deodorizing | X | | | | X | | X | X | |

| Step | E406 | E407 | E408 | E409 | E410 | E411 | E412 | E413 | E414 |
|---|---|---|---|---|---|---|---|---|---|
| seed treatment | X | X | X | X | X | X | X | X | X |
| cracking and dehulling | X | X | X | X | X | X | X | X | X |
| conditioning | | | | | | | | | |
| milling | | | | | | | | | |
| flaking/pressing | X | X | X | X | X | X | X | X | |
| extracting | X | X | | | | | | | X |
| degumming | | | X | X | X | | | | X |
| refining | | | X | | | X | X | | X |
| bleaching | X | | | X | | X | | X | |
| deodorizing | | X | | | X | | | X | X |

| Step | E415 | E416 | E417 | E418 | E419 | E420 | E421 | E422 | E423 |
|---|---|---|---|---|---|---|---|---|---|
| seed treatment | X | X | X | X | X | X | X | X | X |
| cracking and dehulling | X | X | X | X | X | X | X | X | |
| conditioning | | | | | | | | | X |
| milling | | | | | | | | | X |
| flaking/pressing | | | | | | | | | X |
| extracting | X | X | X | X | X | | | | X |
| degumming | X | X | | | | X | X | | |
| refining | | | X | X | | X | X | X | |
| bleaching | X | | X | | X | X | | X | |
| deodorizing | | X | | X | X | | X | X | |

| Step | E424 | E425 | E426 | E427 | E428 | E429 | E430 | E431 | E432 |
|---|---|---|---|---|---|---|---|---|---|
| seed treatment | X | X | X | X | X | X | X | X | X |
| cracking and dehulling | | | | | | | | | |
| conditioning | X | X | X | X | X | X | X | X | X |
| milling | X | X | X | X | X | X | X | X | X |
| flaking/pressing | X | X | X | X | | | | X | |
| extracting | | | | | X | X | X | X | |
| degumming | X | | | | | X | | | X |
| refining | | X | | | | | X | | X |
| bleaching | | | X | | | | | X | |
| deodorizing | | | | X | | | | | X |

| Step | E433 | E434 | E435 | E436 | E437 | E438 | E439 | E440 | E441 |
|---|---|---|---|---|---|---|---|---|---|
| seed treatment | X | X | X | X | X | X | X | X | X |
| cracking and dehulling | | | | | | | | | |
| conditioning | X | X | X | X | X | X | X | X | X |
| milling | X | X | X | X | X | | | | |
| flaking/pressing | | | | | | X | X | X | X |
| extracting | | | | | | X | X | X | X |
| degumming | X | X | | | | X | | | |
| refining | | | X | X | | | X | | |
| bleaching | X | | X | | X | | | X | |
| deodorizing | | X | | X | X | | | | X |

| Step | E442 | E443 | E444 | E445 | E446 | E447 | E448 | E449 | E450 |
|---|---|---|---|---|---|---|---|---|---|
| seed treatment | X | X | X | X | X | X | X | X | X |
| cracking and dehulling | | | | | | | | | |
| conditioning | X | X | X | X | X | X | X | X | X |
| milling | | | | | | | | | |
| flaking/pressing | X | X | X | X | X | X | | | |
| extracting | | | | | | | X | X | X |

-continued

| | | | | | | | | |
|---|---|---|---|---|---|---|---|---|
| degumming | X | X | X | | | X | X | X |
| refining | X | | | X | X | | X | |
| bleaching | | X | | X | | X | X | |
| deodorizing | | | X | | X | X | | X |

| Step | E451 | E452 | E453 | E454 | E455 | E456 | E457 | E458 | E459 |
|---|---|---|---|---|---|---|---|---|---|
| seed treatment | X | X | X | X | X | X | X | X | X |
| cracking and dehulling | | | | | | | | | |
| conditioning | X | X | X | X | X | X | | | |
| milling | | | | | | | X | X | X |
| flaking/pressing | | | | | | | X | X | X |
| extracting | X | X | X | | | | X | X | X |
| degumming | | | | X | X | | X | | |
| refining | X | X | | X | X | X | | X | |
| bleaching | X | | X | X | | X | | | X |
| deodorizing | | X | X | | X | X | | | |

| Step | E460 | E461 | E462 | E463 | E464 | E465 | E466 | E467 | E468 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | X | X | X | X | X | X | X | X | X |
| flaking/pressing | X | X | X | X | X | X | X | | |
| extracting | X | | | | | | | X | X |
| degumming | | X | X | X | | | | X | X |
| refining | | X | | | X | X | | X | |
| bleaching | | | X | | X | | X | | X |
| deodorizing | X | | | X | | X | X | | |

| Step | E469 | E470 | E471 | E472 | E473 | E474 | E475 | E476 | E477 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | X | X | X | X | X | X | X | | |
| flaking/pressing | | | | | | | | X | X |
| extracting | X | X | X | X | | | | X | X |
| degumming | X | | | | X | X | X | X | X |
| refining | | X | X | | X | X | | X | |
| bleaching | | X | | X | X | | X | | X |
| deodorizing | X | | X | X | | | X | X | |

| Step | E478 | E479 | E480 | E481 | E482 | E483 | E484 | E485 | E486 |
|---|---|---|---|---|---|---|---|---|---|
| seed treatment | X | X | X | X | X | X | X | X | X |
| cracking and dehulling | | | | | | | | | |
| conditioning | | | | | | | | | |
| milling | | | | | | | | | |
| flaking/pressing | X | X | X | X | X | X | X | | |
| extracting | X | X | X | X | | | | X | X |
| degumming | X | | | | X | X | X | X | X |
| refining | | X | X | | X | X | | X | |
| bleaching | | X | | X | X | | X | X | |
| deodorizing | X | | X | X | | X | X | | X |

| Step | E487 | E488 |
|---|---|---|
| seed treatment | X | X |
| cracking and dehulling | | |
| conditioning | | |
| milling | | |
| flaking/pressing | | |
| extracting | X | X |
| degumming | X | |
| refining | | X |
| bleaching | X | X |
| deodorizing | X | X |

For each of the above embodiments, E1 through E488, the combination of steps can take place under conditions that minimize oxidation and minimize isomerization as described above in section II.B. For example, the process of the invention can extract oil from high quality seed, can be carried out under conditions that minimize exposure to oxygen (e.g., in the presence of an inert gas, treat seeds or oil with carbon monoxide or nitrogen, and the like), the process can be carried out under conditions that minimize the transition metal concentrations, heat and UV light and the process can be carried out with added stabilizers or a combination of these parameters.

Additionally, for embodiments E1-E45, the combination of steps which are not marked with an "X" (i.e., wherein the boxes are blank) are combinations of eight steps wherein the process conditions in section II.B. can be optimized to obtain the desired oil. Further, for embodiments E46-E165, the combination of steps which are not marked with an "X" are combinations of seven steps wherein the process conditions in section II.B. can be optimized to obtain the desired oil. Likewise, for the embodiments E166-E366, the combination of steps which are not marked with an "X" are combinations of six steps wherein the process conditions in section II.B. can be optimized to obtain the desired oil. Also, for the embodiments E367-E488, the combination of steps which are not marked with an "X" are combinations of five steps wherein the process conditions in section II.B. can be optimized to obtain the desired oil.

Further, the process parameters discussed above affect the rate of oxidation and isomerization of fatty acids or other components contained in the compositions of the present invention, whether during or after processing. Minimizing oxidation of the oil compositions can include, but is not limited to, (a) decreasing the amount of primary products of oxidation resulting from reaction of molecular oxygen and any component of the oil composition and optionally, decreasing the amount of products derived from such primary products of oxidation; (b) decreasing the concentration of non-volatile aldehydes and/or ketones in the composition relative to their concentration when the composition is processed under conditions wherein oxidation is not minimized; and (c) decreasing other types of primary and secondary decomposition products which can result from polymerization, cyclization and pyrolysis of fatty acids, or from reactions between fatty acids with other components of the oil composition, such as stabilizers or complexing agents. In addition, minimizing isomerization reduces the concentration of trans-fatty acids in the composition relative to their concentration when the composition is processed under conditions wherein isomerization is not minimized.

DEFINITIONS

Unless indicated otherwise, the term "fatty acid" is used to describe free fatty acids and derivatives thereof (e.g., esters and salts). For example, as used throughout, the term "fatty acids" includes derivatives wherein fatty acids have been esterified with alcohols, glycerin, triacetin, glycerols or polyglycerols to form fatty acid esters. Representative derivatives include, but are not limited to, fatty acid triglycerides, diglycerides, and monoglycerides, fatty acid alkyl esters, mono- or di-acetylated monoglycerides of fatty acids, diglycerol fatty acid esters, tetraglycerol fatty acid esters, hexaglycerol fatty acid esters, and decaglycerol fatty acid esters.

Unless stated otherwise, the content of specific fatty acids is measured in wt. % based on the total weight of the fatty acids in the composition. One method of measuring the fatty acid content is AOCS Method Ce 1e-91 used for measuring compositions wherein the total fatty acid content is greater than about 99.5 wt. % of the total weight of the composition.

Unless stated otherwise, the term "inert gas" describes any gas that does not decrease the oxidative stability or quality of the oil composition. Representative inert gases include, but are not limited to, nitrogen, argon, carbon dioxide, steam, carbon monoxide, helium, neon, krypton, xenon, and hydrogen cyanide.

Unless indicated otherwise, the term "decreasing oxidative degradation" includes, but is not limited to, maintaining the oxidative condition of seeds, minimizing oxidative degradation of seeds, or slowing the rate of oxidation within seeds.

Unless indicated otherwise, the term "storage stability," "shelf stable" or "storage stable" means that the odor and taste of an oil composition of the present invention does not degrade after being stored at a specified temperature, such as refrigerated temperatures, room temperature, or temperatures at or below which the oil composition freezes. Preferably, the oil remains bland or buttery in flavor and odor. The oil has degraded if it tastes or smells fishy or pondy after storage.

Oxidative stability was measured using an Oxidative Stability Index instrument, Omnion, Inc., Rockland, Mass. according to AOCS Official Method Cd 12b-92 (revised 1993). This method is an automated replacement for the Active Oxygen Method (AOM) procedure, AOCS Official Method Cd 12-57.

The anisidine value was measured using the AOCS Official Method Cd 18-90. Aldehydes are generated during frying from the oxidation of the triacylglycerol are measured by the p-anisidine value. The p-anisidine value is defined by convention as 100 times the optical density measured at 350 nm in a 1 cm cuvette of a solution containing 1.00 g of the oil in 100 mL of a mixture of solvent and reagent according to the method described. Reduced development of aldehydes during frying is an indicator of improved oxidative stability of the oil.

The peroxide value was measured using the AOCS Official Method Cd 8-53.

The term "totox value" is equal to the sum of twice the peroxide value and the anisidine value (i.e., totox=2PV+AV), and is a measure of total toxicity of an oil composition.

Unless otherwise specified, the term "refined oil" is an oil that has been processed using chemical refining or physical refining as described herein.

The following examples illustrate the invention.

EXAMPLES

Examples 1-14

General Laboratory Procedures and Equipment

All operations were performed in an inert atmosphere (under an active purge with nitrogen) utilizing a glove bag, a glove box or airless transfer schlenk line techniques. Whole seeds were placed in mega-grinder capsules under inert conditions and sealed with an airtight cap. The sealed capsules were then removed from the inert atmosphere and milled/ground on the mega-grinder platform. The capsules were then returned to an inert atmosphere where they could be opened and further processing was initiated. All solvents and solutions are previously degassed with a subsurface sparging of nitrogen. All vessels that are brought into an inert environment chambers are degassed so adequate purging the container can take place.

Processing procedure for soybeans containing low alpha-linolenic acid:

Abbreviations: round bottom flask (RBF); small reactor (SR); stainless steel (SS); centrifuge tube (CT).

Milling Procedure: The glove bag was purged 3 times with nitrogen and about 20 g of seeds were weighed out and added to Teflon capsules for the mega-grinder. Capsules were filled so the total weight of seed was approximately 200 grams. O-ring seals were placed on the capsules and tape applied to the lids of the containers for added protection from the diffusion of air into the capsules. Sealed capsules were stored at 4° C. for two hours prior to milling. Seeds were milled at 1100 RPM for 45 seconds.

Alternative Cracking, Dehulling and Milling Procedure: The cracker and aspirator were placed in the glove box in a nitrogen atmosphere. The seeds were cracked in the cracker twice. The cracked seed and hulls were passed from a series of sieves to separate the fines. The seed and hulls were aspirated to remove the hulls. About 20 g of dehulled seeds were added to Teflon capsules for the mega-grinder. Capsules were filled so the total weight of seed was approximately 200 grams. O-ring seals were placed on the capsules and tape was applied to the lids of the containers for added protection from the diffusion of air into the capsules. Sealed capsules were stored at 4° C. for two hours prior to milling. Seeds were milled at 1100 RPM for 45 seconds.

Extraction Procedure: The capsules were placed in the glove bag. It was purged three times with nitrogen and the capsules were opened. The glass thimble for the soxhlet extractor was filled with the ground seed. The soxhlet extractor was removed from the glove box, 750 ml of hexane is added to a RBF and the ground seed was extracted for 7 hours.

Removal of Hexane from Miscella: The miscella was transferred to a short path distillation apparatus and a vacuum distillation was performed to remove the hexane to yield the crude oil.

Degumming and Refining: The crude oil was charged into a jacketed reactor and heated to 50°±3° C. The crude oil was stirred with a magnetic stir bar at 350 rpm. Once the oil temperature was at 50° C., a 5% citric acid solution was added at 2.0 wt % (based on wt/wt oil basis). The mixture was stirred and heated for 15 minutes. Then, water was added at 2% (based on wt/wt oil basis) and mixture was heated at 50°±3° C. for 30 minutes. The temperature was then increased to 67°±3° C. When this temperature is reached, the contents were removed and centrifuged. The oil phase was removed and placed back into the jacketed reactor. The reactor was heated to 62°±3° C. A 5% phosphoric acid solution was added at 2.0% (based on wt/wt oil basis). The mixture was stirred at 350 rpm for 30 minutes. The total acid content was determined and 1.10 equivalents (based on total acid measurement) of an 11 wt % NaOH solution was added. The contents of the reactor were maintained at 62°±3° C. and stirred for 15 minutes at 350 rpm. The temperature was raised to 73°±3° C. Once this temperature was reached, the mixture was removed and centrifuged.

Water Washing: The oil was returned to the reactor and heated to 73°±3° C. and stirred at 350 rpm and 15% HPLC grade water (wt/wt basis) and stirred for 10 minutes. The contents of the reactor were removed and centrifuged.

Bleaching: The oil was transferred into the reactor and heated at 60°±3° C. and 2% (wt/wt basis) of a 5% citric acid solution was added and stirred for 15 minutes at 350 rpm. Then, 0.2-0.4 wt % Trisyl® S615 manufactured by Grace Davison was added and stirred for 15 minutes. Then, 0.75-1.25 wt % of Tonsil Grade 105 bleaching clay was added and the pressure in the reactor was reduced to 25 mm of Hg. The contents were heated to 110°±2° C. and stirred at 350 rpm for 30 minutes. The mixture was cooled to 72°±3° C. and was filtered in a separate vessel.

Deodorization Procedure A: The filter oil was placed in a RBF (using Wheaton Semi-Micro glassware) equipped claisen head that contained a subsurface gas bleed tube and a vacuum port adapter. The nitrogen flow was initiated and the vacuum was maintained below 100 millitorr for two hours at 255°±5° C. The oil was then cooled to room temperature with an active nitrogen purge.

Deodorization Procedure B: The filter oil was placed in a RBF (using Wheaton Semi-Micro glassware) equipped claisen head that contained a subsurface gas bleed tube and a vacuum port adapter. The nitrogen flow was initiated and the vacuum was maintained below 100 millitorr for 30 minutes at 255°±5° C. The oil was then cooled to room temperature with an active nitrogen purge.

Deodorization Procedure C: The filter oil was placed in a RBF (using Wheaton Semi-Micro glassware) equipped claisen head that contained a subsurface gas bleed tube and a vacuum port adapter. The nitrogen flow was initiated and the vacuum was maintained below 100 millitorr for two hours at 220°±5° C. The oil was then cooled to room temperature with an active nitrogen purge.

| Variety | R.L. soy | | | LL Soy 23V218109U | | |
| --- | --- | --- | --- | --- | --- | --- |
| Example | 1 | | | 2 | | |
| Deodorization step | 255° C. for 2 hours | | | 255° C. for 2 hours | | |
| Analysis and results | Seed | Bleach oil | RBD OIL | Seed | Bleach oil | RBD OIL |
| FFA, % | | 0.34 | 0.1 | | 0.5 | 0.5 |
| PV, Meq/kg | | <0.1 | <0.1 | | <0.1 | <0.1 |
| Palmitic C16:0 | 11.64 | 11.01 | 11.02 | 11.2 | 10.54 | 10.5 |
| C16:1 | 0 | 0 | 0 | 0.1 | 0 | 0.1 |
| C18:0 | 3.73 | 3.84 | 3.96 | 4.72 | 4.97 | 4.86 |
| Oleic C18:1 | 17.71 | 18.23 | 18.5 | 21.11 | 22.75 | 22.62 |
| C18:1 n7 | | 1.4 | 1.4 | 1.32 | 1.37 | 1.34 |
| C18:2 9_12 | 56.75 | 56.23 | 55.6 | 57 | 56.12 | 55.7 |
| C18:3 ALA | 7.88 | 7.66 | 5.79 | 2.65 | 2.46 | 1.78 |
| C20:0 | 0.34 | 0.36 | 0.39 | 0.34 | 0.34 | 0.34 |
| C20:1 | 0.19 | 0.21 | 0.17 | 0.17 | 0.13 | 0.13 |
| C22:0 | 0.4 | 0.45 | 0.47 | 0.35 | 0.33 | 0.32 |
| C24:0 | | 0.14 | 0.2 | 0.12 | 0.15 | 0.14 |
| Tocopherols (total), ppm | 283 | | 1189 | 288 | | 1054 |
| alpha, ppm | 26.06 | | 117.3 | 16.7 | | 68.85 |
| gamma/beta, ppm | 188.4 | | 797.8 | 193.3 | | 719 |
| delta, ppm | 68.57 | | 273.9 | 78.4 | | 266.6 |

| | | | | | |
|---|---|---|---|---|---|
| AV | | 1.01 | | 0.21 | |
| OSI, hours | | 5.70 | | 6.80 | |

| Variety | R.L. soy | LL Soy 23V218109U | R.L. soy | LL Soy 23V218109U | LL Soy 49I218036N | |
|---|---|---|---|---|---|---|
| Example | 3 | 4 | 5 | 6 | 7 | |
| Deodorization step | 255° C. for 30 min. | 255° C. for 30 min. | 220° C. for 2 h. | 220° C. for 2 h | 255° C. for 2 h | |
| Analysis and results | Bleach oil | RBD OIL | Bleach oil | RBD OIL | RBD OIL | RBD OIL | Seed | RBD OIL |

| Analysis and results | Bleach oil | RBD OIL | Bleach oil | RBD OIL | RBD OIL | RBD OIL | Seed | RBD OIL |
|---|---|---|---|---|---|---|---|---|
| FFA, % | 0.32 | 0.25 | 0.41 | 0.15 | | 0.21 | | |
| PV, Meq/kg | <0.1 | <0.1 | <0.1 | <0.1 | | <0.2 | | |
| Palmitic C16:0 | 11.1 | 11.52 | 10.79 | 10.56 | | 9.8 | 11.25 | |
| C16:1 | 0 | 0 | 0 | 0.1 | | | 0.10 | |
| C18:0 | 3.96 | 4.18 | 5 | 4.61 | | 4.24 | 4.62 | |
| Oleic C18:1 | 18.38 | 18.86 | 22.22 | 21.98 | | 21.01 | 21.2 | |
| C18:1 n7 | 1.46 | 1.47 | 1.38 | 1.34 | | | 1.30 | |
| C18:2 9_12 | 55.02 | 55.76 | 55.18 | 57.13 | | 51.87 | 57.20 | |
| C18:3 ALA | 7.45 | 6.83 | 2.48 | 2.37 | | 2.28 | 2.74 | |
| C20:0 | 0.36 | 0.38 | 0.34 | 0.3 | | 0.14 | 0.33 | |
| C20:1 | 0.2 | 0.2 | 0.2 | 0.16 | | 0.17 | 0.15 | |
| C22:0 | 0.44 | 0.46 | 0.33 | 0.26 | | 0.34 | 0.36 | |
| C24:0 | 0.25 | 0.2 | 0.2 | 0.13 | | | 0.11 | |
| Tocopherols (Total) | | 1346 | | 1246 | 1117 | 1148 | 238 | 1169 |
| alpha, ppm | | 140.8 | | 79.04 | 115.9 | 75.69 | 13.1 | 71.69 |
| gamma/beta, ppm | | 890.3 | | 843.1 | 745.9 | 782.3 | 163.2 | 790.8 |
| D-delta, ppm | | 315.8 | | 324 | 254.8 | 289.8 | 61.6 | 306.8 |
| Anisidine value | | 0.75 | | 0.16 | 1.28 | 0.31 | 0.16 | 0.16 |

| Example | 8 | 9 |
|---|---|---|
| Variety | LL soy-Pr (53B218037W2) | LL soy-Pr (53B218037W2) dehulled in air |
| Deodorization | 255° C. for 30 min. | 255° C. for 30 min. |

| Analysis and results | Seed | Oil before bleach | Bleach, 1.25%, 110° C. | RBD, bleach @ 110° C. | Bleach, 3% @ 95° C. | RBD, bleach @ 95° C. | Crude | Wash | Bleach | RBD |
|---|---|---|---|---|---|---|---|---|---|---|
| FFA, % | | | 0.55 | 0.26 | 0.24 | 0.2 | | | | |
| PV, Meq/kg | | 4 | <0.2 | <0.2 | <0.2 | <0.2 | | | | |
| Palmitic C16:0 | 11.17 | 10.36 | 9.88 | 10.32 | 10.17 | 10.3 | | | | |
| C16:1 | 0 | | | | | | | | | |
| C18:0 | 4.59 | 4.37 | 4.26 | 4.28 | 4.39 | 4.52 | | | | |
| Oleic C18:1 | 22.3 | 22.44 | 21.46 | 22.18 | 21.79 | 21.84 | | | | |
| C18:1 n7 | | | | | | | | | | |
| C18:2 9_12 | 57.61 | 56.53 | 53.25 | 55.36 | 54.2 | 53.33 | | | | |
| C18:3 ALA | 2.84 | 2.62 | 2.43 | 2.27 | 2.52 | 2.21 | | | | |
| C20:0 | 0.31 | 0.34 | 0.38 | 0.28 | 0.28 | 0.33 | | | | |
| C20:1 | 0.17 | 0.25 | 0.48 | 0.022 | 0.31 | 0.26 | | | | |
| C22:0 | 0.29 | 0.21 | 0.37 | 0.13 | 0.34 | 0.22 | | | | |
| C24:0 | | | | | | | | | | |
| Tocopherols (total) | 249 | | 1186 | 1139 | 1170 | 1027 | 1289 | | | 888.1 |
| alpha, ppm | 13.26 | | 76.89 | 75.69 | 74.32 | 66.11 | 68.41 | | | 54.97 |
| beta/gamma, ppm | 168.6 | | 776.8 | 748.5 | 782.6 | 676.1 | 855.1 | | | 612.8 |
| D-delta, ppm | 67.63 | | 331.8 | 315.2 | 340 | 284.4 | 365.6 | | | 220.3 |
| Anisidine Value | | | 1.62 | 1.18 | 1.07 | 0.71 | 2.16 | 0.69 | 1.37 | 1.15 |

| Example | 10 | 11 |
|---|---|---|
| Variety | LL soy-Pr (53B218037W2) dehulling in nitrogen | LL soy-Pr (53B218037W2) dehulled in nitrogen |
| Deodorization | 255° C. for 30 min. | 255° C. for 30 min. |

| Analysis and results | Crude | Wash | Bleach | RBD | Crude | Wash | Bleach | RBD |
|---|---|---|---|---|---|---|---|---|
| FFA, % | | | | | | | | |
| PV, Meq/kg | 0.187 | 0.07 | 0.457 | 0.186 | | | | |
| Palmitic C16:0 | | | | | 10.84 | 10.77 | 10.76 | 10.95 |
| C16:1 | | | | | 0.11 | 0.11 | 0.11 | 0.09 |
| C18:0 | | | | | 5.19 | 5.14 | 5.16 | 5.26 |
| Oleic C18:1 | | | | | 23.23 | 23.41 | 23.43 | 23.96 |
| C18:1 n7 | | | | | 1.33 | 1.31 | 1.30 | 1.27 |
| C18:2 9_12 | | | | | 55.98 | 55.99 | 55.96 | 54.58 |
| C18:3 ALA | | | | | 2.30 | 2.29 | 2.29 | 1.94 |
| C20:0 | | | | | 0.36 | 0.36 | 0.36 | 0.38 |
| C20:1 | | | | | 0.19 | 0.17 | 0.17 | 0.17 |
| C22:0 | | | | | 0.36 | 0.35 | 0.35 | 0.36 |
| C24:0 | | | | | 0.11 | 0.10 | 0.11 | 0.11 |

-continued

|  | | | | | | | | |
|---|---|---|---|---|---|---|---|---|
| Tocopherols (total) | | | | 883 | 1237 | | | |
| alpha, ppm | | | | 54.41 | 67.73 | 61.93 | 71.13 | 50.29 |
| beta/gamma, ppm | | | | 613.4 | 809.9 | 805.2 | 772.5 | 469.4 |
| D-delta, ppm | | | | 215.2 | 359.5 | 354.1 | 333.4 | 170.5 |
| Anisidine Value | 0.28 | 0.35 | 3.27 | 4.12 | 1.43 | 0.69 | 0.52 | 0.53 |

| Example | 12 | | | | 13 | | | |
|---|---|---|---|---|---|---|---|---|
| Variety | LL soy-Pr (53B218037W2) dehulling in air | | | | LL soy-Pr (53B218037W2) dehulled in air | | | |
| Deodorization | 255° C. for 30 min. | | | | 255° C. for 30 min. | | | |
| Analysis and results | Crude | Wash | Bleach | RBD | Crude | Wash | Bleach | RBD |
| FFA, % | | | | | | | | |
| PV, Meq/kg | | | | | | | | |
| Palmitic C16:0 | 10.83 | 10.77 | 10.76 | 9.36 | | | | |
| C16:1 | 0.05 | 0.09 | 0.05 | 0.00 | | | | |
| C18:0 | 5.20 | 5.02 | 5.11 | 4.59 | | | | |
| Oleic C18:1 | 23.46 | 23.29 | 23.38 | 23.57 | | | | |
| C18:1 n7 | 1.34 | 1.29 | 1.31 | 1.53 | | | | |
| C18:2 9_12 | 56.03 | 56.20 | 56.10 | 57.42 | | | | |
| C18:3 ALA | 2.25 | 2.28 | 2.26 | 2.03 | | | | |
| C20:0 | 0.35 | 0.34 | 0.35 | 0.35 | | | | |
| C20:1 | 0.19 | 0.16 | 0.17 | 0.15 | | | | |
| C22:0 | 0.35 | 0.33 | 0.34 | 0.36 | | | | |
| C24:0 | 0.00 | 0.09 | 0.11 | 0.14 | | | | |
| alpha, ppm | 60.27 | 60.01 | 62 | 56.47 | 59.06 | 52.6 | 54.92 | 51.06 |
| beta/gamma, ppm | 771.8 | 753.4 | 728.4 | 595.2 | 764 | 701.4 | 641 | 584.2 |
| D-delta, ppm | 348.3 | 343 | 327.7 | 257 | 300.7 | 291.1 | 278.5 | 238.1 |
| Anisidine Value | 2.01 | 0.82 | 0.55 | 0.55 | 1.61 | 0.67 | 0.73 | 0.62 |

| Example | 14 | | | |
|---|---|---|---|---|
| Variety | LL soy-Pr (53B218037W2) dehulled in nitrogen | | | |
| Deodorization | 255° C. for 30 min. | | | |
|  | Crude | Wash | Bleach | RBD |
| Tocopherols (total) | | | | |
| alpha, ppm | 71.73 | 10.4 | 42.39 | 27.35 |
| beta/gamma, ppm | 813.5 | 491.8 | 466.1 | 263.6 |
| D-delta, ppm | 340.4 | 267.4 | 259.7 | 120.8 |
| Anisidine Value | | 1.9 | 1.95 | 2.78 | 1.72 |

Examples 15-24

Laboratory Processing of High SDA Canola Seeds

The process of Examples 1-14 was used with the following changes. About 18 g of seeds were weighed out and added to Teflon capsules for the mega-grinder. The capsules were filled enough so the total weight of seed was approximately 100 grams. The seeds were then milled at 1200 RPM for 60 seconds.

Degumming: Using Schlenk line techniques, the crude oil was transferred into a small reactor. The oil was then heated to 55±5° C. c A 5% citric acid was added at 2.0 wt % and stirred for 15 minutes at 350 rpm. Next, 2% HPLC grade water was added and stirred for 30 minutes at 350 rpm. The mixture was then removed and centrifuged.

Phosphoric acid Treatment: The degummed oil was transferred into a small reactor and heated to 55±5° C. Next, 5% of an 85% phosphoric acid solution was added by syringe and mixed for 15 minutes at 350 rpm. The oil was then transferred and centrifuged.

Neutralization: The phosphoric acid treated oil was transferred into a small reactor and heated to 55±5° C. The total acid content of the oil was determined and 1.10 equivalents (based on total acid measurement) of an 11-wt % NaOH solution was added. The contents of the reactor were maintained at 55±5° C. and stirred for 15 minutes at 350 rpm. The oil was then transferred and centrifuged.

Trisyl Treatment: The neutralized oil was transferred into a small reactor and heated to 55±5° C. and mixed at 350 rpm. Trisyl S615 was then added at 1.0% and mixed for 20 minutes. The oil was then transferred and filtered in a glove bag. Water washing was optional.

Bleaching: The oil was transferred into the reactor and heated to 60°±3° C. Next, 3.0 wt % of Tonsil Grade 167FF bleaching clay, 0.5 wt % Activated Carbon, and 0.2 wt % Filter Aid is added and the pressure in the reactor is reduced to 25 mm of Hg. The contents are heated to 95°±2° C. and stirred at 350 rpm for 30 minutes. The temperature was then cooled to 60°±3° C. and the mixture was filtered in a separate vessel.

Deodorization: The filtered oil was placed in a RBF (using Wheaton Semi-Micro glassware) equipped claisen head that contained a subsurface gas bleed tube and a vacuum port adapter. A three neck RBF was used as an option to this reactor. The nitrogen flow was initiated and the vacuum was maintained below 3 torr for two hours at 180°±5° C. The oil was then cooled to 60° C. temperature with nitrogen and transferred, concluding the process.

| Example | 15 | 16 | 17 | 18 | 19 |
|---|---|---|---|---|---|
| Variety | EG154989N3 | JH716846H5 | NV16847M8 | EG26503S8 in air | KC16848L2 |
| Deodorization | 180° C., 2 h. | 180° C., 2 h. | 180° C., 2 h. | 250° C., 2 h. | 180° C., 2 h. |
| Palmitic C16:0 | 4.41 | 5.42 | 5.38 | 4.41 | 5.32 |
| C16:1 | 0.26 | 0.32 | 0.32 | 0.26 | 0.31 |
| C18:0 | 2.29 | 2.62 | 2.65 | 2.17 | 2.52 |
| Oleic C18:1 | 64.14 | 35.3 | 35.19 | 63.63 | 33.87 |
| C18:1 n7 | 2.92 | 3.49 | 3.33 | 3.01 | 3.36 |
| C18:2 6_9 | 0 | 2.13 | 2.12 | 0 | 2.13 |
| C18:2 9_12 | 17.78 | 10.09 | 10.04 | 18.12 | 10.1 |
| C18:3 GLA | 0 | 20.52 | 20.48 | 0 | 21.67 |
| C18:3 ALA | 5.68 | 7.69 | 7.68 | 4.37 | 8.1 |
| C18:4 (SDA) | 0 | 9.33 | 9.3 | 0 | 10.5 |
| C20:0 | 0.69 | 0.82 | 0.81 | 0.62 | 0.78 |
| C20:1 | 0.99 | 0.73 | 0.73 | 0.89 | 0.78 |
| C22:0 | 0.29 | 0.37 | 0.37 | 0.28 | 0.35 |
| C24:0 | 0.21 | 0.26 | 0.27 | 0.18 | 0.23 |
| Tocopherols (total) | 696.5 | 729.58 | 798.38 | 232.4 | 781.24 |
| alpha, ppm | 251.6 | 304.9 | 349.9 | 77.51 | 342.80 |
| beta/gamma, ppm | 436.2 | 413.3 | 438.2 | 154.9 | 429.10 |
| D-delta, ppm | 8.674 | 11.38 | 10.28 | 0 | 9.34 |
| Anisidine Value | 0.7 | 4.4 | 2.31 | 1.29 | 2.04 |

| Example | 20 | 21 | 22 | 23 | 24 |
|---|---|---|---|---|---|
| Variety | EG30052X4 | PR16241B8 | MY16241D7 | TE169954Z2 | HQ168410DR |
| Deodorization | 180° C., 2 h. | 250° C., 2 h. | 250° C., 2 h. | 180° C., 2 h. | 180° C., 2 h. |
| FFA, % | | | | | |
| PV, Meq/kg | | 0.13 | 0.5 | 0.14 | |
| Palmitic C16:0 | 4.43 | 4.91 | 5.13 | 5.3 | |
| C16:1 | 0.26 | 0.28 | 0.32 | 0.27 | |
| C18:0 | 2.34 | 2.53 | 2.69 | 2.14 | |
| Oleic C18:1 | 64.02 | 61.46 | 64.86 | 47.29 | |
| C18:1 n7 | 2.95 | 3.3 | 3.54 | 3.42 | |
| C18:2 6_9 | 0 | | | | |
| C18:2 9_12 | 17.67 | 3.91 | 4.11 | 2.06 | |
| C18:3 GLA | 0 | 3.54 | 1.08 | 4.44 | |
| C18:3 ALA | 5.51 | 4.41 | 1.28 | 6.1 | |
| C18:4 (SDA) | 0 | 4.16 | 0.38 | 16.83 | |
| C20:0 | 0.7 | 0.7 | 0.71 | 0.72 | |
| C20:1 | 1.01 | 0.94 | 0.95 | 1.07 | |
| C22:0 | 0.31 | 0 | 0 | 0.36 | |
| C24:0 | 0.24 | 0.17 | ND | 0.23 | |
| Tocopherols (total) | 729.75 | 307.2 | 536 | 570.032 | 626.9 |
| alpha, ppm | 264.8 | 117.6 | 239.6 | 339.9 | 271.4 |
| beta/gamma, ppm | 456.3 | 189.6 | 296.4 | 227.1 | 348.1 |
| D-delta, ppm | 8.65 | <4 | <4 | 3.032 | 7.4 |
| Anisidine Value | 0.66 | 2.87 | 0.96 | 5.56 | 3.57 |

Examples 25-33

Laboratory Processing of High SDA Soy Seeds

The processing parameters were the same as for Examples 15-24 with the following changes. The cracker and aspirator were placed in glove box under a nitrogen atmosphere. The seeds were then passed through the seed cracker twice. The cracked seeds and hulls were then passed through a series of sieves to separate the fines. Next the seeds and hulled were aspirated, separating the seed from the hulls. Approximately 20 g of dehulled seeds were then added to Teflon capsules for the mega-grinder. Enough capsules were filled so the total weight of seed was approximately 350 grams.

Extraction Procedure: The capsules were placed in the glove bag. It was purged three times with nitrogen and the capsules were then opened. The glass thimble for the soxhlet extractor was filled with the ground seed.

| Example | 25 | 26 | 27 | | | | | |
|---|---|---|---|---|---|---|---|---|
| Variety | JGA38X167 | KRA38X293 | High SDA Nitrogen Treated Seed | | | | | |
| | | | Crude | Degummed | Refined | Water wash | Bleached | RBD |
| FFA, % | | | | | | | | |
| PV, Meq/kg | <0.1 | <0.1 | | | | | | |
| Palmitic C16:0 | 12.42 | 12.44 | | | | | | |
| C16:1 | 0.1 | 0.1 | | | | | | |
| C18:0 | 3.62 | 3.69 | | | | | | |

|  | | | | | | | | | |
|---|---|---|---|---|---|---|---|---|---|
| Oleic C18:1 | 16.79 | 18.41 | | | | | | | |
| C18:1 n7 | 1.42 | 1.48 | | | | | | | |
| C18:2 6_9 | | | | | | | | | |
| C18:2 9_12 | 30.97 | 30.96 | | | | | | | |
| C18:3 GLA | 5.91 | 5.18 | | | | | | | |
| C18:3 ALA | 10.33 | 9.92 | | | | | | | |
| C18:4 (SDA) | 16.89 | 15.58 | | | | | | | |
| C20:0 | 0.29 | 0.29 | | | | | | | |
| C20:1 | 0.18 | 0.19 | | | | | | | |
| C22:0 | 0.22 | 0.2 | | | | | | | |
| C24:0 | 0.12 | 0.1 | | | | | | | |
| Tocopherols (total) | 1225 | 1345 | | | 1668 | 1611 | 1505 | 1405 | |
| alpha, ppm | 185 | 201.8 | | | 206.1 | 196.1 | 195.6 | 181 | |
| beta/gamma, ppm | 814.7 | 884.3 | | | 1099 | 1062 | 978.2 | 915 | |
| D-delta, ppm | 225.3 | 258.6 | | | 363.2 | 353.3 | 330.9 | 309 | |
| Anisidine Value | 4.47 | 0.61 | 1.16 | 0.81 | 0.54 | 1.17 | 1.64 | 1.4 | |

| Example | 28 | 29 | 30 |
|---|---|---|---|
| Variety | High SDA CO treated seed | High SDA nitrogen treated seed | High SDA CO treated seed |

| | Crude | Degummed | Refined | Water wash | Bleached | RBD | Crude | Bleached | RBD | Crude | Bleached | RBD |
|---|---|---|---|---|---|---|---|---|---|---|---|---|
| Tocopherols (total) | | 1716 | 1703 | 1687.5 | 1549 | 1542.8 | | 1394.50 | | | | 1274 |
| alpha, ppm | | 210.6 | 209.5 | 204.7 | 200.7 | 202 | | 184.90 | | | | 255 |
| beta/gamma, ppm | | 1133 | 1123 | 1113 | 1015 | 1006 | | 903.80 | | | | 855 |
| D-delta, ppm | | 373 | 370.3 | 369.8 | 333.8 | 334.8 | | 305.80 | | | | 169 |
| Anisidine Value | 0.99 | 0.28 | 0.58 | 0.92 | 0.79 | 0.8 | 1.32 | 4.5 | 3.6 | 1.95 | 0.5 | 0.5 |

| Example | 31 | 32 | 33 |
|---|---|---|---|
| Variety | 20% SDA | 20% SDA | 20% SDA |
| FFA, % | 0.28 | <0.05 | <0.05 |
| PV, Meq/kg | 0.75 | <0.1 | 3.14 |
| Palmitic C16:0 | 13.21 | 13.29 | 13.82 |
| C16:1 | 0.08 | 0.08 | 0.09 |
| C18:0 | 4.39 | 4.41 | 4.87 |
| Oleic C18:1 | 16.78 | 16.82 | 17.57 |
| 18:1 n7 | 1.54 | 1.37 | 1.62 |
| C18:2 6_9 | 30.19 | 30.25 | 30.07 |
| C18:2 9_12 | | | |
| C18:3 GLA | 5.13 | 5.14 | 4.92 |
| C18:3 ALA | 10.43 | 10.47 | 9.97 |
| C18:4 (SDA) | 16.62 | 16.99 | 15.12 |
| C20:0 | 0.41 | 0.29 | 0.43 |
| C20:1 | 0.3 | 0.21 | 0.38 |
| C22:0 | 0.41 | 0.29 | 0.39 |
| C24:0 | 0 | 0 | 0 |
| Tocopherols (total) | 1341.5 | 1250 | 1366 |
| alpha, ppm | 160.2 | 161.6 | 169.7 |
| beta/gamma, ppm | 876.9 | 820.3 | 896.6 |
| D-delta, ppm | 304.4 | 268.1 | 299.4 |
| Anisidine Value | 2.23 | 0.57 | 0.6 |

An empirical observation was made that links large amounts of foaming during the bleaching step with significant increases in the AV. Vigorous foaming occurred when water washing and bleaching were not performed on the same day. When the oil was water washed and bleached on the same day, the experiments showed lower AV, PV, and FFA. Also, moisture (soapy water) was reduced by leaving some oil on the aqueous layer after centrifugation. In addition, substitution of Trisyl-treatment for water washing, followed immediately by bleaching did not affect the results as long as the oil was water washed and bleached on the same day Example 34

Large Scale Processing of High SDA Soy Seeds

Materials: ~30 kg of SDA Soybeans (07045X47T); Citric Acid: BDH ACS grade or equivalent; Sodium Hydroxide: BDH ACS grade or equivalent; purified water; Bleaching Clay: Supreme 167 FF; Filter Aid: Manville 'Hyflo Supercel'; Phosphoric acid; and Activated carbon: Daro KB. Equipment: Pilot Plant Flaking Rolls, Aspirator & Cracking Mill; Microwave; Soxhlet Extractor; Rotary Evaporator; Hot plate;

Overhead stirrer; 6×1 L Bucket centrifuge; Parr 2 L reactor; 2 L Glass Deodorizer; and Vacuum pump.

Soybeans with three different SDA concentrations were processed, 30% SDA (2.4 kg), 20% (19 kg) and 15% (33 kg). The 20% SDA was split up into two separate ~10 kg runs and the 15% SDA was split up into three runs. Two seed groups (one 10 kg lot from 20% and one 10 kg lot from 15% SDA) was sparged with carbon monoxide in the fume hood prior to processing. Four runs were carried out using Schlenk techniques, airless transfer, and/or nitrogen blanketing. Use of nitrogen was required wherever possible during cracking, flaking, extracting, desolventizing, distillation, and during all steps of refining.

General Laboratory Procedures and Equipment: All operations are performed in an inert atmosphere (under an active purge with nitrogen) and utilizing a glove bag when possible. All solvents and solutions are previously degassed with a subsurface sparging of nitrogen. All vessels that are brought into an inert environment chamber are opened so adequate purging of the container can take place.

Cracking: The gap of the mill was adjusted to #9 and the soybeans were fed to the cracking mill.

Aspiration: The aspirator was adjusted to 1.2" of water, the cracked soybeans were fed into the aspirator. For the larger lots of seed, the cracked soybeans were aspirated in 5 kg lots Conditioning: The lab microwave oven was used to heat the cracked soybeans to 45-55° C.

Flaking: The conditioned seeds were flaked to 0.30-0.35 mm using the flaking rolls.

Solvent Extraction: All the soybean flakes were loaded into the pilot plant soxhlet and ~16 L of new hexane was added. The flakes were extracted for four hours, after which the hexane was removed from the miscella using a Rotoevaporator.

Desolventize Meal: The meal was desolventized in a fume hood under a covered tray that was equipped with a nitrogen purge.

Acid Degumming: The oil was heated to 50±3° C. and 0.2% citric acid (50%) solution was added and stirred for 15 minutes. Then, 2.0% of warm water was added and mixed for 30 minutes, and heated to 67±3° C. Once reacted, the mixture was centrifuged.

Refining: The degummed oil was heated to 62±3° C., 0.1% of 85% phosphoric acid was added and mixed for 30 minutes. NaOH was added to neutralize FFA's (+0.05% excess) and mixed for 15 min. The mixture was heated to 73±3° C. and centrifuged.

Water Washing: The oil was heated to 73±3° C., 15% of 90-95° C. water was added and mixed 10 min., followed by centrifugation.

Bleaching: The oil was heated in a reactor to 60±3° C., 0.2% of a 50% citric acid solution, 3% Tonsil 167FF, 0.5 Activated Carbon, 0.2% Filter Aid was added. A vacuum was pulled and the mixture was heated to 95±2° C. and held for 30 min. The mixture was then cooled to 72° C.±3° C. and filtered.

Deodorization: The deodorization temperature was 180±3° C. with retention time of 120 minutes. Nitrogen gas was sparged/added at 3% w/w of oil flow. The oil was cooled to <60° C. before leaving the deodorizer.

Analytical Methods: Moisture, AOCS Ba 2a-38; Oil Content, Seed, Cake and Meal, SOP 4.2.7 (Swedish tube); Peroxide Value, AOCS Cd 8-53; p-Anisidine Value, AOCS Cd 18-90; Free Fatty Acids AOCS, Ca 5a-40; Soaps, AOCS Cc 17-79; Colour, Auto Tintometer Lovibond Colour, PFX 990; Chlorophyll, Auto Tintometer Chlorophyll, PFX 990; Phosphorus & Metals, ICP (AOCS Ba 13-87, Ca 17-01); Fatty Acid Composition, AOCS Ce 1e-91; Tocopherols and Sterols, Slover, H. et al; JAOCS; vol. 60; pp. 1524-1528; 1983, AOCS Ce 8-89.

The extraction of the SDA soybean was to occur in 5 kg lots using the large soxhlet extractor in the pilot plant. During the addition of flakes to the soxhlet, the glass siphon chamber was broken. This forced the use of two soxhlet extractors in the lab. The lab soxhlet held ~1.5 kg of soybean flakes. 10 kg of Lot A (15%) had already been cracked, aspirated and flaked. The flakes of this lot were extracted over a 2 day period using the two lab soxhlets. In between extractions, the flakes from Lot A (15%) were purged with nitrogen and stored in a cooler. All remaining 10 kg lots of soybeans were broken into 3×~3.5 kg extractions to prevent the prolonged exposure of the flakes to air.

During the extraction of the SDA soybean flakes, a nitrogen purge was applied to the top of each soxhlet condenser.

The absolute pressure during all deodorization was between 1.5-2.0 mmHg. Tenox 20 (0.05%) was added to 500 grams of RBD oil from Lot B (15%) and Lot A (20%).

There were no processing anomalies noted in the cracking, aspiration, conditioning, flaking, acid degumming, refining and water washing processing steps.

Analytical data for the process is presented in the following Table.

|  | SDA 15% Lot A | SDA 15% Lot B | SDA 15% Lot C (CO) | SDA 20% Lot A | SDA 20% Lot B (CO) | SDA 30% |
|---|---|---|---|---|---|---|
| WHOLE SEED - as delivered |  |  |  |  |  |  |
| Moisture, % | 9.22 | 9.13 | 9.11 | 9.52 | 9.54 | 9.04 |
| Oil content, % | 20.0 | 19.6 | 19.5 | 19.6 | 20.1 | 20.1 |
| Chlorophyll, ppm | 0.01 | 0.001 | 0.13 | 0.01 | 0.02 | 0.03 |
| Fatty Acid Composition, % |  |  |  |  |  |  |
| C14 (Myristic) | 0.1 | 0.1 | 0.11 | 0.11 | 0.11 | 0.1 |
| C16 (Palmitic) | 12.17 | 12.26 | 12.25 | 12.40 | 12.46 | 12.52 |
| C16:1n7 (Palmitoleic) | 0.1 | 0.1 | 0.1 | 0.1 | 0.1 | 0.15 |
| C18 (Steric) | 3.94 | 3.94 | 3.98 | 3.98 | 4.0 | 4.1 |
| C18:1n9 (Oleic) | 16.3 | 16.44 | 15.88 | 15.78 | 15.22 | 15.17 |
| C18:1(Octadecenoic) | 1.42 | 1.38 | 1.36 | 1.38 | 1.43 | 1.37 |
| C18:2n6 (Linoleic) | 33.7 | 34.12 | 34.29 | 29.68 | 29.11 | 18.46 |
| C18:3n6 (gamma-liooleinic) | 4.38 | 4.2 | 4.32 | 5.42 | 5.57 | 4.71 |
| C18:3n3 (alpha-Linolenic) | 11.59 | 11.72 | 11.62 | 11.04 | 11.24 | 12.78 |
| C18:4n3 (octadecatetraenoic) | 14.73 | 14.24 | 14.57 | 18.54 | 19.18 | 28.92 |
| C20 (Arachidic) | 0.34 | 0.34 | 0.34 | 0.35 | 0.35 | 0.38 |

-continued

|  | SDA 15% Lot A | SDA 15% Lot B | SDA 15% Lot C (CO) | SDA 20% Lot A | SDA 20% Lot B (CO) | SDA 30% |
|---|---|---|---|---|---|---|
| C20:1n9 (Eicosenoic) | 0.21 | 0.21 | 0.21 | 0.21 | 0.21 | 0.22 |
| C22 (Behenic) | 0.32 | 0.32 | 0.33 | 0.32 | 0.32 | 0.34 |
| C24 (Lignoceric) | 0.1 | 0.1 | 0.1 | 0.09 | 0.09 | 0.09 |
| Others | 0.6 | 0.53 | 0.54 | 0.6 | 0.61 | 0.69 |
| Tocopherols, mg/100 g |  |  |  |  |  |  |
| delta | 24.2 | 26.5 | 24.9 | 23.3 | 20.8 | 21.6 |
| gamma | 100 | 103 | 102 | 95.7 | 103 | 102 |
| alpha | 19.4 | 20.3 | 19.6 | 19.1 | 21.1 | 21.9 |
| Sterols, mg/100 g |  |  |  |  |  |  |
| campesterol | 94.3 | 99.5 | 95 | 99.3 | 99.6 | 100 |
| stigmasterol | 74.2 | 78.6 | 73 | 75.8 | 75.3 | 74.2 |
| B-sitosterol | 251 | 263 | 264 | 268 | 292 | 310 |
| Phosphorus, ppm | 9.58 | 79.6 | 61.5 | 109 | 64.1 | 88.0 |
| Ca, ppm | 10.1 | 2.73 | 11.5 | 4.27 | 6.8 | 3.09 |
| Mg, ppm | 1.08 | 3.61 | 3.05 | 4.65 | 3.24 | 3.73 |
| Fe, ppm | 0.05 | 0.15 | 0.42 | 0.2 | 0.16 | 0.24 |
| Cu, ppm | 0.07 | <0.05 | <0.05 | <0.05 | 0.06 | <0.05 |
| 1. CRUDE OIL |  |  |  |  |  |  |
| Peroxide value, meq/kg | 0.46 | 0.0 | 0.0 | 0.82 | 0.0 | — |
| Color, 1" | — | 70Y 3.1R | 70Y 3.5R | 70Y 3.2R | 70Y 3.1R | 60Y 4.1R |
| Chlorophyll, ppm | — | 0.085 | 0.08 | 0.118 | 0.109 | 0.11 |
| Anisidine value | 0.71 | 1.02 | 1.33 | 0.84 | 1.37 | — |
| Fatty Acid Composition, % |  |  |  |  |  |  |
| C14 (Myristic) | 0.11 | 0.11 | 0.11 | 0.11 | 0.11 | 0.11 |
| C16 (Palmitic) | 12.52 | 12.43 | 12.46 | 12.76 | 12.60 | 12.85 |
| C16:1n7 (Palmitoleic) | 0.1 | 0.12 | 0.1 | 0.1 | 0.14 | 0.15 |
| C18 (Steric) | 3.99 | 3.95 | 3.97 | 4.01 | 3.96 | 4.08 |
| C18:1n9 (Oleic) | 15.8 | 15.77 | 15.76 | 15.28 | 15.14 | 14.91 |
| C18:1(Octadecenoic) | 1.41 | 1.40 | 1.43 | 1.44 | 1.38 | 1.38 |
| C18:2n6 (Linoleic) | 34.14 | 33.96 | 33.92 | 29.27 | 29.21 | 18.82 |
| C18:3n6 (gamma-liolenic) | 4.26 | 4.26 | 4.28 | 5.46 | 5.47 | 4.70 |
| C18:3n3 (alpha-Linolenic) | 11.71 | 11.81 | 11.80 | 11.14 | 11.20 | 12.72 |
| C18:4n3 (octadecatetraenoic) | 14.53 | 14.76 | 14.75 | 18.91 | 19.24 | 28.62 |
| C20 (Arachidic) | 0.35 | 0.34 | 0.34 | 0.35 | 0.35 | 0.37 |
| C20:1n9 (Eicosenoic) | 0.21 | 0.21 | 0.21 | 0.21 | 0.22 | 0.22 |
| C22 (Behenic) | 0.33 | 0.33 | 0.32 | 0.33 | 0.33 | 0.34 |
| C24 (Lignoceric) | 0.1 | 0.1 | 0.1 | 0.1 | 0.1 | 0.09 |
| Others | 0.44 | 0.45 | 0.45 | 0.53 | 0.55 | 0.64 |
| Tocopherols, mg/100 g |  |  |  |  |  |  |
| delta | 28.5 | 26.5 | 23.1 | 25.2 | 21.4 | 23.7 |
| gamma | 116 | 111 | 116 | 132 | 113 | 111 |
| alpha | 21.4 | 20.9 | 21.2 | 25.7 | 22.2 | 23.8 |
| Sterols, mg/100 g |  |  |  |  |  |  |
| campesterol | 106 | 105 | 107 | 132 | 109 | 116 |
| stigmasterol | 82.2 | 81.3 | 82.3 | 99.5 | 82.3 | 84.0 |
| B-sitosterol | 270 | 266 | 272 | 347 | 289 | 327 |
| Phosphorus, ppm | 574 | 685 | 664 | 662 | 685 | 746 |
| Ca, ppm | 19.0 | 28.7 | 27.9 | 34.4 | 34.4 | 30.0 |
| Mg, ppm | 28.0 | 33.0 | 32.1 | 33.9 | 35.5 | 34.9 |
| Fe, ppm | 0.45 | 0.38 | 0.36 | 0.5 | 0.51 | 0.51 |
| Cu, ppm | <0.05 | <0.05 | <0.05 | <0.05 0.096 | <0.05 | <0.05 |
| 2. ACID DEGUMMED OIL |  |  |  |  |  |  |
| Free fatty acid, % | 0.32 | 0.11 | 0.17 | 0.16 | 0.14 | 0.34 |
| Phosphorus, ppm | 1.26 | 1.79 | 2.42 | 2.46 | 1.08 | 4.33 |
| Ca, ppm | 0.51 | 0.07 | 0.12 | 0.27 | 0.34 | 0.24 |
| Mg, ppm | 0.42 | 0.07 | <0.04 | 0.17 | 0.18 | <0.04 |
| Fe, ppm | 0.02 | <0.02 | <0.02 | <0.02 | <0.02 | <0.02 |
| Cu, ppm | 0.06 | <0.05 | <0.05 | <0.05 | <0.05 | <0.05 |
| 3. REFINED/WASHED OIL |  |  |  |  |  |  |
| Free fatty acid, % | 0.07 | 0.03 | 0.03 | 0.06 | 0.03 | 0.11 |
| Peroxide value, meq/kg | 0.62 | 0.32 | 0.32 | 1.02 | 0.3 | 0.32 |
| Anisidine value | 0.0 | 0.11 | 0.21 | 0.15 | 0.16 | 0.58 |
| Soap, ppm | 0.0 | 0.0 | 0.0 | 8.4 | 0.0 | 0.0 |
| Phosphorus, ppm | 1.04 | 0.94 | <0.2 | <0.2 | 0.85 | 2.16 |
| Ca, ppm | 0.31 | 0.21 | 0.25 | 0.15 | 0.17 | 0.16 |
| Mg, ppm | 0.5 | <0.04 | <0.04 | <0.04 | 0.08 | <0.04 |

|  | SDA 15% Lot A | SDA 15% Lot B | SDA 15% Lot C (CO) | SDA 20% Lot A | SDA 20% Lot B (CO) | SDA 30% |
|---|---|---|---|---|---|---|
| Fe, ppm | <0.02 | <0.02 | <0.02 | <0.02 | <0.02 | <0.02 |
| Cu, ppm | 0.05 | <0.05 | <0.05 | <0.05 | <0.05 | <0.05 |
| 4. BLEACHED OIL | | | | | | |
| Free fatty acid, % | 0.17 | 0.07 | 0.07 | 0.07 | 0.05 | — |
| Peroxide value, meq/kg | 0.0 | 0.0 | 0.0 | 0.08 | 0.0 | 0.0 |
| Color, 5¼"" | 2.5Y 0.2R | 2.8Y 0.2R | 2.8Y 0.2R | 3.0Y 0.2R | 3.7Y 0.3R | 3.4Y 0.2R |
| Chlorophyll, ppm | 0.0 | 0.0 | 0.0 | 0.0 | 0.0 | 0.0 |
| Anisidine value | 0.0 | 0.03 | 0.07 | 0.07 | 0.15 | 0.27 |
| Soap, ppm | 0.0 | 0.0 | 0.0 | 0.0 | 0.0 | 0.0 |
| Fatty Acid Composition, % | | | | | | |
| C14 (Myristic) | 0.11 | 0.11 | 0.11 | 0.1 | 0.11 | 0.10 |
| C16 (Palmitic) | 12.34 | 12.32 | 12.33 | 12.40 | 12.53 | 12.62 |
| C16:1n7 (Palmitoleic) | 0.1 | 0.1 | 0.13 | 0.1 | 0.14 | 0.14 |
| C18 (Steric) | 3.99 | 3.98 | 3.95 | 4.00 | 3.98 | 4.09 |
| C18:1n9 (Oleic) | 15.91 | 15.88 | 15.84 | 15.34 | 15.26 | 14.91 |
| C18:1(Octadecenoic) | 1.34 | 1.41 | 1.40 | 1.41 | 1.40 | 1.40 |
| C18:2n6 (Linoleic) | 33.99 | 33.75 | 33.70 | 29.10 | 29.08 | 18.71 |
| C18:3n6 (gamma-lioolenic) | 4.28 | 4.28 | 4.28 | 5.51 | 5.50 | 4.72 |
| C18:3n3 (alpha-Linolenic) | 11.74 | 11.78 | 11.77 | 11.19 | 11.16 | 12.72 |
| C18:4n3 (octadecatetraenoic) | 14.76 | 14.82 | 14.92 | 19.30 | 19.31 | 28.90 |
| C20 (Arachidic) | 0.35 | 0.35 | 0.34 | 0.36 | 0.35 | 0.37 |
| C20:1n9 (Eicosenoic) | 0.21 | 0.21 | 0.21 | 0.21 | 0.21 | 0.22 |
| C22 (Behenic) | 0.33 | 0.32 | 0.32 | 0.33 | 0.33 | 0.34 |
| C24 (Lignoceric) | 0.1 | 0.1 | 0.1 | 0.09 | 0.09 | 0.08 |
| Others | 0.45 | 0.59 | 0.60 | 0.56 | 0.55 | 0.68 |
| Phosphorus ppm | <0.2 | 0.53 | <0.2 | <0.2 | <0.2 | <0.2 |
| Ca, ppm | <0.04 | <0.04 | <0.04 | <0.04 | <0.04 | <0.04 |
| Mg, ppm | <0.04 | <0.04 | <0.04 | <0.04 | <0.04 | <0.04 |
| Fe, ppm | <0.02 | <0.02 | <0.02 | <0.02 | <0.02 | <0.02 |
| Cu, ppm | <0.05 | <0.05 | <0.05 | <0.05 | <0.05 | <0.05 |
| 5. RBD OIL | | | | | | |
| Free fatty acids, % | 0.15 | 0.11 | 0.06 | 0.07 | 0.05 | 0.08 |
| Peroxide value, meq/kg | 0.0 | 0.0 | 0.0 | 0.0 | 0.18 | 0.0 |
| Color, 5¼" | 1.1Y 0.0R | 1.3Y 0.1R | 1.3Y 0.0R | 1.3Y 0.0R | 1.7Y 0.1R | 1.5Y 0.0R |
| Chlorophyll, ppm | 0.0 | 0.0 | | 0.0 | 0.0 | 0.0 |
| Anisidine value | 0.14 | 0.03 | 0.32 | 0.18 | 5.16 | 0.0 |
| Fatty Acid Composition, % | | | | | | |
| C14 (Myristic) | 0.11 | 0.11 | 0.11 | 0.11 | 0.11 | 0.11 |
| C16 (Palmitic) | 12.32 | 12.34 | 12.34 | 12.50 | 12.54 | 12.62 |
| C16:1n7 (Palmitoleic) | 0.1 | 0.10 | 0.1 | 0.12 | 0.14 | 0.14 |
| C18 (Steric) | 3.97 | 3.97 | 3.98 | 4.00 | 3.98 | 4.10 |
| C18:1n9 (Oleic) | 15.83 | 15.90 | 15.97 | 15.34 | 15.30 | 15.00 |
| C18:1(Octadecenoic) | 1.39 | 1.42 | 1.34 | 1.40 | 1.38 | 1.35 |
| C18:2n6 (Linoleic) | 33.98 | 33.80 | 33.78 | 29.11 | 29.12 | 18.74 |
| C18:3n6 (gamma-lioolenic) | 4.29 | 4.28 | 4.28 | 5.51 | 5.50 | 4.73 |
| C18:3n3 (alpha-Linolenic) | 11.74 | 11.78 | 11.76 | 11.16 | 11.16 | 12.72 |
| C18:4n3 (octadecatetraenoic) | 14.79 | 14.77 | 14.80 | 19.22 | 19.25 | 28.75 |
| C20 (Arachidic) | 0.35 | 0.35 | 0.35 | 0.36 | 0.35 | 0.38 |
| C20:1n9 (Eicosenoic) | 0.21 | 0.21 | 0.21 | 0.20 | 0.21 | 0.25 |
| C22 (Behenic) | 0.33 | 0.33 | 0.33 | 0.32 | 0.33 | 0.34 |
| C24 (Lignoceric) | 0.1 | 0.1 | 0.1 | 0.09 | 0.09 | 0.08 |
| Others | 0.49 | 0.54 | 0.55 | 0.56 | 0.54 | 0.69 |
| Tocopherols, mg/100 g | | | | | | |
| delta | 24.1 | 24.6 | 22.6 | 22.6 | 24.1 | 17.1 |
| gamma | 112 | 111 | 127 | 127.9 | 130 | 105 |
| alpha | 21.9 | 21.3 | 26.7 | 23.4 | 26.4 | 24.4 |
| Sterols, mg/100 g | | | | | | |
| campesterol | 71.8 | 50 | 76.6 | 65.1 | 78.9 | 65.9 |
| stigmasterol | 49.3 | 32.0 | 51.0 | 41.8 | 50.6 | 38.3 |
| B-sitosterol | 222 | 178 | 246 | 237.2 | 260 | 236 |
| Phosphorus ppm | <0.2 | <0.2 | <0.2 | <0.2 | <0.2 | <0.2 |
| Ca, ppm | <0.04 | <0.04 | <0.04 | <0.04 | <0.04 | <0.04 |
| Mg, ppm | <0.04 | <0.04 | <0.04 | <0.04 | <0.04 | <0.04 |
| Fe, ppm | <0.02 | <0.02 | <0.02 | <0.02 | <0.02 | <0.02 |
| Cu, ppm | <0.05 | <0.05 | <0.05 | <0.05 | <0.05 | <0.05 |

Example 35

Large Scale Processing of High SDA Canola Seeds

Unless otherwise indicated, the process of Example 34 was used to process the high SDA canola seeds.

Approximately 2.5 kg of seeds were crushed; analytical data for the whole seed is found below. Four runs were carried out using Schlenk techniques, airless transfer, and/or nitrogen blanketing. Use of nitrogen was required wherever possible during cracking, flaking, extracting, desolventizing, distillation, and during all steps of refining.

General Laboratory Procedures and Equipment: All operations were performed in an inert atmosphere (under an active purge with nitrogen) and utilizing a glove bag when possible. All solvents and solutions were previously degassed with a subsurface sparging of nitrogen.

Tempering/Drying: Depending on the moisture content of the seed, the seed was tempered. If the moisture content was below 7.0%, the seed was sprayed with water to achieve a moisture content of approximately 8%. After water spraying, the seed was placed in a container and allowed to equilibrate a minimum of 16 hours. Approximately, 500 g of seed was loaded into the lab fluidized bed drier. The drier was set to have an inlet air temperature of 55° C.-60° C. and run for about 10-15 minutes; particularly to obtain seed having 7.5-11% moisture content.

Flaking: The tempered seed was flaked using lab flaking rolls.

Cooking: Canola (1 L) was heated for about 2-3 minutes at full power in the lab microwave oven to obtain temperatures of 80-90° C. Then, the seeds were transferred to the convention oven heated to 95-100° C. and maintained for 20-30 minutes.

Pressing: The cooked, flaked seed was pressed on the Gusta laboratory fed at approximately 5 kg/h. The oil was centrifuged to remove solids.

Solvent Extraction: About 8 L of new hexane was used.

Blending Crude Oils: The crude press and solvent extracted oils were combined.

Acid Degumming: The oil was heated to 53±2° C.

Refining: The degummed oil was heated to 65±5° C. The mixture was heated to 75±5° C. and centrifuged.

Water Washing: The oil was heated to 75±5° C.

Bleaching: The oil was heated in a Parr reactor to 62±2° C., 1.5% Supreme 167FF bleaching clay was added. A vacuum was pulled and the mixture was heated to 110° C. and held for 30 min. The mixture was then cooled to 65° C. and filtered using filter aid.

Deodorization: The oil was loaded into a 2 L glass deodorizer. The oil was heated to 180° C. with retention time of 120 minutes. Sparge steam was added at 3% w/w of oil weight at 100° C. The oil was cooled with sparging to 70° C. before leaving the deodorizer.

Analytical data for the process is presented in the following Table.

| | N2 Seed | |
|---|---|---|
| 1.0 SDA Seed | | |
| Moisture, % | 5.92 | |
| Oil Content, % | 38.96 | |
| 2.0 Tempered SDA seed | | |
| Moisture, % | 7.68 | 7.73 |
| 3.0 Press Oil | | |
| Peroxide value, meq/kg | 6.0 | — |
| Free fatty acid, % | 0.45 | — |
| 4.0 Solvent Oil | | |
| Peroxide value, meq/kg | 2.46 | 2.54 |
| p-Anisidine Value | | 1.97 |
| 5.0 Crude Oil | | |
| Peroxide value, meq/kg | 4.4 | |
| p-Anisidine Value | 3.54 | |
| Fatty Acid Composition, % | (relative) | |
| C14 | 0.08 | 0.07 |
| C16 | 5.59 | 5.55 |
| C16:1 | 0.47 | 0.4 |
| C18 | 2.64 | 2.66 |
| C18:1 | 34.57 | 35.44 |
| C18:1 (isomer) | 3.5 | 3.21 |
| C18:2 (isomer) | 2.21 | 2.25 |
| C18:2 | 10.01 | 9.98 |
| C18:3n6 | 20.3 | 20.33 |
| C18:3n3 | 7.78 | 7.74 |
| C18:4 | 9.46 | 9.29 |
| C20 | 0.95 | 0.96 |
| C20:1 | 0.81 | 0.79 |
| C20:2 | 0.09 | 0.1 |
| C22 | 0.40 | 0.4 |
| C22:1n9 | 0.01 | 0.01 |
| C24 | 0.24 | 0.24 |
| C24:1 | 0.07 | 0.07 |
| Others | 0.82 | 0.52 |
| Chlorophyll, ppm | 128 | 88.8 |
| Color, 1" | TDTR | TDTR |
| 6.0 Acid Degummed Oil | | |
| Free fatty acid, % | 0.69 | 0.69 |
| Phos, ppm | 120 | 301.6 |
| 7.0 Oil + H3PO4 | | |
| Free fatty acid, % | 1.02 | 1.046 |
| 8.0 Refined Washed Oil | | (Trysil treated) |
| Free fatty acid, % | 0.023 | 0.09 |
| Soap, ppm | 24 | 655 |
| Phos, ppm | 6.78 | 1.46 |
| 9.0 Bleached Oil | | |
| Peroxide value, meq/kg | 0.4 | 0.21 |
| Free fatty acid, % | 0.11 | 0.056 |
| Chlorophyll, ppm (990) | 0.282 | 0.096 |
| Color, 5¼" | 70Y 4.5R | 70Y 4.0R |
| Soaps, ppm | 0.0 | 0.0 |
| Phos, ppm | <0.2 | <0.2 |
| Ca, ppm | 0.51 | 0.18 |
| Na, ppm | <0.2 | <0.20 |
| Fe, ppm | 0.1 | 0.03 |
| Mg, ppm | 0.1 | <0.04 |
| Cu, ppm | <0.05 | <0.05 |
| Fatty Acid Composition, % | (relative) | |
| C14 | 0.08 | 0.07 |
| C16 | 5.42 | 5.36 |
| C16:1 | 0.46 | 0.37 |
| C18 | 2.61 | 2.61 |
| C18:1 | 34.51 | 35.26 |
| C18:1 (isomer) | 3.44 | 3.01 |
| C18:2 (isomer) | 2.15 | 2.17 |
| C18:2 | 10.08 | 10.01 |
| C18:3n6 | 20.68 | 20.70 |
| C18:3n3 | 7.87 | 7.84 |
| C18:4 | 9.62 | 9.52 |
| C20 | 0.96 | 0.95 |
| C20:1 | 0.77 | 0.78 |
| C20:2 | 0.1 | 0.1 |
| C22 | 0.4 | 0.4 |
| C22:1n9 | <0.01 | 0.01 |
| C24 | 0.24 | 0.23 |

|  | N2 Seed | |
|---|---|---|
| C24:1 | 0.07 | 0.07 |
| Others | 0.54 | 0.54 |
| p-Anisidine Value | 5.82 | 2.33 |
| 10.0 RBD Oil | | |
| Free fatty acid, % | 0.08 | 0.056 |
| Chlorophyll, ppm (990) | 0.241 | 0.079 |
| Color, 5¼" | 70Y 2.7R | 70Y 1.2R |
| Peroxide value, meq/kg | 0.0 | 0.0 |
| Fatty Acid Composition, % | (relative) | |
| C14 | 0.08 | 0.07 |
| C16 | 5.46 | 5.37 |
| C16:1 | 0.45 | 0.38 |
| C18 | 2.62 | 2.62 |
| C18:1 | 34.66 | 35.24 |
| C18:1 (isomer) | 3.36 | 3.08 |
| C18:2 (isomer) | 2.14 | 2.17 |
| C18:2 | 10.08 | 10.02 |
| C18:3n6 | 20.64 | 20.66 |
| C18:3n3 | 7.87 | 7.83 |
| C18:4 | 9.58 | 9.46 |

|  | N2 Seed | |
|---|---|---|
| C20 | 0.94 | 0.95 |
| C20:1 | 0.78 | 0.8 |
| C20:2 | 0.10 | 0.1 |
| C22 | 0.41 | 0.41 |
| C22:1n9 | <0.01 | <0.01 |
| C24 | 0.25 | 0.23 |
| C24:1 | 0.08 | 0.07 |
| Others | 0.50 | 0.53 |
| P-Anisidine Value | 5.10 | 2.47 |

Example 36

Large Scale High SDA Soybean Processing

Unless otherwise indicated, the soybeans were processed as described in Example 34. In this run, each piece of equipment and solvent contacting the seed meats or oil was degassed either by vacuum or by an active purge of nitrogen. Analytical results for the processing follow.

|  | Batch #1 | Batch #2 | Batch #3 | Batch #4 | Batch #5 | Batch #6 | Batch #7 | Batch #8 | Batch #9 |
|---|---|---|---|---|---|---|---|---|---|
| 0. WHOLE SEED - as delivered | | | | | | | | | |
| Moisture, % | 10.1 | 10.3 | 11.3 | 11.3 | 11.0 | 11.0 | 11.2 | 11.2 | 11.1 |
| Oil Content, % (as is) | 18.0 | 18.0 | 17.9 | 18.0 | 17.7 | 18.0 | 18.1 | 19.9 | 19.4 |
| Fatty acid composition, % | | | | | | 0.12 | 0.13 | 0.11 | 0.10 |
| C14 (Myristic) | 0.16 | 0.12 | 0.12 | 0.12 | 0.12 | 12.42 | 12.42 | 12.40 | 12.31 |
| C16 (Palmitic) | 12.39 | 12.38 | 12.37 | 12.35 | 12.36 | 0.15 | 0.15 | 0.09 | 0.09 |
| C16:1n7 (Palmitoleic) | 0.15 | 0.15 | 0.15 | 0.15 | 0.15 | 4.27 | 4.20 | 4.23 | 4.28 |
| C18 (Steric) | 4.20 | 4.22 | 4.21 | 4.22 | 4.22 | 18.36 | 18.72 | 18.50 | 19.35 |
| C18:1n9 (Oleic) | 18.50 | 18.52 | 18.68 | 18.92 | 18.42 | 1.23 | 1.22 | 1.41 | 1.44 |
| C18:1 (Octadecenoic) | 1.32 | 1.24 | 1.26 | 1.31 | 1.34 | 24.11 | 23.81 | 24.16 | 24.34 |
| C18:2n6 (Linoleic) | 23.83 | 24.12 | 24.06 | 24.01 | 24.23 | 6.23 | 6.28 | 6.22 | 6.12 |
| C18:3n6 (gamma-linolenic) | 6.23 | 6.20 | 6.24 | 6.16 | 6.22 | 10.14 | 10.17 | 10.07 | 10.02 |
| C18:3n3 (alpha-Linolenic) | 10.10 | 10.15 | 10.14 | 10.12 | 10.16 | 21.29 | 21.20 | 21.08 | 20.36 |
| C18:4n3 (Octadecatetraenoic) | 21.28 | 21.11 | 21.11 | 20.94 | 21.01 | 0.36 | 0.36 | 0.36 | 0.36 |
| C20 (Arachidic) | 0.36 | 0.36 | 0.36 | 0.36 | 0.36 | 0.24 | 0.24 | 0.20 | 0.20 |
| C20:1n9 (Eicosenoic) | 0.24 | 0.24 | 0.24 | 0.24 | 0.24 | 0.03 | 0.03 | 0.03 | 0.02 |
| C20:2n6 (Eicosadienoic) | 0.03 | 0.03 | 0.03 | 0.03 | 0.03 | 0.30 | 0.30 | 0.30 | 0.30 |
| C22 (Behenic) | 0.30 | 0.31 | 0.30 | 0.30 | 0.31 | 0.07 | 0.07 | 0.06 | 0.06 |
| C24 (Lignoceric) | 0.07 | 0.07 | 0.07 | 0.07 | 0.07 | 0.68 | 0.70 | 0.78 | 0.65 |
| Others | 0.84 | 0.78 | 0.66 | 0.70 | 0.76 | | | | |
| 2. CRUDE SOYBEAN OIL | | | | | | | | | |
| Free fatty acid, % | 0.48 | 0.44 | 0.50 | 0.47 | 0.49 | 0.48 | 0.48 | 0.50 | 0.46 |
| Color, 1" | 70Y 2.8R | 70Y 2.6R | 70Y 2.8R | 70Y 2.7R | 70Y 2.8R | 70Y 2.6R | 70Y 2.6R | 70Y 2.3R | 70Y 2.6R |
| PV, meq/kg | 0.49 | 0.34 | 0.36 | 0.38 | 0.68 | 0.56 | 0.20 | 0.28 | 0.30 |
| Chlorophyll, ppm | 0.076 | 0.069 | 0.075 | 0.057 | 0.048 | 0.025 | 0.052 | 0.055 | 0.056 |
| Anisidine value | 0.89 | 0.69 | 0.70 | 0.61 | 0.67 | 0.73 | 0.60 | 0.47 | 0.85 |
| Phosphorous, ppm | 1050 | 1050 | 1090 | 1090 | 1060 | 1060 | 1030 | 1050 | 962 |
| Ca, ppm | 97.6 | 94.1 | 114 | 109 | 109 | 103 | 112 | 99.3 | 101 |
| Mg, ppm | 74.1 | 73.6 | 87.5 | 86.9 | 85.3 | 83.4 | 88.2 | 80.7 | 80.2 |
| Fe, ppm | 1.93 | 0.87 | 1.84 | 0.72 | 0.47 | 0.43 | 0.45 | 0.49 | 0.64 |
| Cu, ppm | <0.05 | <0.05 | <0.05 | <0.05 | <0.05 | <0.05 | <0.05 | <0.05 | <0.05 |
| Na, ppm | 5.93 | 1.72 | 5.25 | 6.7 | 7.31 | 2.43 | 6.33 | 3.63 | 6.89 |
| Tocopherols, mg/100 g | | | | | | | | | |
| delta | 27.6 | 27.4 | 26.2 | 26.8 | 26.0 | 25.3 | 25.9 | 25.2 | 24.9 |
| gamma | 96.5 | 95.1 | 94.4 | 95.9 | 93.8 | 92.8 | 91.5 | 91.4 | 90.4 |
| alpha | 11.8 | 11.4 | 11.6 | 11.7 | 11.4 | 11.3 | 11.2 | 11.2 | 11.1 |
| Sterols, mg/100 g | | | | | | | | | |
| campesterol | 76.2 | 74.2 | 77.5 | 75.1 | 73.8 | 72.9 | 71.8 | 71.5 | 71.0 |
| stigmasterol | 63.3 | 61.4 | 63.6 | 62.0 | 61.2 | 61.1 | 59.7 | 59.4 | 58.9 |

-continued

|  | Batch #1 | Batch #2 | Batch #3 | Batch #4 | Batch #5 | Batch #6 | Batch #7 | Batch #8 | Batch #9 |
|---|---|---|---|---|---|---|---|---|---|
| B-sitosterol | 220.4 | 214.1 | 224.4 | 222.1 | 217.4 | 216.9 | 213.0 | 213.0 | 211.1 |
| FAC, % |  |  |  |  |  |  |  |  |  |
| C14 (Myristic) | 0.09 | 0.09 | 0.09 | 0.09 | 0.09 | 0.09 | 0.09 | 0.08 | 0.09 |
| C16 (Palmitic) | 12.62 | 12.55 | 12.55 | 12.54 | 12.56 | 12.60 | 12.67 | 12.60 | 12.58 |
| C16:1n7 (Palmitoleic) | 0.15 | 0.15 | 0.14 | 0.15 | 0.15 | 0.15 | 0.10 | 0.09 | 0.09 |
| C18 (Steric) | 4.28 | 4.26 | 4.25 | 4.25 | 4.26 | 4.28 | 4.26 | 4.25 | 4.25 |
| C18:1n9 (Oleic) | 18.70 | 18.64 | 18.59 | 18.52 | 18.60 | 18.72 | 18.50 | 18.52 | 18.46 |
| C18:1 (Octadecenoic) | 1.31 | 1.32 | 1.26 | 1.34 | 1.27 | 1.25 | 1.48 | 1.46 | 1.44 |
| C18:2n6 (Linoleic) | 24.46 | 24.38 | 24.41 | 24.44 | 24.46 | 24.54 | 24.53 | 24.51 | 24.48 |
| C18:3n6 (gamma-linolenic) | 6.12 | 6.13 | 6.16 | 6.15 | 6.14 | 6.13 | 6.16 | 6.18 | 6.18 |
| C18:3n3 (alpha-Linolenic) | 10.18 | 10.20 | 10.20 | 10.19 | 10.18 | 10.17 | 10.06 | 10.06 | 10.10 |
| C18:4n3 (Octadecatetraenoic) | 20.48 | 20.67 | 20.70 | 20.73 | 20.67 | 20.48 | 20.52 | 20.65 | 20.76 |
| C20 (Arachidic) | 0.36 | 0.36 | 0.36 | 0.36 | 0.36 | 0.36 | 0.36 | 0.35 | 0.36 |
| C20:1n9 (Eicosenoic) | 0.24 | 0.24 | 0.24 | 0.24 | 0.24 | 0.24 | 0.18 | 0.18 | 0.18 |
| C20:2n6 (Eicosadienoic) | 0.03 | 0.03 | 0.03 | 0.03 | 0.03 | 0.03 | 0.03 | 0.02 | 0.02 |
| C22 (Behenic) | 0.31 | 0.31 | 0.31 | 0.31 | 0.31 | 0.31 | 0.31 | 0.30 | 0.30 |
| C24 (Lignoceric) | 0.07 | 0.07 | 0.07 | 0.07 | 0.07 | 0.08 | 0.06 | 0.05 | 0.06 |
| Others | 0.60 | 0.60 | 0.64 | 0.59 | 0.61 | 0.57 | 0.69 | 0.70 | 0.65 |
| 3. ACID DEGUMMED OIL |  |  |  |  |  |  |  |  |  |
| Free fatty acid, % | 0.83 | 0.13 | 0.21 | 0.47 | 0.43 | 0.29 | 0.27 | 0.38 | 0.95 |
| Phosphorus, ppm | 930 | 81.7 | 214 | 97.8 | 467 | 271 | 277 | 428 | 1100 |
| Ca, ppm | 90.9 | 8.4 | 23.0 | 10.7 | 49.6 | 28.4 | 30.5 | 40.1 | 108 |
| Mg, ppm | 72.2 | 6.21 | 17.4 | 8.11 | 38.3 | 23.1 | 23.3 | 32.8 | 86.3 |
| Fe, ppm | 0.84 | 0.08 | 0.31 | 0.10 | 0.23 | 0.14 | 0.13 | 0.16 | 0.72 |
| Cu, ppm | <0.05 | <0.05 | <0.05 | <0.05 | <0.05 | <0.05 | <0.05 | <0.05 | <0.05 |
| Na, ppm | 4.87 | 3.52 | 2.14 | 1.09 | 2.26 | 0.62 | 2.41 | 2.12 | 4.63 |
| 4. REFINED/WASHED OIL |  |  |  |  |  |  |  |  |  |
| Free fatty acid, % | 0.05 | 0.05 | 0.04 | 0.03 | 0.06 | 0.03 | 0.03 | 0.05 | 0.13 |
| Soaps, ppm | 0.0 | 0.0 | 0.0 | 0.0 | 0.0 | 0.0 | 0.0 | 0.0 | 0.0 |
| Phosphorous, ppm | 3.07 | 0.97 | 1.12 | 1.30 | 0.80 | 0.89 | 0.24 | 0.58 | 0.72 |
| Ca, ppm | 0.21 | 0.1 | 0.1 | 0.11 | 0.10 | 0.14 | 0.05 | 0.12 | 0.10 |
| Mg, ppm | 0.37 | 0.06 | 0.06 | 0.07 | 0.07 | 0.06 | <0.04 | <0.04 | <0.04 |
| Fe, ppm | <0.02 | <0.02 | <0.02 | <0.02 | <0.02 | <0.02 | <0.02 | <0.02 | <0.02 |
| Cu, ppm | <0.05 | <0.05 | <0.05 | <0.05 | <0.05 | <0.05 | <0.05 | <0.05 | <0.05 |
| Na, ppm | 1.06 | <0.02 | 0.58 | 0.34 | 0.44 | 0.31 | <0.20 | 0.25 | <0.200 |
| 5.0 BLEACHED OIL |  |  |  |  |  |  |  |  |  |
| Free fatty acid, % | 0.08 | 0.08 | — | — | 0.06 | — | — | — | 0.08 |
| PV, meq/kg | 0.0 | 0.0 | 0.18 | 0.10 | 0.18 | 0.12 | 0.12 | 0.14 | 0.18 |
| Color, 5¼" | 4.8Y 0.3R | 3.8Y 0.3R | 6Y 0.2R | 6.8Y 0.3R | 4.9Y 0.4R | 4.0Y 0.3R | 3.9Y 0.2R | 4.7Y 0.3R | 9.9Y 0.3R |
| Chlorophyll, ppm | 0.0 | 0.0 | 0.0 | 0.0 | 0.0 | 0.0 | 0.0 | 0.0 | 0.0 |
| Phosphorous, ppm | 1.32 | <0.2 | 0.22 | <0.20 | <0.2 | <0.2 | <0.2 | <0.2 | <0.2 |
| Ca, ppm | <0.04 | <0.04 | 0.08 | <0.04 | <0.04 | <0.04 | <0.04 | <0.04 | <0.04 |
| Mg, ppm | <0.04 | <0.04 | <0.04 | <0.04 | <0.04 | <0.04 | <0.04 | <0.04 | <0.04 |
| Fe, ppm | <0.02 | <0.02 | <0.02 | <0.02 | <0.02 | <0.02 | <0.02 | <0.02 | <0.02 |
| Cu, ppm | <0.05 | <0.05 | <0.05 | <0.05 | <0.05 | <0.05 | <0.05 | <0.05 | <0.05 |
| Na, ppm | <0.20 | <0.20 | <0.20 | <0.20 | <0.20 | <0.20 | <0.20 | <0.20 | <0.20 |
| Soaps, ppm | 0.0 | 0.0 | 0.0 | 0.0 | 0.0 | 0.0 | 0.0 | 0.0 | 0.0 |
| Anisidine value | 0.05 | 0.0 | 0.16 | 0.01 | 0.16 | 0.11 | 0.31 | 0.03 | 0.15 |
| FAC, % |  |  |  |  |  |  |  |  |  |
| C14 (Myristic) | 0.09 | 0.08 | 0.08 | 0.10 | 0.09 | 0.08 | 0.08 | 0.08 | 0.09 |
| C16 (Palmitic) | 12.34 | 12.31 | 12.34 | 12.39 | 12.33 | 12.34 | 12.34 | 12.36 | 12.35 |
| C16:1n7 (Palmitoleic) | 0.14 | 0.14 | 0.09 | 0.10 | 0.09 | 0.09 | 0.14 | 0.14 | 0.12 |
| C18 (Steric) | 4.25 | 4.24 | 4.23 | 4.24 | 4.22 | 4.25 | 4.25 | 4.24 | 4.24 |
| C18:1n9 (Oleic) | 18.76 | 18.80 | 18.62 | 18.62 | 18.53 | 18.64 | 18.29 | 18.34 | 18.49 |
| C18:1 (Octadecenoic) | 1.32 | 1.30 | 1.44 | 1.46 | 1.46 | 1.42 | 1.75 | 1.72 | 1.48 |
| C18:2n6 (Linoleic) | 24.13 | 24.06 | 24.12 | 24.12 | 24.10 | 24.14 | 24.06 | 24.02 | 24.10 |
| C18:3n6 (gamma-linolenic) | 6.18 | 6.18 | 6.25 | 6.23 | 6.25 | 6.23 | 6.25 | 6.24 | 6.24 |

-continued

|  | Batch #1 | Batch #2 | Batch #3 | Batch #4 | Batch #5 | Batch #6 | Batch #7 | Batch #8 | Batch #9 |
|---|---|---|---|---|---|---|---|---|---|
| C18:3n3 (alpha-Linolenic) | 10.15 | 10.14 | 10.02 | 10.01 | 10.03 | 10.04 | 9.97 | 9.97 | 10.03 |
| C18:4n3 (Octadecatetraenoic) | 21.10 | 21.16 | 21.20 | 21.14 | 21.28 | 21.21 | 21.20 | 21.24 | 21.28 |
| C20 (Arachidic) | 0.37 | 0.36 | 0.36 | 0.36 | 0.35 | 0.35 | 0.34 | 0.33 | 0.36 |
| C20:1n9 (Eicosenoic) | 0.22 | 0.21 | 0.17 | 0.19 | 0.17 | 0.17 | 0.16 | 0.16 | 0.17 |
| C20:2n6 (Eicosadienoic) | 0.03 | 0.03 | 0.03 | 0.03 | 0.03 | 0.02 | 0.03 | 0.03 | 0.03 |
| C22 (Behenic) | 0.30 | 0.30 | 0.29 | 0.30 | 0.29 | 0.29 | 0.28 | 0.28 | 0.29 |
| C24 (Lignoceric) | 0.07 | 0.07 | 0.05 | 0.06 | 0.05 | 0.06 | 0.04 | 0.06 | 0.07 |
| Others | 0.55 | 0.62 | 0.71 | 0.65 | 0.73 | 0.67 | 0.82 | 0.79 | 0.66 |
| 6. RBD SOYBEAN OIL | | | | | | | | | |
| Free fatty acid, % | 0.06 | 0.08 | 0.04 | 0.04 | 0.05 | 0.06 | 0.04 | 0.06 | 0.08 |
| PV, meq/kg | 0.0 | 0.0 | 0.0 | 0.0 | 0.0 | 0.0 | 0.0 | 0.0 | 0.0 |
| Color, 5¼" | 2.3Y 0.0R | 1.8Y 0.1R | 2.5Y 0.2R | 2.9Y 0.2R | 2.1Y 0.0R | 1.8Y 0.2R | 1.8Y 0.1R | 2.2Y 0.1R | 4.2Y 0.2R |
| Chlorophyll, ppm | 0.0 | 0.0 | 0.0 | 0.0 | 0.0 | 0.0 | 0.0 | 0.0 | 0.0 |
| Anisidine value | 0.09 | 0.18 | 0.0 | 0.16 | 0.11 | 0.25 | 0.26 | 0.18 | 0.28 |
| Tocopherols, mg/100 g | | | | | | | | | |
| delta | 22.9 | 22.6 | 23.5 | 24.2 | 23.4 | 24.1 | 22.2 | 24.0 | 26.4 |
| gamma | 96.2 | 94.3 | 94.8 | 95.1 | 93.8 | 94.4 | 93.0 | 94.4 | 94.9 |
| alpha | 12.3 | 12.3 | 12.1 | 12.1 | 12.0 | 12.1 | 12.1 | 12.1 | 11.8 |
| Sterols, mg/100 g | | | | | | | | | |
| campesterol | 62.8 | 56.9 | 53.2 | 53.1 | 51.5 | 51.6 | 52.9 | 48.4 | 53.7 |
| stigmasterol | 50.7 | 43.6 | 40.2 | 39.9 | 38.4 | 38.0 | 40.0 | 35.1 | 41.3 |
| B-sitosterol | 199.0 | 185.9 | 182.2 | 181.8 | 178.6 | 177.6 | 180.2 | 170.4 | 180.2 |
| FAC, % | | | | | | | | | |
| C14 (Myristic) | 0.14 | 0.09 | 0.08 | 0.08 | 0.08 | 0.08 | 0.08 | 0.08 | 0.08 |
| C16 (Palmitic) | 12.34 | 12.34 | 12.36 | 12.35 | 12.36 | 12.36 | 12.36 | 12.41 | 12.37 |
| C16:1n7 (Palmitoleic) | 0.1 | 0.14 | 0.09 | 0.09 | 0.09 | 0.09 | 0.15 | 0.15 | 0.12 |
| C18 (Steric) | 4.25 | 4.25 | 4.24 | 4.24 | 4.24 | 4.24 | 4.26 | 4.26 | 4.25 |
| C18:1n9 (Oleic) | 18.76 | 18.90 | 18.66 | 18.68 | 18.63 | 18.64 | 18.34 | 18.41 | 18.53 |
| C18:1 (Octadecenoic) | 1.32 | 1.25 | 1.46 | 1.42 | 1.42 | 1.41 | 1.73 | 1.74 | 1.48 |
| C18:2n6 (Linoleic) | 24.14 | 24.09 | 24.16 | 24.15 | 24.16 | 24.15 | 24.10 | 24.10 | 24.14 |
| C18:3n6 (gamma-linolenic) | 6.22 | 6.18 | 6.24 | 6.24 | 6.24 | 6.22 | 6.24 | 6.22 | 6.23 |
| C18:3n3 (alpha-Linolenic) | 10.16 | 10.14 | 10.00 | 10.02 | 10.02 | 10.02 | 9.98 | 9.96 | 10.02 |
| C18:4n3 (Octadecatetraenoic) | 21.12 | 21.06 | 21.08 | 21.15 | 21.15 | 21.12 | 21.11 | 21.07 | 21.18 |
| C20 (Arachidic) | 0.37 | 0.36 | 0.36 | 0.36 | 0.36 | 0.36 | 0.33 | 0.33 | 0.35 |
| C20:1n9 (Eicosenoic) | 0.21 | 0.23 | 0.19 | 0.17 | 0.17 | 0.21 | 0.16 | 0.16 | 0.17 |
| C20:2n6 (Eicosadienoic) | 0.03 | 0.03 | 0.03 | 0.02 | 0.02 | 0.03 | 0.03 | 0.02 | 0.03 |
| C22 (Behenic) | 0.30 | 0.30 | 0.29 | 0.29 | 0.30 | 0.30 | 0.28 | 0.28 | 0.30 |
| C24 (Lignoceric) | 0.07 | 0.07 | 0.04 | 0.06 | 0.06 | 0.06 | 0.05 | 0.05 | 0.07 |
| Others | 0.47 | 0.57 | 0.72 | 0.68 | 0.70 | 0.71 | 0.80 | 0.76 | 0.68 |

Example 37

Large Scale High SDA Canola Processing

The high SDA Canola seeds were processed according to the process in Example 36. Various deodorizer conditions were used as described below. The analytical data from the seed and oil throughout the process is presented below.

| Fatty acid composition, % | Tempered Canola | Flaked Canola | Press Cake | Press Oil | Crude Canola Oil | Bleached Oil |
|---|---|---|---|---|---|---|
| C12 (Lauric) | 0.01 | | 0.01 | | 0.01 | |
| C14 (Myristic) | 0.08 | | 0.08 | 0.07 | 0.07 | 0.07 |
| C16 (Palmitic) | 5.23 | | 5.62 | 5.22 | 5.26 | 4.94 |
| C16:1 (Trans-Hexadecanoic) | <0.01 | | <0.01 | <0.01 | <0.01 | <0.01 |
| C16:1n7 (Palmitoleic) | 0.45 | | 0.62 | 0.38 | 0.41 | 0.40 |
| C18 (Stearic) | 3.00 | | 3.07 | 3.06 | 3.04 | 2.88 |

|  |  |  |  |  |  |
|---|---|---|---|---|---|
| C18:1 (Trans-Octadecenoic) | 0.05 |  | 0.05 | 0.06 | 0.05 | 0.06 |
| C18:1n9 (Oleic) | 53.61 |  | 53.62 | 54.73 | 54.41 | 53.59 |
| C18:2(Trans-Octadecadienoic) | 4.18 |  | 4.26 | 4.61 | 4.46 | 4.50 |
| C18:2n6 (Linoleic) | 6.7 |  | 6.23 | 5.88 | 6.12 | 6.35 |
| C18:3 (Trans-Octadecatrienoic) | 0.15 |  | 0.19 | 0.13 | 0.14 | 0.12 |
| C18:3n6 (gamma-linolenic) | 7.41 |  | 6.35 | 7.04 | 7.11 | 7.54 |
| C18:3n3 (alpha-Linolenic) | 6.06 |  | 6.08 | 5.80 | 5.82 | 6.07 |
| C18:4n3 (Trans-Octadecatetraenoic) | 0.15 |  | 0.16 | 0.16 | 0.16 | 0.22 |
| C18:4n3 (octadecatetraenoic) | 9.0 |  | 9.48 | 9.18 | 9.00 | 9.85 |
| C20 (Arachidic) | 0.88 |  | 0.9 | 0.9 | 0.90 | 0.85 |
| C20:1n9 (Eicosenoic) | 1.26 |  | 1.22 | 1.21 | 1.28 | 1.03 |
| C20:2n6 (Eicosadienoic) | 0.06 |  | 0.05 | 0.05 | 0.05 | 0.05 |
| C22 (Behenic) | 0.46 |  | 0.49 | 0.47 | 0.47 | 0.44 |
| C22:1n9 (Erucic) | 0.01 |  | 0.02 | 0.07 | 0.01 | 0.06 |
| C24 (Lignoceric) | 0.23 |  | 0.26 | 0.22 | 0.22 | 0.20 |
| C24:1n9 (Nervonic) | 0.09 |  | 0.1 | 0.08 | 0.09 | 0.08 |
| Others | 0.93 |  | 1.14 | 0.68 | 0.92 | 0.70 |
| Moisture, % | 7.72 |  | 8.12 |  |  |  |
| 781 Oil content, % | 36.5 |  | 17.19 (avg) |  |  |  |
| 782 Ash, % | 4.3 |  | 5.64 |  |  |  |
| 783 Crude Fibre, % | 5.83 |  | 7.04 |  |  |  |
| 784 Protein, % | 25.2 |  | 33.4 |  |  |  |
| p-Anisidine Value |  |  | 6.96 | 5.26 | 4.61 | 3.84 |
| Peroxide Value, meq/kg |  |  | 3.74 | 1.9 | 7.27 | 0.26 |
| Tocopherols, mg/100 g |  |  |  |  |  |  |
| delta |  |  | 0.44 |  | 0.75 | 0.75 |
| gamma |  |  | 24.5 |  | 27.2 | 25.6 |
| alpha |  |  | 28.2 |  | 25.4 | 26.9 |
| Phosphorus, ppm | 7168.8 |  | 10052.3 | 595.6 | 667.1 | <0.2 |
| Ca, ppm | 4412.0 |  | 5705 | 451.5 | 288.7 | <0.04 |
| Mg, ppm | 5893.3 |  | 7725.3 | 147.6 | 119.6 | 0.1 |
| Fe, ppm | <0.02 |  | <0.2 | 3.77 | 3.7 | <0.02 |
| Cu, ppm | 3.23 |  | 4.76 | 0.36 | 0.21 | <0.05 |
| Na, ppm | 259.7 |  | 434.0 | 34.04 | 6.4 | <0.20 |

| 11. RBD Canola Oil | Trial (18/225) | Trial (30/225) | Trial (18/245) | SDA blend |
|---|---|---|---|---|
| Free fatty acids, % | 0.19 | 0.17 | 0.16 | 0.22 |
| Peroxide value, meq/kg | 0.0 | 0.0 | 0.0 | 0.28 |
| p-Anisidine Value | 3.01 | 2.88 | 2.82 | 3.02 |
| Chlorophyll, ppm | 0.45 | 0.46 | 0.46 | 0.45 |
| Color, 5¼" | 70Y 4.0R | 70Y 3.2R | 70Y 3.1R | 70 Y 6.6R |
| Citric acid, ppm | <10 | <10 | <10 |  |
| Sterols, mg/100 g |  |  |  |  |
| brassicasterol | 80.6 | 81.5 | 78.8 |  |
| campesterol | 225.2 | 231 | 222 |  |
| stigmasterol | 5.52 | 5.44 | 5.16 |  |
| B-sitosterol | 401 | 410 | 400 |  |
| Tocopherols, mg/100 g |  |  |  |  |
| delta | 1.25 | 1.20 | 1.23 |  |
| gamma | 26.5 | 24.5 | 26.4 |  |
| alpha | 24.0 | 22.8 | 23.7 |  |
| Fatty acid composition, % |  |  |  |  |
| C14 (Myristic) | 0.07 | 0.07 | 0.07 | 0.07 |
| C16 (Palmitic) | 4.7 | 4.7 | 4.71 | 4.7 |
| C16:1 (Trans-Hexadecanoic) | 0.02 | 0.02 | 0.02 | 0.02 |
| C16:1n7 (Palmitoleic) | 0.41 | 0.41 | 0.41 | 0.41 |
| C18 (Stearic) | 2.57 | 2.58 | 2.58 | 2.58 |
| C18:1 (Trans-Octadecenoic) | 0.06 | 0.07 | 0.06 | 0.06 |
| C18:1n9 (Oleic) | 50.91 | 50.84 | 51.07 | 50.96 |

-continued

| | | | | |
|---|---|---|---|---|
| C18:1 Octadecenoic | 3.72 | 3.73 | 3.66 | 3.66 |
| C18:2 (Trans-Octadecadienoic) | 0.06 | 0.07 | 0.06 | 0.06 |
| C18:2 (Trans-single peak | 3.31 | 3.31 | 3.32 | 3.32 |
| C18:2n6 (Linoleic) | 10.25 | 10.19 | 10.22 | 10.18 |
| C18:3 (Trans-Octadecatrienoic) | 0.68 | 0.68 | 0.70 | 0.64 |
| C18:3n6 (gamma-linolenic) | 5.50 | 5.51 | 5.49 | 5.55 |
| C18:3n3 (alpha-Linolenic) | 6.84 | 6.79 | 6.80 | 6.84 |
| C18:4n3 (Trans-Octadecatetraenoic) | 0.15 | 0.18 | 0.18 | 0.16 |
| C18:4n3 (octadecatetraenoic) | 7.18 | 7.18 | 7.13 | 7.31 |
| C20 (Arachidic) | 0.79 | 0.80 | 0.80 | 0.79 |
| C20:1n9 (Eicosenoic) | 1.15 | 1.15 | 1.16 | 1.11 |
| C20:2n6 (Eicosadienoic) | 0.06 | 0.06 | 0.06 | 0.06 |
| C22 (Behenic) | 0.42 | 0.43 | 0.42 | 0.42 |
| C22:1n9 (Erucic) | 0.08 | 0.06 | 0.06 | 0.04 |
| C24 (Lignoceric) | 0.20 | 0.19 | 0.19 | 0.19 |
| C24:1n9 (Nervonic) | 0.12 | 0.12 | 0.12 | 0.12 |
| Others | 0.74 | 0.86 | 0.71 | 0.75 |

Example 38

Large Scale Low ALA Soybean Processing

Cracking: The soybeans (~15 MT) were cracked using a Ferrell Ross Cracking Mill under the following parameters: Gap Setting was 10, Roll Speed was 700-rpm coarse roller and 1100-rpm fine pitch roller, and Feed Rate was 150±10 kg/hr. Cracking Rolls: 30.5 cm×25.4 cm diameter Ferrell-Ross Cracking Rolls. Slower rpm roll has 8 teeth per inch and faster roll has 10 teeth per inch.

Aspiration: The cracked soybeans were aspirated using a Kice Aspirator operating at a vacuum setting of 1.2" of water.

Screening: The hulls were screened using a 14-mesh screen to recover the fines. The recovered fines were slowly fed back to the conditioner along with the cracked aspirated meats. A nitrogen sparge was applied to the fines as they exited the screen. Screener: Single deck Rotex Screener, Model #111, type A-MS/Ms, 22"×37" single deck full enclosed.

Conditioning: The cooker was preheated prior to the start of the run. Steam pressures were adjusted while running to maintain the desired temperature. Temperatures in the trays were as follows: Top tray temperature was ambient (no heat); Top tray level was Nil (leave gate open); Bottom tray temperature was 50±5° C. and Bottom tray level was Approximately ½ full. Cooker: Two tray Simon-Rosedown cooker. Each compartment is 36 cm high (21 cm working height), 91 cm in diameter and supplied with sweeping arm for material agitation. Steam is used on the jacket for dry heat as well as direct steam can be added to the contents of the vessel. The cooker discharges product to the flaking rolls.

Flaking: The cooked soybean was flaked using roll gap setting of 0.2 mm. The flake thickness of the soybean flakes ranged between 0.17-0.30 mm. A nitrogen sparge was applied to the flakes as they exited the flaker. The buckets containing the flakes were sparged with nitrogen before sealing and then transported to Flammable 1. Flaker: 14" dia×28" width Lauhoff Flakmaster Flaking Mill Model S-28, Serial No. 7801 manufactured by Lauhoff Corporation.

Solvent Extraction: The soybean flakes were iso-hexane extracted using a total residence time of approximately 37 minutes (loop in to loop out), a solvent to solid ratio of approximately 1.5:1 (w:w) and the miscella temperature of 52±3° C. (The soybean flake feed rate was approximately 135 kg/hr at the 37 minute retention time and solvent flow rate was 205±3 kg/hr.). A nitrogen sparge was applied to the flakes in the feed hopper of the solvent extractor. The crude oil was desolventized in a rising film evaporator and steam stripper. The oil was then vacuum dried in a 2600 L reactor at 70±5° C. for 3 hours. The dried oil was transferred to the Oil's pilot plant and stored in covered stainless steel tanks under a nitrogen sparge until oil processing. Desolventization of the marc (hexane-solids) was done in a steam jacketed Schnecken screw and 2 tray desolventizer-toaster. A ~10 kg sample of white flake was taken from the DT prior to adjusting the DT to the following conditions: Schnecken, <60° C.; Sparge steam, 5 kg/hr to desolventized tray; Desolventizer Tray, 102±2° C.; Toasting Tray, 102±3° C.

Extractor: All stainless Crown Iron Works Loop Extractor (Type II). The extraction bed was 20.3 cm wide×12.7 cm deep by 680 cm in length. In addition, the unit includes miscella desolventization using a rising film evaporator and steam stripper and marc (solids plus solvent) desolventization using a steam jacketed Schnecken screw and 2-tray desolventizer-toaster. The recovered solvent was collected and recycled. Pressure Vessel: 2600 L DeLaval Stainless pressure vessel, steam or cooling water jacket, all 316 stainless constructions with impeller and baffles for mixing.

Water Degumming: The crude oil was heated to 50±3° C. and 2.0% of warm (68±3° C.) softened water was added and mixed for approximately 30 minutes. The oil was heated to 67±3° C. prior to centrifugation. Centrifuge: Westfalia Model RSC 25-01-006, 1500 kg/hr.

Acid Pretreat/Refining: The degummed oil was heated to 63±2° C. and 0.1% of 85% phosphoric acid was added and recirculated through a static inline mixer for approximately 30 minutes. After a 30-minute hold time, 12° Be sodium hydroxide was added to neutralize the free fatty acids plus a 0.05% (w/w) excess. The caustic and oil were then mixed for approximately 15 minutes in a tank prior to centrifugation. The oil was heated to 73±3° C. prior to centrifugation. Static Mixer: Lightning 1" static mixer, turbulent configuration. Centrifuge: Westfalia Model RSC 25-01-006, 1500 kg/hr.

Water Washing: The refined oil was heated to 73±3° C. and approximately 10% of 92±3° C. water added. After 10 minutes of tank mixing, the oil and water were separated by centrifugation. Filter Press: T. Shriver & Co. Ltd., 12", 28 L capacity, stainless steel filter press, filter paper and cloth supports were used. Centrifuge: Westfalia Model RSC 25-01-006, 500 kg/hr.

Bleaching: The water washed oil was heated to 60±3° C. and 0.2% (w/w) of a 50% citric acid solution was added. After 15 minutes of mixing, 0.2% (w/w) TriSyl 615 was added. After another 15 minutes of mixing, 1.0% (w/w) of Grade 105 bleaching clay was added. The mixture was then heated to 110±2° C. under vacuum and held for approximately 30 minutes. The oil was cooled to 72±2° C., vacuum broken with nitrogen, approximately 0.2% of filter aid added and filtered. Pressure Vessel: 2600 L DeLaval Stainless pressure vessel, steam or cooling water jacket, all 316 stainless construction with impeller and baffles for mixing. Filter Press: 24" Polypropylene Sperry Filter Press, capacity 4.8 cu ft filter, paper and cloth supports were used.

Deodorizing: The oil was deodorized at 255±3° C. with a retention time of approximately 30 minutes using an Alfa Laval packed tower deodorizer. The feed rate was approximately 200 kg/hr, stripping steam was approximately 2.0 kg/hr and the absolute pressure at the top of the column was between 1.5-2.0 mmHg. The deodorizer was warmed up using a high oleic sunflower and approximately 52 kg of the Soybean oil was used to flush the deodorizer (transition) prior to collecting product. The first 5 pails of oil after transition were feed back to the deodorizer. The oil was cooled to <45° C. prior to exiting the deodorizer. Prior to packaging, 0.1% of Tenox 20 was added to the oil. The product was packaged under nitrogen into plastic drums and 20 L plastic pails. Deodorizer: 300 kg/hr all stainless thin film packed column deodorizer manufactured by Alfa Laval.

There were no processing anomalies noted in the extraction of the soybean flakes or in the degumming, refining, bleaching and deodorization of the oil.

In the water washing of the refined oil, typically 15% hot water is added to the oil. Due to water flow restriction, only ~10% hot water could be added to the oil. The soaps in the washed oil were >100 ppm which are too high. Instead of re-washing the oil, the washed oil was passed through a filter press pre-coated with 8 kg of TriSyl 615 and 2 kg filter aid. This reduced the soap content of the oil to <50 ppm.

Analytical data collected on the samples can be found in the following Table.

| 0. WHOLE SEED - as delivered | |
| --- | --- |
| Moisture, % | 6.52 |
| Oil Content, % (as is) | 21.52 |
| 1. DEFATTED WHITE FLAKE | |
| Oil Content, % (avg 22 samples) | 0.45 |
| 2. CRUDE SOYBEAN OIL | |
| Free fatty acid, % | 0.16 |
| Peroxide value, meq/kg | 0.0 |
| Color, 1" | 70Y 3.2R |
| Chlorophyll, ppm | 0.037 |
| Iodine value | 124.7 |
| Neutral oil, % | 98.61 |
| Anisidine value | 0.14 |
| Phos, ppm | 305.3 |
| Ca, ppm | 7.66 |
| Mg, ppm | 17.8 |
| Fe, ppm | 0.18 |
| Cu, ppm | <0.05 |
| Na, ppm | 0.26 |
| Tocopherols, mg/100 g | |
| delta | 24.4 |
| gamma | 96.7 |
| alpha | 8.5 |
| Sterols, mg/100 g | |
| campesterol | 91.6 |
| stigmasterol | 78.9 |
| B-sitosterol | 158.6 |
| Fatty acid composition, % | |
| C14 (Myristic) | 0.07 |
| C16 (Palmitic) | 10.60 |
| C16:1n7 (Palmitoleic) | 0.1 |
| C18 (Steric) | 4.83 |
| C18:1n9 (Oleic) | 22.64 |
| C18:1(Octadecenoic) | 1.16 |
| C18:2n6 (Linoleic) | 56.73 |
| C18:3n3 (alpha-Linolenic) | 2.60 |
| C20 (Arachidic) | 0.35 |
| C20:1n9 (Eicosenoic) | 0.19 |
| C22 (Behenic) | 0.34 |
| C24 (Lignoceric) | 0.11 |
| Others | 0.28 |
| 4. DEGUMMED OIL | |
| Free fatty acid, % | 0.04 |
| Peroxide value, meq/kg | 0.21 |
| Color, 5¼" | 70Y 8.9R |
| Chlorophyll, ppm | 0.035 |
| Phos, ppm | 8.3 |
| Ca, ppm | 1.59 |
| Mg, ppm | 2.29 |
| Fe, ppm | <0.02 |
| Na, ppm | <0.20 |
| Cu, ppm | 0.1 |
| Fatty acid composition, % | |
| C14 (Myristic) | 0.07 |
| C16 (Palmitic) | 10.55 |
| C16:1n7 (Palmitoleic) | 0.1 |
| C18 (Steric) | 4.81 |
| C18:1n9 (Oleic) | 22.69 |
| C18:1(Octadecenoic) | 1.15 |
| C18:2n6 (Linoleic) | 56.73 |
| C18:3n3 (alpha-Linolenic) | 2.60 |
| C20 (Arachidic) | 0.35 |
| C20:1n9 (Eicosenoic) | 0.19 |
| C22 (Behenic) | 0.33 |
| C24 (Lignoceric) | 0.11 |
| Others | 0.32 |
| 5. REFINE/WASHED/TRISYL | |
| Free fatty acid, % | 0.03 |
| Soaps, ppm | 9.1 |
| Fatty acid composition, % | |
| C14 (Myristic) | 0.07 |
| C16 (Palmitic) | 10.55 |
| C16:1n7 (Palmitoleic) | 0.1 |
| C18 (Steric) | 4.82 |
| C18:1n9 (Oleic) | 22.72 |
| C18:1(Octadecenoic) | 1.14 |
| C18:2n6 (Linoleic) | 56.74 |
| C18:3n3 (alpha-Linolenic) | 2.60 |
| C20 (Arachidic) | 0.35 |
| C20:1n9 (Eicosenoic) | 0.19 |
| C22 (Behenic) | 0.34 |
| C24 (Lignoceric) | 0.10 |
| Others | 0.28 |

| 6. BLEACHED OIL | Batch #1 | Batch #2 |
| --- | --- | --- |
| Free fatty acid, % | 0.16 | 0.16 |
| Peroxide value, meq/kg | 0.0 | 0.0 |
| Color, 5¼" | 2.1Y 0.2R | 2.1Y 0.1R |

| | | |
|---|---|---|
| Soaps, ppm | 0.0 | 0.0 |
| Anisidine value | 0.2 | 0.18 |
| Chlorophyll, ppm | 0.0 | 0.0 |
| Phos, ppm | <0.2 | <0.2 |
| Ca, ppm | <0.04 | <0.04 |
| Mg, ppm | <0.04 | <0.04 |
| Fe, ppm | <0.02 | <0.02 |
| Na, ppm | <0.20 | <0.2 |
| Cu, ppm | <0.05 | <0.05 |
| Fatty acid composition, % | | |
| C14 (Myristic) | 0.07 | |
| C16 (Palmitic) | 10.56 | |
| C16:1n7 (Palmitoleic) | 0.1 | |
| C18 (Steric) | 4.83 | |
| C18:1n9 (Oleic) | 22.76 | |
| C18:1(Octadecenoic) | 1.12 | |
| C18:2n6 (Linoleic) | 56.66 | |
| C18:3n3 (alpha-Linolenic) | 2.59 | |
| C20 (Arachidic) | 0.35 | |
| C20:1n9 (Eicosenoic) | 0.17 | |
| C22 (Behenic) | 0.34 | |
| C24 (Lignoceric) | 0.11 | |
| Others | 0.34 | |
| Tocopherols, mg/100 g | | |
| delta | 23.4 | |
| gamma | 89.3 | |
| alpha | 8.4 | |
| Sterols, mg/100 g | | |
| campesterol | 58.4 | |
| stigmasterol | 44.0 | |
| β-sitosterol | 119.2 | |

| 7. RBD SOYBEAN OIL | P | A |
|---|---|---|
| Free fatty acid, % | 0.03 | 0.03 |
| Peroxide value, meq/kg | 0.0 | 0.8 |
| Color, 5¼" | 0.9Y 0.0R | 6.7Y 1.1R |
| Chlorophyll, ppm | 0.0 | 0.0 |
| Anisidine value | 0.41 | 1.72 |
| Rancimat, hrs | 19.4 | 17.8 |
| TBHQ, ppm | 160 | 200 |
| Tocopherols, mg/1000 g | | |
| delta | 170 | 104 |
| gamma | 722 | 425 |
| alpha | 73 | 43.5 |
| Sterols, mg/1000 g | | |
| campesterol | 519 | 534 |
| stigmasterol | 387 | 435 |
| B-sitosterol | 1127 | 1226 |
| Fatty acid composition, % | | |
| C14 (Myristic) | 0.07 | 0.08 |
| C16 (Palmitic) | 10.55 | 10.19 |
| C16:1n7 (Palmitoleic) | 0.1 | 0.13 |
| C18 (Steric) | 4.83 | 4.62 |
| C18:1n9 (Oleic) | 22.81 | — |
| C18:1(Octadecenoic) | 1.13 | 26.12 |
| C18:2n6 (Linoleic) | 56.65 | 52.96 |
| C18:3n3 (alpha-Linolenic) | 2.53 | 1.89 |
| C20 (Arachidic) | 0.35 | 0.36 |
| C20:1n9 (Eicosenoic) | 0.17 | 0.19 |
| C22 (Behenic) | 0.33 | 0.34 |
| C24 (Lignoceric) | 0.10 | 0.12 |
| Others | 0.38 | — |
| Trans fatty acids, % | 0.48 | 2.22 |

| 8. MISC Fatty acid composition, % | Flakes 4216X-T2513 | Flakes 2264X-T0552 | Flakes 6254X-T0302 | Flakes 2546X-T3014 |
|---|---|---|---|---|
| C14 (Myristic) | 0.08 | 0.07 | 0.08 | 0.07 |
| C16 (Palmitic) | 10.49 | 10.52 | 10.57 | 10.56 |
| C16:1n7 (Palmitoleic) | 0.1 | 0.1 | 0.1 | 0.1 |
| C18 (Steric) | 4.75 | 4.80 | 4.82 | 4.79 |
| C18:1n9 (Oleic) | 22.53 | 22.67 | 22.63 | 22.69 |
| C18:1(Octadecenoic) | 1.2 | 1.15 | 1.2 | 1.2 |
| C18:2n6 (Linoleic) | 56.78 | 56.66 | 56.59 | 56.58 |
| C18:3n3 (alpha-Linolenic) | 2.8 | 2.74 | 2.76 | 2.72 |
| C20 (Arachidic) | 0.35 | 0.35 | 0.35 | 0.35 |
| C20:1n9 (Eicosenoic) | 0.19 | 0.19 | 0.19 | 0.19 |
| C22 (Behenic) | 0.33 | 0.34 | 0.34 | 0.34 |
| C24 (Lignoceric) | 0.11 | 0.11 | 0.11 | 0.11 |
| Others | 0.29 | 0.3 | 0.26 | 0.30 |

| 8. MISC Fatty acid composition, % | Crude oil 4621X-T0012 | Crude oil 2146X-T5512 | Crude oil 6214X-T1513 |
|---|---|---|---|
| C14 (Myristic) | 0.08 | 0.07 | 0.07 |
| C16 (Palmitic) | 10.58 | 10.58 | 10.56 |
| C16:1n7 (Palmitoleic) | 0.1 | 0.1 | 0.1 |
| C18 (Steric) | 4.89 | 4.89 | 4.89 |
| C18:1n9 (Oleic) | 22.77 | 22.79 | 22.85 |
| C18:1(Octadecenoic) | 1.22 | 1.24 | 1.16 |
| C18:2n6 (Linoleic) | 56.57 | 56.56 | 56.58 |
| C18:3n3(alpha-Linolenic) | 2.52 | 2.51 | 2.51 |
| C20 (Arachidic) | 0.36 | 0.36 | 0.36 |
| C20:1n9 (Eicosenoic) | 0.20 | 0.19 | 0.19 |
| C22 (Behenic) | 0.34 | 0.33 | 0.34 |
| C24 (Lignoceric) | 0.10 | 0.10 | 0.11 |
| Others | 0.27 | 0.28 | 0.28 |

| 8. MISC Fatty acid composition, % | Crude oil 4624X-T3002 | Crude oil 2446X-T3014 | Crude oil 4256X-T0008 |
|---|---|---|---|
| C14 (Myristic) | 0.07 | 0.07 | 0.07 |
| C16 (Palmitic) | 10.63 | 10.64 | 10.62 |
| C16:1n7 (Palmitoleic) | 0.1 | 0.1 | 0.1 |
| C18 (Steric) | 4.83 | 4.83 | 4.84 |
| C18:1n9 (Oleic) | 22.62 | 22.64 | 22.65 |
| C18:1(Octadecenoic) | 1.16 | 1.14 | 1.17 |
| C18:2n6 (Linoleic) | 56.53 | 56.66 | 56.72 |
| C18:3n3 (alpha-linolenic) | 2.59 | 2.59 | 2.59 |
| C20 (Arachidic) | 0.35 | 0.35 | 0.35 |
| C20:1n9 (Eicosenoic) | 0.19 | 0.19 | 0.19 |
| C22 (Behenic) | 0.34 | 0.34 | 0.34 |
| C24 (Lignoceric) | 0.11 | 0.11 | 0.11 |
| Others | 0.28 | 0.34 | 0.25 |

| 9. Lab Trials | P | C |
|---|---|---|
| Degummed oil | | |
| Phos, ppm | 9.43 | |
| Refined washed oil | | |
| Phos, ppm | 1.17 | 1.07 |
| Fe, ppm | <0.02 | <0.02 |
| Ca, ppm | 1.95 | 0.44 |
| Mg, ppm | 0.99 | 0.78 |
| Na, ppm | 0.45 | 0.46 |
| Cu, ppm | <0.05 | 0.07 |
| Bleached oil | | |
| Anisidine value | 0.06 | 0.01 |
| Deodorized oil | | |
| Phos, ppm | <0.2 | <0.2 |
| Fe, ppm | <0.02 | <0.02 |
| Ca, ppm | <0.04 | <0.04 |
| Mg, ppm | <0.04 | <0.04 |
| Na, ppm | <0.2 | <0.2 |
| Cu, ppm | <0.05 | <0.05 |
| Anisidine value | 0.17 | 0.05 |
| Fatty acid composition, % | | |
| C14 (Myristic) | 0.07 | 0.07 |
| C16 (Palmitic) | 10.56 | 10.57 |
| C16:1n7 (Palmitoleic) | 0.1 | 0.1 |
| C18 (Steric) | 4.83 | 4.83 |
| C18:1n9 (Oleic) | 22.76 | 22.78 |
| C18:1(Octadecenoic) | 1.19 | 1.18 |

-continued

|  |  |  |
|---|---|---|
| C18:2n6 (Linoleic) | 56.7 | 56.63 |
| C18:3n3 (alpha-Linolenic) | 2.15 | 2.4 |
| C20 (Arachidic) | 0.35 | 0.35 |
| C20:1n9 (Eicosenoic) | 0.17 | 0.17 |
| C22 (Behenic) | 0.33 | 0.33 |
| C24 (Lignoceric) | 0.11 | 0.1 |
| Others | 0.68 | 0.49 |
| Deodorized oil |  |  |
| Tocopherols, mg/1 g (HPLC) |  |  |
| delta | .204 | .207 |
| gamma | .89 | 1.009 |
| alpha | .33 | .393 |

Example 39

Large Scale Low Lin Processing

Unless otherwise indicated, the process conditions of Example 36 were used for this example and all oil processing done under nitrogen sparging.

Cracking: The gap of the mill was adjusted to #9. Solvent Extraction: The extractor and hexane were sparged with nitrogen prior to use. The soybean flakes were loaded into the pilot plant soxhlet with ~16 L of new hexane. The soybean flakes were extracted for 4 hours and the miscella was evaporated using a Rotovaporator.

Bleaching: Trysil 627 (0.2%) was added and mixed for 15 minutes followed by addition of 1.25% of 'Grade 105' bleaching clay.

The following data was collected using the above processing protocol.

| Variety | U1273T1 | J1250H4 | M1325Y6 | X1342W9 | G1308F1 | V1247R3 |
|---|---|---|---|---|---|---|
| Fatty acid composition, % | Crude Oil | | | | | |
| C14 (Myristic) | 0.11 | 0.09 | 0.09 | 0.09 | 0.09 | 0.1 |
| C16 (Palmitic) | 11.76 | 10.48 | 10.4 | 10.02 | 10.72 | 10.54 |
| C16:1n7 (Palmitoleic) | 0.11 | 0.08 | 0.08 | 0.08 | 0.08 | 0.09 |
| C18 (Steric) | 4.11 | 4.6 | 4.16 | 4.24 | 4.06 | 3.98 |
| C18:1n9 (Oleic) | 21.74 | 22.7 | 17.34 | 17.84 | 17.61 | 21.2 |
| C18:1(Octadecenoic) | 1.28 | 0.31 | 1.13 | 1.06 | 1.16 | 1.21 |
| C18:2n6 (Linoleic) | 57.04 | 57.54 | 62.66 | 62.56 | 62.09 | 58.74 |
| C18:3n3 (alpha-Linolenic) | 2.54 | 2.71 | 2.75 | 2.72 | 2.8 | 2.72 |
| C20 (Arachidic) | 0.32 | 0.37 | 0.33 | 0.33 | 0.33 | 0.33 |
| C20:1n9 (Eicosenoic) | 0.24 | 0.26 | 0.23 | 0.23 | 0.23 | 0.26 |
| C20:2n6 (Eicosadienoic) | 0.03 | 0.04 | 0.05 | 0.05 | 0.05 | 0.04 |
| C22 (Behenic) | 0.33 | 0.36 | 0.37 | 0.35 | 0.36 | 0.35 |
| C24 (Lignoceric) | 0.14 | 0.18 | 0.16 | 0.16 | 0.16 | 0.16 |
| Others | 0.25 | 0.28 | 0.25 | 0.27 | 0.26 | 0.28 |
| Peroxide value, meq/kg | 0.2 | 0.37 | 0.37 | 0.16 | 0.21 | 0.3 |
| Anisidine value | 0.83 | 0.66 | 1.12 | 0.82 | 0.67 | 1.02 |
|  | Degummed Oil | | | | | |
| Phosphorus, ppm | 42.59 | 70.84 | 31.53 | 32.2 | 57.72 | 33.3 |
|  | Refined/Washed Oil | | | | | |
| Phosphorus, ppm | 0.09 | 5.4 | 0.98 | 0.83 | 1.87 | 0.26 |
| Soaps, ppm | 2.4 | trace | trace | 0 | trace | 4.9 |
|  | Bleached Oil | | | | | |
| FFA, % | 0.08 | 0.07 | 0.05 | 0.07 | 0.08 | 0.06 |
| Peroxide value, meq/kg | 0.2 | 0.17 | 0.24 | 0.27 | 0.2 | 0.27 |
| Color, 51/4" | 5.7Y 0.4R | 4.2Y 0.3R | 5.3Y 0.5R | 4.9Y 0.4R | 4.0Y 0.3R | 5.1Y 0.4R |
| Chlorophyll | 0 | 0 | 0 | 0 | 0 | 0 |
| Phosphorus, ppm | <0.2 | <0.2 | <0.2 | <0.2 | <0.2 | <0.2 |
| Ca, ppm | <0.04 | 0.04 | <0.04 | 0.06 | 0.2 | 0.14 |
| Mg, ppm | <0.04 | <0.04 | <0.04 | <0.04 | <0.04 | <0.04 |
| Fe, ppm | <0.02 | <0.02 | <0.02 | <0.02 | 0.05 | <0.02 |
| Cu, ppm | <0.05 | <0.05 | <0.05 | <0.05 | <0.05 | <0.05 |
| Na, ppm | <0.20 | <0.20 | <0.20 | <0.20 | <0.20 | <0.20 |
| Soaps, ppm | 0 | 0 | 0 | 0 | 0 | 0 |
| Anisidine value | 0.25 | 0.27 | 0.27 | 0.26 | 0.23 | 0.6 |
| Fatty acid composition, % | RBD Oil | | | | | |
| C14 (Myristic) | 0.11 | 0.09 | 0.09 | 0.09 | 0.1 | 0.09 |
| C16 (Palmitic) | 11.58 | 10.3 | 10.18 | 9.81 | 10.5 | 10.37 |
| C16:1n7 (Palmitoleic) | 0.11 | 0.08 | 0.1 | 0.1 | 0.11 | 0.09 |
| C18 (Steric) | 4.11 | 4.59 | 4.12 | 4.22 | 4.03 | 3.97 |
| C18:1n9 (Oleic) | 21.9 | 22.1 | 17.48 | 17.98 | 17.72 | 21.34 |
| C18:1(Octadecenoic) | 1.27 | 1.08 | 1.04 | 1.01 | 1.12 | 1.21 |
| C18:2n6 (Linoleic) | 57.06 | 57.55 | 62.76 | 62.62 | 62.14 | 58.77 |
| C18:3n3 (alpha-Linolenic) | 2.44 | 2.61 | 2.64 | 2.61 | 2.68 | 2.6 |
| C20 (Arachidic) | 0.32 | 0.37 | 0.33 | 0.33 | 0.33 | 0.33 |
| C20:1n9 (Eicosenoic) | 0.2 | 0.21 | 0.22 | 0.23 | 0.23 | 0.22 |
| C20:2n6 (Eicosadienoic) | 0.03 | 0.04 | 0.05 | 0.05 | 0.04 | 0.04 |
| C22 (Behenic) | 0.32 | 0.36 | 0.36 | 0.35 | 0.36 | 0.34 |
| C24 (Lignoceric) | 0.13 | 0.17 | 0.16 | 0.16 | 0.16 | 0.16 |
| Others | — | 0.45 | 0.47 | 0.44 | 0.48 | 0.47 |

-continued

| Variety | U1273T1 | J1250H4 | M1325Y6 | X1342W9 | G1308F1 | V1247R3 |
|---|---|---|---|---|---|---|
| Tocopherols (total), ppm | | | | | | |
| Delta, ppm | 185 | 158 | 171 | 164 | 174 | 172 |
| Gamma, ppm | 925 | 1100 | 1190 | 1140 | 1140 | 1080 |
| Alpha, ppm | 256 | 291 | 274 | 285 | 267 | 252 |
| Peroxide value (meq/kg) | 0 | 0 | 0 | 0 | 0 | 0 |
| Anisidine value | 0.28 | 0.11 | 0.24 | 0.1 | 0.23 | 0.34 |

The above processing protocol was used for another set of experiments, except nitrogen sparging at every stage was not used. Those results follow.

| Variety | U1273T1 | J1250H4 | M1325Y6 | X1342W9 | G1308F1 | V1247R3 |
|---|---|---|---|---|---|---|
| Fatty acid composition, % | Crude Oil | | | | | |
| C14 (Myristic) | 0.11 | 0.09 | 0.09 | 0.1 | 0.12 | 0.1 |
| C16 (Palmitic) | 11.76 | 10.46 | 10.4 | 10.02 | 10.71 | 10.64 |
| C16:1n7 (Palmitoleic) | 0.11 | 0.08 | 0.08 | 0.08 | 0.09 | 0.11 |
| C18 (Steric) | 4.12 | 4.63 | 4.16 | 4.25 | 4.05 | 4.01 |
| C18:1n9 (Oleic) | 21.87 | 22.23 | 17.38 | 18.18 | 17.63 | 21.31 |
| C18:1(Octadecenoic) | 1.24 | 1.06 | 1.12 | 1.06 | 1.21 | 1.26 |
| C18:2n6 (Linoleic) | 56.96 | 57.34 | 62.61 | 62.26 | 62.01 | 58.49 |
| C18:3n3 (alpha-Linolenic) | 2.51 | 2.62 | 2.72 | 2.62 | 2.77 | 2.65 |
| C20 (Arachidic) | 0.32 | 0.37 | 0.33 | 0.34 | 0.33 | 0.33 |
| C20:1n9 (Eicosenoic) | 0.22 | 0.23 | 0.22 | 0.23 | 0.23 | 0.24 |
| C20:2n6 (Eicosadienoic) | 0.03 | 0.04 | 0.05 | 0.05 | 0.04 | 0.04 |
| C22 (Behenic) | 0.33 | 0.36 | 0.37 | 0.36 | 0.36 | 0.35 |
| C24 (Lignoceric) | 0.14 | 0.18 | 0.16 | 0.17 | 0.16 | 0.16 |
| Others | 0.27 | 0.31 | 0.31 | 0.28 | 0.29 | 0.31 |
| Peroxide value (meq/kg) | 0.3 | 0.69 | 0.32 | 0.32 | 0.41 | 0.38 |
| Anisidine value | 0.74 | 0.76 | 1.26 | 0.71 | 0.73 | 1.17 |
| | Degummed Oil | | | | | |
| Phosphorus, ppm | 54.33 | 44.78 | 44.69 | 39.58 | 53.11 | 30.44 |
| | Refined, Washed Oil | | | | | |
| Phosphorus, ppm | 2.28 | <0.2 | 0.35 | 0.33 | 0.93 | 0.6 |
| Soaps, ppm | 1 | 3 | 0 | 1 | 1 | 29 |
| | Bleached Oil | | | | | |
| FFA, % | 0.08 | 0.1 | 0.08 | 0.08 | 0.05 | 0.08 |
| Peroxide value, meq/kg | 0.15 | 0.25 | 0.24 | 0.21 | 0.26 | 0.12 |
| Color, 51/4" | 4.4Y 0.5R | 6.1Y 0.4R | 5.6Y 0.3R | 5.3Y 0.4R | 5.5Y 0.4R | 6.3Y 0.4R |
| Chlorophyll | 0 | 0 | 0 | 0 | 0 | 0 |
| Phosphorus, ppm | 3.16 | 0.41 | <0.2 | 0.68 | 1.58 | <0.2 |
| Pb, ppm | <0.2 | <0.2 | <0.2 | <0.2 | <0.2 | <0.2 |
| Ca, ppm | 0.26 | <0.04 | <0.04 | 0.62 | 0.3 | <0.04 |
| Mg, ppm | <0.04 | <0.04 | <0.04 | <0.04 | <0.04 | <0.04 |
| Fe, ppm | 0.04 | 0.04 | <0.02 | 0.18 | 0.08 | <0.02 |
| Cu, ppm | <0.05 | <0.05 | <0.05 | <0.05 | <0.05 | <0.05 |
| Na, ppm | <0.2 | <0.2 | <0.2 | <0.2 | <0.20 | <0.2 |
| Soaps, ppm | 0 | 0 | 0 | 0 | 0 | 0 |
| Anisidine value | 0.23 | 2.11 | 0.44 | 0.37 | 0.43 | 0.54 |
| Fatty acid composition, % | RBD Oil | | | | | |
| C14 (Myristic) | 0.11 | 0.1 | 0.09 | 0.08 | 0.09 | 0.1 |
| C16 (Palmitic) | 11.61 | 10.3 | 10.2 | 9.83 | 10.53 | 10.42 |
| C16:1n7 (Palmitoleic) | 0.12 | 0.09 | 0.08 | 0.08 | 0.08 | 0.09 |
| C18 (Steric) | 4.11 | 4.61 | 4.15 | 4.23 | 4.04 | 3.99 |
| C18:1n9 (Oleic) | 21.92 | 22.34 | 17.52 | 18.26 | 17.76 | 21.4 |
| C18:1(Octadecenoic) | 1.27 | 1.06 | 1.08 | 1.06 | 1.17 | 1.23 |
| C18:2n6 (Linoleic) | 56.94 | 57.39 | 62.7 | 62.36 | 62.08 | 58.63 |
| C18:3n3 (alpha-Linolenic) | 2.38 | 2.52 | 2.61 | 2.51 | 2.68 | 2.53 |
| C20 (Arachidic) | 0.33 | 0.37 | 0.33 | 0.34 | 0.33 | 0.33 |
| C20:1n9 (Eicosenoic) | 0.22 | 0.21 | 0.23 | 0.23 | 0.24 | 0.23 |
| C20:2n6 (Eicosadienoic) | 0.03 | 0.04 | 0.05 | 0.05 | 0.04 | 0.04 |
| C22 (Behenic) | 0.33 | 0.36 | 0.36 | 0.35 | 0.36 | 0.35 |
| C24 (Lignoceric) | 0.13 | 0.17 | 0.16 | 0.16 | 0.16 | 0.16 |
| Others | 0.5 | 0.44 | 0.44 | 0.46 | 0.44 | 0.5 |
| Peroxide value (meq/kg) | 0 | 0 | 0 | 0 | 0 | 0 |
| Anisidine value | 0.29 | 1.36 | 0.35 | 0.37 | 0.45 | 0.39 |

Example 40

Large Scale Low Lin Processing

Low Lin soy seeds (56,000 lbs) were crushed. Seeds were conveyed from the Silo to the cracker and sent to stack cooker. The cracked seed was then heated to 71° C. in the stack cooker and were sent to pre press, where oil and oil cake were separated. Oil cake was transported to the solvent plant by conveyor into a Crown extractor. The extractor was operated at 6000 lb/hr with a bed height was of approximately 18 inches. The temperature of the extractor was maintained at 55° C. Vacuum in the extractor and in the desolventizer, toaster, drier and cooler (DTDC) was maintained at 0.5 inches of water (See Table 1 for details on DTDC temperatures). Approximately 9000 lb of oil was recovered (See Table for the PV and fatty acid compositional data).

The temperature of miscella distillation and DTDC were maintained as follows. For miscella distillation, the first evaporator was run at 71° C. and 8 mmHg, the second evaporator was run at 88° C. and 8 mmHg and the stripper was run at 115° C. For the DTDC, the dome was run at 88° C., tray-1 was run at 99° C., tray-2 was run at 104° C., the dryer was run at 121° C., and the cooler was run at 38° C.

TABLE

Fatty Acid Composition of the crude pressed and solvent oil.

|  | Crude Solvent Oil Tote# 1 | Crude Solvent Oil Tote# 2 | Crude Solvent Oil Tote# 3 | Crude Pressed Oil Tote#1 | Crude Pressed Oil Tote#2 |
|---|---|---|---|---|---|
| Peroxide value, Meq/Kg | 1.02 | 1.02 | 0.58 | 0.41 | 0.48 |
| FFA % | 0.65 | 0.26 | 0.32 | 0.37 | 0.34 |
| C16:0 | 10.34 | 10.71 | 10.69 | 10.5 | 10.65 |
| C18:0 | 4.21 | 4.55 | 4.48 | 4.57 | 4.58 |
| C18:1 | 26.93 | 23.45 | 23.10 | 24.31 | 23.43 |
|  | (28.1) | (24.03) | (24.05) | (24.5) | (24.89) |
| C18:2 9_12 | 55.21 | 57.82 | 57.88 | 56.94 | 57.27 |
| C18:3 ALA | 2.62 | 2.75 | 2.75 | 2.51 | 2.54 |
|  | (2.45) | (2.66) | (2.57) | (2.26) | (2.53) |
| C20:0 | 0.29 | 0.29 | 0.28 | 0.29 | 0.29 |
| C20:1 | 0.13 | 0.16 | 0.10 | 0.15 | 0.1 |
| C22:0 | 0.26 | 0.27 | 0.26 | 0.27 | 0.26 |

Results in brackets are from duplicate analysis.

Degumming and Refining Step: All crude oil was combined in stirred tank reactor (approximately 8700 lbs). Phosphoric acid (75%) was added at a level of 800 ppm (0.08%) and the temperature raised to 57° C. and the mixture was stirred and pumped in a recirculation loop for one hour. A sample of the oil was found to contain a free fatty acid (FFA) content of 1.8%. Sodium hydroxide (12%) was added at a level of 15% above the FFA result in addition to 209 lbs of water. The oil was circulated and agitated for 30 minutes and heated to 80° C. The resulting mixture was sent to continuous centrifuge at a flow rate of 7000 lbs/hr.

Bleaching: Neutral oil was sent to an open bleaching vessel (continuously stirred and pumped through a filter loop) and Select-350 (active silica) was added to reduce residual soap. One bag of Dicalite (diatomaceous earth) was added to precoat the filter and two bags of 150FF Tonsil (clay) was added. The oil was circulated through a plate and frame filter press. Filter oil was sent to a second bleach oil vessel where an additional 1% w/w 150FF Tonsil was added. No heat was employed during this part of the process. The oil was then sent to plate heat exchanger where oil was heated to 100° C. and sprayed into a spray drier at 28 inches of vacuum to remove the moisture and improve filterability. The color of the resulting bleached oil was not sufficient so the oil was filtered through the filter press and sent back to the second vessel again for spray drying. Temperature was raised to 105° C. and returned to the spray drier. The oil was recirculated through the spray drier until the color of the oil was sufficient. The oil was then cooled to 65° C. and sent to bleached oil storage tank.

Deodorization: Bleached oil sent to a batch deodorizer. Sparged steam was utilized in the deodorizer that was operated at a vacuum of 3 to 4 mmHg. Over a 90 minute period the temperature was increased to 245° C. The temperature of the deodorizer was maintained between 240 and 245° C. for one and half hours. While still under vacuum and active steam, the temperature was cooled to 65° C. over the period of one hour. The flow of sparge steam was discontinued and solid citric acid (113.5 grams) was dissolved in water (2 L) and added to the deodorizer and recirculated for 45 minutes. The oil was circulated for one hour under vacuum and allowed to cool to 45° C. The oil was analyzed for FFA, PV, Color, odor or flavor. No odor or flavor found in the oil.

Before drumming under nitrogen, 1000 ppm of Tenox-20 was added. A total of 6500 lbs of RBD oil was recovered. The following table contains a detailed analysis of the RBD oil.

TABLE

| | |
|---|---|
| FFA, % | 0.04 |
| PV, Meq/kg | 0.00 |
| Palmitic C16:0 | 10.11 |
| C16:1 | 0.11 |
| C18:0 | 4.08 |
| Oleic C18:1 | 23.93 |
| C18:1 n7 | 1.31 |
| C18:2 9_12 | 54.3 |
| C18:3 ALA | 2.04 |
| C18:trans | 0.40 |
| C18:3 isomer | 0.46 |
| C20:0 & C20; 1 | 0.41 |
| C22:0 | 0.25 |
| Metals, ppm | |
| Cd | <1 |
| Co | <1 |
| Cr | <1 |
| Cu | <0.5 |
| Fe | <0.5 |
| Mg | 1.3 |
| Mn | <1 |
| Mo | <1 |
| Ni | <1 |
| Zn | <1 |
| P | <2 |
| Tocopherols | 334.24 |
| alpha, ppm | 45.77 |
| gamma/beta, ppm | 244 |
| D-delta, ppm | 44.47 |
| Anisidine value | 1.14 |
| % Conjugated Dienes | 0.33 |
| TBHQ | 223.6 |
| OSI, hrs at 110° C. | 22-24 |
| OSI, NEAT OIL, hrs 110° C. | 6.15 |
| Color | 5/0.5(yellow/red |
| Headspace analysis | **** |
| Hexanal ppm | 0.00 |
| 2 hexenal ppm | 0.00 |
| 2 heptenal ppm | 0.00 |
| 2 4 heptadienal ppm | 0.00 |
| 2 4 heptadienal B ppm | 0.00 |
| 2 4 haxadienal ppm | 0.00 |
| 2 nonenal ppm | 0.00 |
| nonadienal ppm | 0.00 |
| 2,4 decadienal ppm | 0.00 |
| Hexanal ng | 0.00 |

TABLE-continued

| | |
|---|---|
| 2 hexenal ng | 0.00 |
| 2 heptenal ng | 0.00 |
| 2 4 haxadienal ng | 0.00 |
| 2 4 heptadienal ng | 0.00 |
| 2 4 heptadienal B ng | 0.00 |
| 2 nonenal ng | 0.00 |
| nonadienal ng | 0.00 |
| 2,4 decadienal ng | 0.00 |
| 0 = <0.050 ppm | |

The RBD oil processed using these conditions underwent reversion of color, flavor and odor within 1-2 weeks after processing.

Example 41

Oil Processing Using Physical Refining 1

The seeds are milled, cracked and dehulled, extracted and desolventized as described herein above.

Degumming: Once the crude oil is collected, the crude oil is charged into a jacketed reactor and heated to 50°±3° C. The crude oil is stirred with a magnetic stir bar at 350 rpm. Once the oil temperature is at 50° C., a 5% citric acid solution is added at 2.0 wt % (based on wt/wt oil basis). The mixture is stirred and heated for 15 minutes. Then, water is added at 2 wt. % (based on wt/wt oil basis) and mixture is heated at 50°±3° C. for 30 to 60 minutes. The temperature is then increased to 67°±3° C. When this temperature is reached, the contents are removed and centrifuged. The oil phase is removed and placed back into the jacketed reactor. The reactor is heated to 62°±3° C. A 5% phosphoric acid solution is added at 2.0 to 4.0 wt. % (based on wt/wt oil basis). The mixture is stirred at 350 rpm for 30 minutes. The mixture is removed and centrifuged.

Bleaching: The oil is transferred into the reactor and heated at 60°±3° C. and 2% (wt/wt basis) of a 5% citric acid solution is added and stirred for 15 minutes at 350 rpm. Then, up to 0.4 wt. % Trysil S615 is added and stirred for 15 minutes. Then, 0.75-2.5 wt. % of Tonsil Grade 105 bleaching clay is added and the pressure in the reactor is reduced to 25 mm of Hg. The contents are heated to 110°±2° C. and stirred at 350 rpm for 30 minutes. The mixture is cooled to 72°±3° C. and filtered in a separate vessel.

Deodorization: The filtered oil is placed in a RBF (using Wheaton Semi-Micro glassware) equipped claisen head that contained a subsurface gas bleed tube and a vacuum port adapter. The nitrogen flow is initiated and the vacuum is maintained at 0.05 to 1 mm of Hg for 30 to 60 minutes at 240° C. to 280° C.±5° C. The oil is then cooled to room temperature with an active nitrogen purge.

Example 42

Oil Processing Using Physical Refining 2

The seeds are milled, cracked and dehulled, extracted and desolventized as described herein above. The crude oil is then degummed as described in Example 41.

Bleaching: The oil is transferred into the reactor and heated at 60°±3° C. and 2% (wt/wt basis) of a 5% citric acid solution is added and stirred for 15 minutes at 350 rpm. Then, up to 0.4 wt. % Trysil S615 is added and stirred for 15 minutes. Then, 0.75-2.5 wt. % of Tonsil Grade 105 bleaching clay is added and the pressure in the reactor is reduced to 25 mm of Hg. The contents are heated to 95° C.±2° C. and stirred at 350 rpm for 30 minutes. The mixture is cooled to 72° C.±3° C. and filtered in a separate vessel.

Deodorization: The filtered oil is placed in a RBF (using Wheaton Semi-Micro glassware) equipped claisen head that contains a subsurface gas bleed tube and a vacuum port adapter. A three neck RBF is used as an option to this reactor. The nitrogen flow is initiated and the vacuum is maintained at 0.05 to 1 mmHg for two to four hours at 165° C. to 205° C.±5° C. The oil is then cooled to 60° C. temperature with nitrogen and transferred, concluding the process.

Example 43

Bleaching Conditions and Oil Stability

Water washed oil as processed above was divided into four equal parts to conduct the following four different bleaching experiments. In a glove box, the oil was heated to 60° C. in a bleaching reactor and 0.2% citric acid (50% concentration) was added and stirred for 15 minutes at 60° C. under nitrogen. Trisyl S615 (0.2 wt. %) was added and stirred for 15 minutes. Then, bleaching clay (Tonsil-167FF) (0.5 wt. %) was added and a vacuum of 25 torr was applied while the oil was heated to 110° C. and the temperature was maintained for 30 minutes. The oil was cooled to 60° C. and filtered. Samples of bleached oil were sent for analysis (FFA, AV, PV, CD Tocopherols and FAC). Two other sets of experiments with 1.0% and 1.5% clay were conducted with same bleaching conditions mentioned above.

A fourth experiment was conducted using 3.0% clay and 0.5% carbon. Bleaching temperature was maintained at 95° C. for 30 minutes. The bleached oil from these experiments was deodorized at 180° C. for two hours under vacuum (1000 mtorr). Oil was cooled under vacuum to 60° C. Samples of deodorized oil were analyzed for FFA, AV, PV, CD Tocopherols and FAC. Generally, this data showed that more bleaching material resulted in a lower AV. In general, oils with lower AV values have lower concentrations of nonvolatile aldehydes and ketones; the nonvolatile aldehyde and ketone concentration is an indicator of the post oxidative stress applied to a particular oil.

Figure 3A:
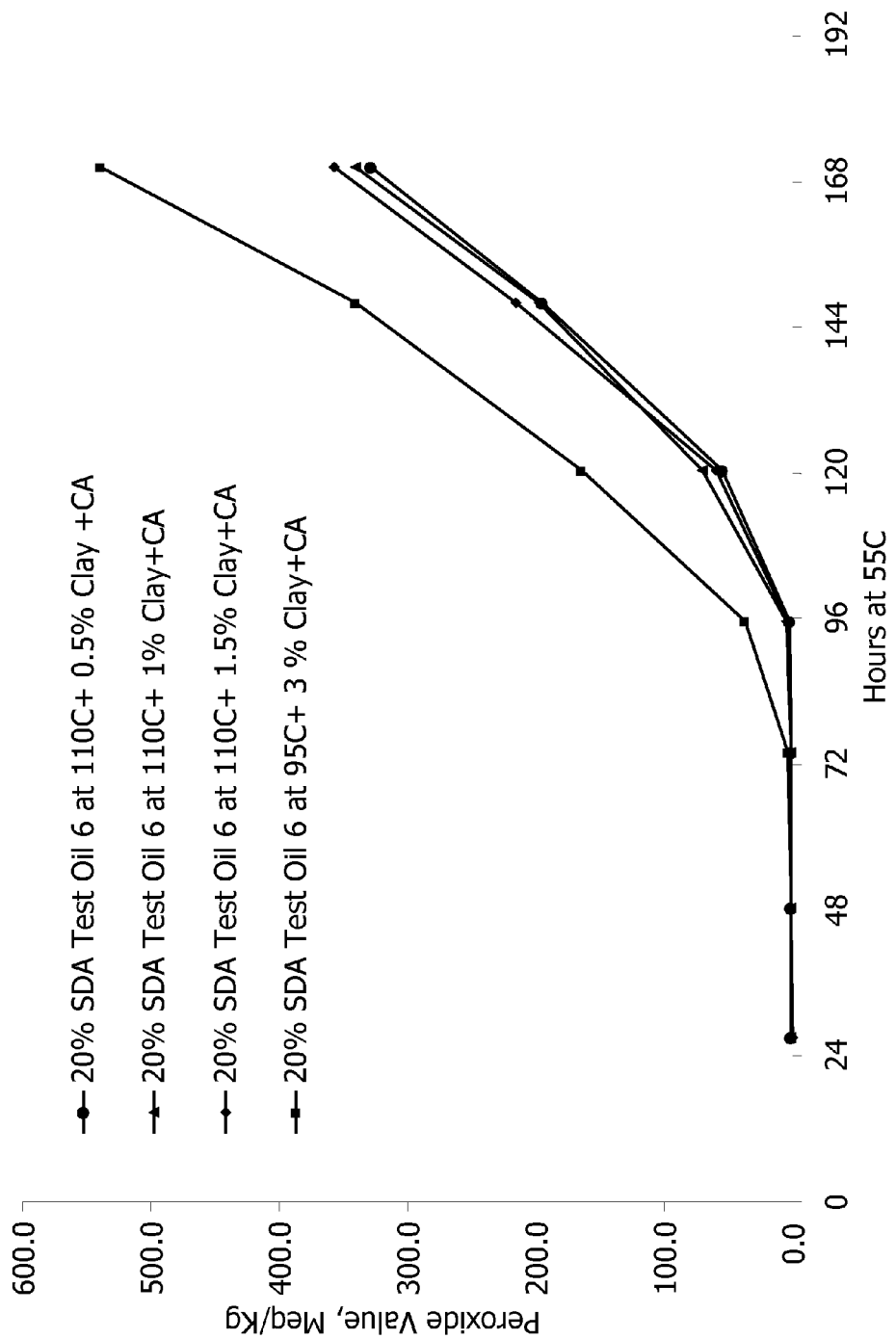
FIG. 3A is a graph of peroxide value (PV) vs. time for a 20% stearidonic (SDA) oil composition bleached at (i) 110° C. with 0.5 wt. % clay and citric acid added; (ii) 110° C. with 1 wt. % clay and citric acid added; (iii) 110° C. with 1.5 wt. % clay and citric acid added; and (iv) 95° C. with 3 wt. % clay and citric acid added.

These four oils of the study were spiked with about 50 ppm of citric acid, to normalize any affects that may result from metals, and placed in an accelerated aging study at 55° C. The AV was the lowest for the oil bleached with 3 wt. % earth and 0.5 wt. % carbon, its stability is notably worse than the other three when comparing the PV, AV (See Tables below and FIGS. 3A and 3B).

| Time in hours | PV (0.5 wt. % clay) | PV (1 wt. % clay | PV (1.5 wt. % clay) | PV (3 wt. % clay + 0.5 wt. % carbon) |
|---|---|---|---|---|
| 0 | 0 | 0 | 0 | 0 |
| 27 | 0.68 | 0.65 | 0.56 | 0.65 |
| 48.5 | 1.12 | 1.09 | 0.96 | 1.13 |
| 74 | 1.43 | 1.39 | 1.38 | 3.85 |
| 95.5 | 2.42 | 4.62 | 4.1 | 37.2 |
| 120.5 | 55.34 | 70.41 | 59.52 | 164.53 |
| 148 | 194.68 | 197.68 | 214.93 | 340.2 |
| 170.5 | 328.54 | 340.43 | 357.29 | 538.79 |

| Time in hours | AV (0.5 wt. % clay) | AV (1 wt. % clay) | AV (1.5 wt. % clay) | AV (3 wt. % clay + 0.5 wt. % carbon) |
|---|---|---|---|---|
| 0 | 1.67 | 0.82 | 0.56 | 0.24 |
| 27 | 1.73 | 1.01 | 0.63 | 0.36 |
| 48.5 | 1.74 | 0.92 | 0.68 | 0.33 |
| 74 | 2.06 | 1.2 | 0.78 | 0.57 |
| 95.5 | 2.74 | 1.38 | 1.03 | 5.46 |
| 120.5 | 5.79 | 7.84 | 6.26 | 24.62 |
| 148 | 30.7 | 32.9 | 27.3 | 72.7 |
| 170.5 | 71.17 | 85.49 | 63.69 | 161.32 |

Example 44

Deodorization Conditions

Figure 2:
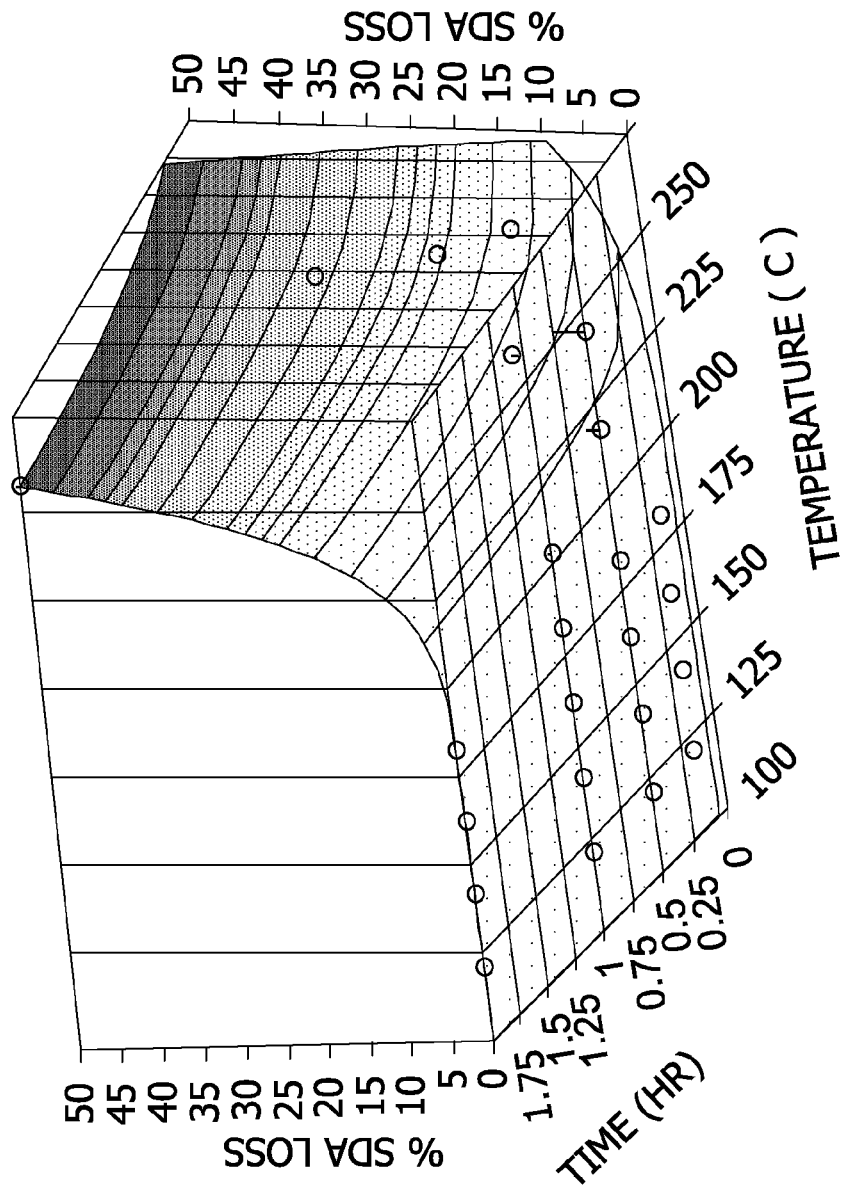
FIG. 2 is a graph of the % stearidonic acid (SDA) loss as a function of time and temperature in a batch deodorizer.

A surface plot defining acceptable time and temperature conditions while minimizing the loss of SDA is depicted in FIG. 2. This plot was prepared to more fully understand the best operating conditions for deodorizing SDA. It depicts a time/temperature surface aimed at minimizing SDA loss (via isomerization that can include but not limited to cis to trans and conjugated double bond isomerization as well at polymerization). FIG. 2 is a 3D plot and allows for a visual identification of the areas of operability for successfully retaining SDA in a specific oil under batch conditions. These experiments have allowed us to define a zone of operability at temperatures of about 215° C. for 120 minutes to about 235° C. for about 5 minutes.

Example 45

Large Scale High SDA Soybean Processing

The soybeans were processes using the procedure of Example 34, except during the bleaching step, the oil was cooled to 50±3° C., and the vacuum was broken with nitrogen. In addition to the bleaching procedure change, the deodorization conditions were varied as follows. The refined, bleached (RB) SDA negative and RB SDA positive oil was deodorized using the mini RBD unit deodorizer. There were in total, five deodorization trials executed on the SDA negative and SDA positive bleached oil. The deodorizer was flushed with Vegatol 80 prior to deodorization trial 1, 3 and 5. The trials are listed below:

| Trial # | Type of Oil | Weigh, kg | N2 | Steam | Temp | Hold time |
|---|---|---|---|---|---|---|
| 1 | neg | 18.960 | yes | no | 180° C. | 2 hrs |
| 2 | pos | 10.447 | yes | no | 180° C. | 2 hrs |
| 3 | pos | 10.269 | no | 1% | 180° C. | 2 hrs |
| 4 | pos | 7.376 | no | 1% | 225° C. | ½ hr |
| 5 | neg | 10.918 | no | 1% | 225° C. | ½ hr |

The deodorizer was modified so that citric acid could be added to the oil after deodorization. Via syringe, about 50 ppm of citric acid was added to the oil at 120° C. The antioxidant Dadex® CA (40% citric acid in propylene glycol available from Acatris) was used for the citric acid addition.

The results of this processing were similar to the above examples up to the deodorization stage. The analytical data for the bleached and RBD oils follows.

| BLEACHED OIL | SDA Neg | SDA Pos |
|---|---|---|
| Free fatty acid, % | 0.065 | 0.095 |
| Peroxide value, meq/kg | 0.0 | 0.0 |
| Color, 5¼" | 2.2Y 0.0R | 4.1Y 0.2R |
| Chlorophyll, ppm | 0.0 | 0.0 |
| Phosphorus, ppm | <0.02 | <0.2 |
| Ca, ppm | <0.04 | <0.04 |
| Mg, ppm | <0.04 | <0.04 |
| Fe, ppm | <0.02 | <0.02 |
| Cu, ppm | <0.05 | <0.05 |
| Na, ppm | <0.2 | <0.02 |
| Soaps, ppm | 0.0 | 0.0 |
| Anisidine value | 0.08 | 0.12 |
| Citric Acid, ppm | <10 | <10 |
| Tocopherols, mg/100 g | | |
| delta | 32.1 | 29.0 |
| gamma | 83.5 | 86.4 |
| Sterols, mg/100 g | | |
| campesterol | 48.3 | 62.6 |
| stigmasterol | 37.6 | 48.6 |
| B-sitosterol | 133.0 | 180 |
| Fatty acid composition, % | | |
| C14 (Myristic) | 0.08 | 0.08 |
| C16 (Palmitic) | 11.46 | 12.04 |
| C16:1 (Trans) | 0.02 | 0.03 |
| C16:1n7 (Palmitoleic) | 0.12 | 0.14 |
| C18 (Steric) | 4.15 | 4.21 |
| C18:1 (Trans) | 0.09 | 0.07 |
| C18:1n9 (Oleic) | 18.51 | 16.27 |
| C18:1(Octadecenoic) | 1.56 | 1.53 |
| C18:2 (Trans) | 0.06 | 0.08 |
| C18:2n6 (Linoleic) | 53.41 | 28.43 |
| C18:3 (Trans) | 0.12 | 0.23 |
| C18:3n6(gamma-linolenic) | — | 5.18 |
| C18:3n3 (alpha-Linolenic) | 8.8 | 11.61 |
| C18:4 (Trans) | 0.07 | 0.16 |
| C18:4n3(Octadecatetraenoic) | 0.15 | 18.63 |
| C20 (Arachidic) | 0.31 | 0.35 |
| C20:1n9 (Eicosenoic) | 0.17 | 0.19 |
| C20:2n6 (Eicosadienoic) | 0.04 | 0.03 |
| C22 (Behenic) | 0.31 | 0.29 |
| C24 (Lignoceric) | 0.12 | 0.08 |
| Others | 0.45 | 0.37 |

| RBD SOYBEAN OIL | SDA Pos 180/ N2 | SDA Pos 180/ H2O | SDA Neg 180/ N2 | SDA Pos 225/ H2O | SDA Neg 225/ H2O |
|---|---|---|---|---|---|
| Free fatty acid, % | 0.08 | 0.07 | 0.05 | 0.04 | 0.02 |
| Peroxide value, meq/kg | 0.0 | 0.0 | 0.0 | 0.0 | 0.0 |
| Color, 1" | 2.4Y 0.1R | 2.3Y 0.0R | 1.5Y 0.1R | 1.3Y 0.0R | 0.9Y 0.0R |
| Chlorophyll, ppm | 0.0 | 0.0 | 0.0 | 0.0 | 0.0 |
| Anisidine value | 0.33 | 0.38 | 0.28 | 0.33 | 0.4 |
| Citric acid, ppm | <10 | <10 | <10 | <10 | <10 |
| Tocopherols, mg/100 g | | | | | |
| delta | 28.0 | 28.2 | 31.9 | 27.8 | 29.7 |
| gamma | 80.9 | 85.2 | 83.2 | 82.8 | 79.4 |
| alpha | 11.8 | 11.9 | 10.2 | 11.4 | 10.0 |
| Sterols, mg/100 g | | | | | |
| campesterol | 62.9 | 61.3 | 47.3 | 61.6 | 45.7 |
| stigmasterol | 49.0 | 47.6 | 36.8 | 47.7 | 36.2 |
| B-sitosterol | 182 | 176.2 | 131 | 178 | 128 |
| Fatty acid composition, mg/g | | | | | |
| C14 (Myristic) | 0.8 | 0.8 | 1.0 | 0.8 | 0.8 |
| C16 (Palmitic) | 114.2 | 113.1 | 109.3 | 114.1 | 108.6 |
| C16:1 (Trans) | 0.1 | 0.1 | 0.1 | 0.1 | 0.1 |

-continued

|  | | | | | |
|---|---|---|---|---|---|
| C16:1n7 (Palmitoleic) | 1.1 | 1.1 | 1.0 | 1.1 | 1.0 |
| C18 (Steric) | 38.8 | 38.6 | 38.4 | 38.8 | 38.3 |
| C18:1 (Trans) | 0.7 | 0.7 | 0.8 | 0.7 | 0.8 |
| C18:1n9 (Oleic) | 154.3 | 155.2 | 177.9 | 154.0 | 178.1 |
| C18:1(Octadecenoic) | 14.6 | 14.4 | 14.4 | 14.5 | 14.4 |
| C18:2 (Trans) | 0.8 | 0.8 | 0.8 | 1.0 | 1.2 |
| C18:2n6 (Linoleic) | 270.6 | 267.2 | 509.6 | 269.1 | 505.7 |
| C18:3 (Trans) | 1.8 | 1.8 | 0.9 | 3.6 | 2.1 |
| C18:3n6(gamma-linolenic | 49.1 | 48.7 | — | 48.6 | — |
| C18:3n3 (alpha-Linolenic) | 109.5 | 108.3 | 83.1 | 107.3 | 80.8 |
| C18:4 (Trans) | 1.5 | 1.4 | 0.4 | 3.7 | 0.3 |
| C18:4n3(Octadeca-tetraenoic) | 171.2 | 169.4 | 1.1 | 165.6 | 1.0 |
| C20 (Arachidic) | 3.3 | 3.3 | 3.4 | 3.2 | 3.3 |
| C20:1n9 (Eicosenoic) | 1.8 | 1.8 | 1.8 | 1.7 | 1.9 |
| C20:2n6 (Eicosadienoic) | 0.4 | 0.4 | 0.4 | 0.5 | 0.4 |
| C22 (Behenic) | 2.8 | 2.8 | 2.8 | 2.9 | 2.8 |
| C24 (Lignoceric) | 0.8 | 0.8 | 1.0 | 0.8 | 1.0 |
| Others | 3.6 | 2.8 | 3.2 | 4.5 | 3.2 |

Example 46

20% SDA Test Article Processing

The Null seeds (having no SDA) and 20% SDA seeds were processed under the conditions in Example 45. The analytical data for the crude oil, degummed oil, refined/washed oil, bleached oil, and refined, bleached and deodorized (RBD) oil are presented below.

|  | Nulls | SDA Test Article |
|---|---|---|
| CRUDE SOYBEAN OIL | | |
| Free fatty acid, % | 0.24 | 0.42 |
| Peroxide value, meq/kg | 0.46 | 0.06 |
| Color, 1" | 70Y 3.2R | 70Y 3.8R |
| Chlorophyll, ppm | 0.007 | 0.011 |
| Iodine value | 128.5 | 175 |
| Anisidine value | 0.43 | 0.22 |
| Phosphorus, ppm | 473.6 | 58.5 |
| Ca, ppm | 18.45 | 10.6 |
| Mg, ppm | 30.98 | 6.98 |
| Fe, ppm | 1.41 | 0.09 |
| Cu, ppm | <0.05 | <0.05 |
| Na, ppm | 1.75 | <0.20 |
| Tocopherols, mg/100 g | | |
| delta | 30.5 | 28.6 |
| gamma | 94.0 | 83.4 |
| alpha | 9.85 | 10.1 |
| Sterols, mg/100 g | | |
| campesterol | 76.1 | 67.7 |
| stigmasterol | 72.2 | 55.6 |
| B-sitosterol | 184.9 | 192.0 |
| Fatty acid composition, % | | |
| C14 (Myristic) | 0.09 | 0.08 |
| C16 (Palmitic) | 11.68 | 12.00 |
| C16:1n7 (Palmitoleic) | 0.1 | 0.14 |
| C18 (Steric) | 4.26 | 4.24 |
| C18:1n9 (Oleic) | 20.88 | 18.6 |
| C18:1(Octadecenoic) | 1.46 | 1.46 |
| C18:2n6 (Linoleic) | 52.14 | 24.06 |
| C18:3n6(gamma-linolenic | | 6.15 |
| C18:3n3 (alpha-Linolenic) | 8.22 | 10.03 |
| | | 21.16 |
| C20 (Arachidic) | 0.32 | 0.36 |
| C20:1n9 (Eicosenoic) | 0.15 | 0.24 |
| C20:2n6 (Eicosadienoic) | 0.03 | 0.03 |
| C22 (Behenic) | 0.32 | 0.31 |
| C24 (Lignoceric) | 0.1 | 0.07 |
| Others | 0.25 | 1.07 |
| DEGUMMED OIL | | |
| Free fatty acid, % | 0.07 | 0.07 |
| Phosphorous, ppm | 11.7 | 11.9 |
| Anisidine value | 0.44 | 0.34 |
| REFINED/WASHED OIL | | |
| Phosphorous, ppm | — | 0.77 |
| Free fatty acid, % | 0.03 | 0.03 |
| Anisidine value | 0.31 | 1.09 |
| Soaps, ppm | 7 | 38 |
| BLEACHED OIL | | |
| Free fatty acid, % | 0.05 | 0.06 |
| Peroxide value, meq/kg | 0.1 | 0.22 |
| Color, 5¼"" | 6.5Y 0.5R | 8.1Y 0.3R |
| Chlorophyll, ppm | 0.001 | 0.0 |
| Phosphorus, ppm | <0.20 | <0.2 |
| Ca, ppm | 0.05 | <0.04 |
| Mg, ppm | <0.04 | <0.04 |
| Fe, ppm | <0.02 | <0.02 |
| Cu, ppm | <0.05 | <0.05 |
| Na, ppm | <0.20 | <0.02 |
| Soaps, ppm | 0.0 | 0.0 |
| Anisidine value | 0.2 | 1.18 |
| RBD SOYBEAN OIL | | |
| Free fatty acid, % | 0.05 | 0.05 |
| Peroxide value, meq/kg | 0.0 | 0.0 |
| Color, 5¼" | 2.8Y 0.1R | 3.3Y 0.0R |
| Chlorophyll, ppm | 0.022 | 0.013 |
| Anisidine value | 0.3 | 0.83 |
| Rancimat @110 C., hrs | 4.6 | 1.85 |
| Tocopherols, mg/100 g | | |
| delta | 29.3 | 23.5 |
| gamma | 91.4 | 76.5 |
| alpha | 9.94 | 9.53 |
| Sterols, mg/100 g | | |
| campesterol | 31.8 | 58.8 |
| stigmasterol | 24.0 | 44.4 |
| B-sitosterol | 107.1 | 174.7 |
| Fatty acid composition, % | | |
| C14 (Myristic) | 0.09 | 0.08 |
| C16 (Palmitic) | 11.57 | 12.23 |
| C16:1n7 (Palmitoleic) | 0.1 | 0.14 |
| C18 (Steric) | 4.24 | 4.26 |
| C18:1n9 (Oleic) | 21.16 | 18.74 |
| C18:1(Octadecenoic) | 1.46 | 1.44 |
| C18:2n6 (Linoleic) | 51.88 | 24.10 |
| C18:3n6(gamma-linolenic) | — | 6.21 |
| C18:3n3 (alpha-Linolenic) | 8.23 | 10.15 |
| C18:4n3 (Octadecatetraenoic) | — | 21.10 |
| C20 (Arachidic) | 0.32 | 0.37 |
| C20:1n9 (Eicosenoic) | 0.15 | 0.22 |
| C20:2n6 (Eicosadienoic) | 0.03 | 0.03 |
| C22 (Behenic) | 0.32 | 0.30 |
| C24 (Lignoceric) | 0.1 | 0.07 |
| Others | 0.35 | 0.56 |

Example 47

Citric Acid Addition Before and after Deodorization

Figure 4:
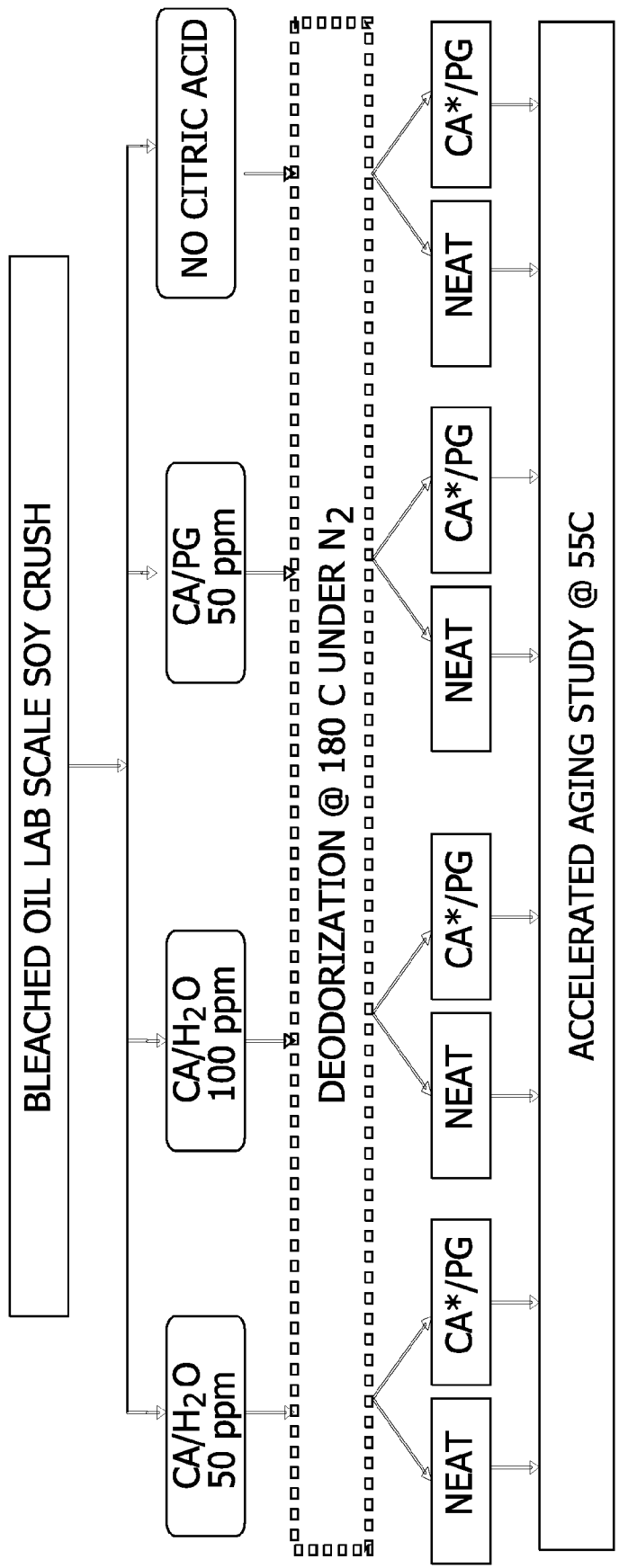
FIG. 4 is a schematic of the experimental design for addition of citric acid (CA) before and after deodorization as described in Example 47.

A series of experiments were executed to determine the efficacy of citric acid added before and after deodorization. In order to test this assertion, two levels of citric acid were added in an aqueous solution and an oil miscible solvent (propylene glycol) that acted as a carrier. A sample of bleached oil prepared by the process disclosed above was obtained before the deodorization step. This sample was spiked with CA as outlined in FIG. 4. Once addition of citric acid was completed to three of the four samples, each sample was deodorized at 180° C. in an inert atmosphere of nitrogen gas. Then each of the four sample were divided into two samples, where one of these two samples was subjected to accelerated aging at 55° C. as is (neat) and the other sample had 50 ppm of citric acid in propylene glycol added to it and then was subjected to accelerated aging at 55° C. The results of the accelerated aging studies for all eight samples are shown in FIGS. 5A and 5B. The polt titled W50/N has 50 ppm CA in an aqueous solution added prior to deodorization and no CA added after deodorization. The plot titled W50/CA has 50 ppm CA in an aqueous solution added prior to deodorization and 50 ppm CA in propylene glycol added after deodorization. The polt titled W100/N has 100 ppm CA in an aqueous solution added prior to deodorization and no CA added after deodorization. The plot titled W100/CA has 100 ppm CA in an aqueous solution added prior to deodorization and a 50 ppm CA solution in propylene glycol added after deodorization. The plot titled noCA/N has no CA added prior to deodorization and no CA added after deodorization. The plot titled noCA/CA has no CA added prior to deodorization and a 50 ppm CA solution in propylene glycol added after deodorization. The plot titled PG50/N has 50 ppm CA in propylene glycol added before deodorization and no CA added after deodorization. The plot titled PG50/CA has 50 ppm CA in propylene glycol added before deodorization and 50 ppm CA solution in propylene glycol added after deodorization.

What is claimed is:

1. A process for preparing an oil composition comprising degumming a crude oil to form a degummed oil;
bleaching the degummed oil to form a bleached oil;
deodorizing the bleached oil at a temperature from about 160° C. to about 200° C. at a pressure of not more than about 1.4 kPa for not more than about 130 minutes to form the oil composition having an anisidine value of less than about 3 and comprising less than 1 wt. % trans-fatty acid based on the total weight of fatty acids or derivatives thereof in the oil composition; and further comprising at least one of the following steps:
(i) contacting the degummed oil with a bleaching material at a temperature from about 80° C. to about 120° C. at a pressure of about 0.6 to 7 kPa to form the bleached oil;
(ii) reacting the crude oil with an acidic aqueous solution, at a temperature of at least 35° C. and in the presence of an inert gas to minimize oxygen concentration, to form the degummed oil; or
(iii) cracking and dehulling whole seeds, in the presence of an inert gas to minimize oxygen concentration, to form seed meats or seed hulls, or milling, grinding, or flaking an oil-containing material, in the presence of an inert gas to minimize oxygen concentration, to form oil-containing material having increased surface area, and contacting the seed meats, the seed hulls or the oil-containing material having increased surface area with an extraction fluid to extract a crude oil from the seed meats, the seed hulls or the oil-containing material.

2. The method of claim 1 comprising contacting the degummed oil with a bleaching material at a temperature from about 80° C. to about 120° C. at a pressure of about 0.6 to 7 kPa to form the bleached oil.

3. The method of claim 1 comprising reacting the crude oil with an acidic aqueous solution, at a temperature of at least 35° C. and in the presence of an inert gas to minimize oxygen concentration, to form the degummed oil.

4. The method of claim 1 comprising cracking and dehulling whole seeds, in the presence of an inert gas to minimize oxygen concentration, to form seed meats or seed hulls, or milling, grinding, or flaking an oil-containing material, in the presence of an inert gas to minimize oxygen concentration, to form oil-containing material having increased surface area, and contacting the seed meats, the seed hulls or the oil-containing material having increased surface area with an extraction fluid to extract a crude oil from the seed meats, the seed hulls or the oil-containing material.

5. The process of claim 1 further comprising the step of reacting the degummed oil with an acidic aqueous solution before the degummed oil is contacted with the bleaching material to form the bleached oil.

6. The process of claim 1 wherein the inert gas is selected from nitrogen, helium, neon, argon, krypton, xenon, carbon dioxide, carbon monoxide, hydrogen cyanide, or a mixture thereof.

7. The process of claim 6 wherein the inert gas is nitrogen.

8. The process of claim 1 wherein the degummed oil was bleached at a temperature from about 95° C. to about 110° C. at a pressure of about 2.5 to 4.0 kPa.

9. The process of claim 1 wherein the degummed oil and the bleaching material was purged of oxygen before the bleaching step.

10. The process of claim 1 wherein the bleached oil was deodorized in the presence of an inert gas.

11. The process of claim 1 further comprising the step of storing the seed meats, the seed hulls or the oil-containing material in the presence of an inert gas.

12. The process of claim 4 wherein concentration of transition metals is minimized and at least one stabilizer is added to the seed meats or oil in one or more steps of the process.

13. The process of claim 4 wherein exposure of the seeds, seed meats, seed hulls, or oil to light is minimized in one or more steps of the process.

14. The process of claim 1 wherein the oil composition has a peroxide value of less than 1.0 meq/kg.

15. The process of claim 1 wherein the crude oil has a peroxide value of 0 meq/kg.

16. The process of claim 1 wherein the oil is algal, almond, avocado, babassu, borage, blackcurrant seed, canola, castor bean, coconut, corn, cottonseed, Echium, evening primrose, flax seed, gooseberry, grapeseed, groundnut, hazelnut, linseed, mustard, olive, palm, palm kernel, peanut, pine seed, poppy seed, pumpkin seed, rapeseed, redcurrant, rice bran, safflower, sesame seed, soybean, sunflower, tea, walnut, or wheat germ oil.

17. The process of claim 1 wherein the oil comprises a plant oil.

18. The process of claim 17 wherein the plant oil is from Arabidopsis, canola, carrot, coconut, corn, cotton, flax, linseed, maize, palm kernel, peanut, potato, rapeseed, safflower, soybean, sunflower, tobacco, and mixtures thereof.

19. The process of claim 18 wherein the plant oil is from soybean.

* * * * *